United States Patent
Suzuki

(10) Patent No.: US 7,906,207 B2
(45) Date of Patent: Mar. 15, 2011

(54) COATING COMPOSITION, OPTICAL FILM, ANTI-REFLECTION FILM, POLARIZING PLATE, AND DISPLAY UNIT USING THEM

(75) Inventor: Takato Suzuki, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 871 days.

(21) Appl. No.: 11/659,591

(22) PCT Filed: Sep. 26, 2005

(86) PCT No.: PCT/JP2005/018210
§ 371 (c)(1),
(2), (4) Date: Feb. 7, 2007

(87) PCT Pub. No.: WO2006/035949
PCT Pub. Date: Apr. 6, 2006

(65) Prior Publication Data
US 2007/0289497 A1    Dec. 20, 2007

(30) Foreign Application Priority Data
Sep. 27, 2004    (JP) .................................. 2004-280002

(51) Int. Cl.
*B32B 15/00*    (2006.01)
(52) U.S. Cl. .................. 428/333; 106/287.24; 427/240; 526/245
(58) Field of Classification Search .................. 428/333; 427/240; 526/245; 106/287.24
See application file for complete search history.

(56) References Cited

U.S. PATENT DOCUMENTS

| | | | | |
|---|---|---|---|---|
| 5,061,769 A | * | 10/1991 | Aharoni | 526/245 |
| 5,148,511 A | * | 9/1992 | Savu et al. | 385/145 |
| 5,225,244 A | * | 7/1993 | Aharoni et al. | 427/240 |
| 6,379,788 B2 | * | 4/2002 | Choi et al. | 428/333 |
| 2006/0148996 A1 | * | 7/2006 | Coggio et al. | 525/276 |

FOREIGN PATENT DOCUMENTS

| | | | |
|---|---|---|---|
| JP | 60-238311 | * | 11/1985 |
| JP | 60-238311 A | | 11/1985 |
| JP | 61-120170 | * | 6/1986 |
| JP | 61-120170 A | | 6/1986 |
| JP | 07-333404 A | | 12/1995 |
| JP | 2003-177519 | * | 6/2003 |
| JP | 2004-331812 A | | 11/2004 |
| WO | WO-03/050620 A1 | * | 6/2003 |
| WO | WO 03/050620 A1 | | 6/2003 |
| WO | WO 2005/026789 A1 | | 3/2005 |
| WO | WO-2006/035949 A1 | * | 4/2006 |

OTHER PUBLICATIONS

Coating yo Tenkazai no Saishin Gijutsu (The Latest Techiques of Additives for Coating,) compiled by Haruo Kiryu, CMC Publishing Co. (2001)).
International Search Report.

* cited by examiner

*Primary Examiner* — Peter D. Mulcahy
*Assistant Examiner* — Henry Hu
(74) *Attorney, Agent, or Firm* — Buchanan Ingersoll & Rooney PC

(57) ABSTRACT

A coating composition comprises: a fluoro-aliphatic group-containing copolymer comprising a repeating unit A corresponding to a fluoro-aliphatic group-containing monomer, and a repeating unit B corresponding to at least one monomer, wherein each of the I/O values of said at least one monomer constituting the repeating unit B is 1.0 or less.

12 Claims, 3 Drawing Sheets

COATING COMPOSITION, OPTICAL FILM, ANTI-REFLECTION FILM, POLARIZING PLATE, AND DISPLAY UNIT USING THEM

TECHNICAL FIELD

The present invention relates to a coating composition, an optical film, an anti-reflection film, a polarizing plate, and a display unit using them.

BACKGROUND ART

In recent years, the development of materials using various coating methods has been advanced. In particular, coating techniques of a thin layer of several micrometers to several hundred nanometers are required in the fields of optical film, printing and photolithography, and coating accuracy required is raised with thinning of films, enlarging of the size of substrates and the expedition of coating speed. Particularly in the manufacture of optical films, the control of film thickness is a very important point that influences optical performances, and demand for techniques capable of realizing high coating speed while maintaining high accuracy is becoming more and more high.

Anti-reflection films are generally arranged on the outermost surfaces of display units such as cathode ray tube (CRT), plasma display panel (PDP), electroluminescence display (ELD) and liquid crystal display (LCD) to reduce reflectance by using the principle of optical interference for the purpose of preventing contrast reduction and mirroring of images by the reflection of outer light.

With the prevalence of display units having a shorter depth and a greater display area particularly as compared with conventional CRT, display units that are further precise and high in quality are come to be required. With that tendency, the planar uniformity of anti-reflection films is strongly desired. Planar uniformity used here means that the dispersion of optical performances represented by reflection preventing performance, and the dispersion of physical performances of films such as scratch resistance do not exist throughout the display area.

As the manufacturing method of an anti-reflection film, an inorganic vapor deposition such as the manufacturing method of a glare-proof anti-reflection film excellent in a gas barrier property, a glare-proof property, and a reflection preventing property using a silicon oxide film by CVD as disclosed in JP-A-7-333404 is exemplified, but the manufacturing method of an anti-reflection film by all wet coating is advantageous from the viewpoint of mass production.

However, although all wet coating using a solvent is very advantageous from the viewpoint of productivity, it is very difficult to maintain drying of solvent just after coating constant, so that planar unevenness is liable to occur. Planar unevenness used here means wind unevenness that is thickness unevenness caused by drying wind or drying unevenness attributable to the difference in drying velocity of solvent. It is an essential technique in all wet coating to increase a coating speed to improve productivity as much as possible. However, mere increase of a coating speed results in the increase of a wind speed of drying air relatively, and the planar condition is also influenced by the wind accompanied by high speed moving of the support, so that wind unevenness deteriorates. Thus, coating speed could not be increased too much so far to obtain anti-reflection films suppressed in the dispersions of optical performances and physical properties of films.

It is known that the improvement of a leveling property is effective to reduce unevenness in coating. As one means to improve a leveling property, the addition of a surfactant to a coating composition is proposed. This method is based on the mechanism that surface tension lowers and wetting of a coated matter is improved by the addition of a surfactant to a coating composition, and the variation of surface tension in film-forming process is lessened to thereby prevent heat convection, thus, the uniformity of a film is improved (*Coating yo Tenkazai no Saishin Gijutsu* (*The Latest Techniques of Additives for Coating*), compiled by Haruo Kiryu, CMC Publishing Co. (2001)). The optimal kind of surfactant varies by the compatibility with the solvent, resin and various additives in the objective coating composition, but when a solvent is used in coating, it is effective to use fluorine surfactants soluble in solvents and having the highest ability of lowering surface tension. In general, fluorine surfactants are compounds having in the same molecule a perfluoroalkyl (Rf) group for realizing the function of reducing surface tension, and a medium-philic group contributable to the affinity with various components for coating and film forming materials when the surfactants are used as additives. Such a compound can be obtained by the copolymerization of a monomer having a perfluoroalkyl group and a monomer having a medium-philic group.

As the representative examples of monomers having a medium-philic group copolymerized with a monomer having a perfluoroalkyl group, poly(oxyalkylene) acrylate and poly (oxyalkylene) methacrylate are exemplified.

However, although drying unevenness and wind unevenness are bettered by the use of conventional fluorine surfactants, periodic thickness unevenness (hereinafter referred to as "level unevenness") occurs perpendicularly to the traveling direction of a transparent support, which is a problem that degrades the grade of coated anti-reflection films.

DISCLOSURE OF THE INVENTION

The objects of the invention are to provide
(1) a coating composition containing a fluoro-aliphatic group-containing polymer capable of lowering drying unevenness and wind unevenness and at the same time not worsening level unevenness,
(2) an anti-reflection film having high planar uniformity and sufficient reflection preventing performance, and
(3) a polarizing plate and a display unit using such an anti-reflection film.

As a result of eager examinations of the structure of a fluoroalkyl group in a fluorine-containing monomer that is a constitutional component of a fluorine polymer type surfactant, and the compositions of a fluorine-containing monomer and a monomer not containing fluorine, the present inventors have found that a composition capable of reducing drying unevenness and wind unevenness occurring in coating and at the same time not worsening level unevenness can be obtained by using a fluorine polymer type surfactant containing a monomer having an I/O value of 1.0 or less and not containing poly(oxyalkylene) acrylate and/or poly(oxyalkylene) methacrylate that are generally contained in conventional fluorine polymer type surfactants.

That is, the invention has been achieved by the following constitutions.

(1) A coating composition comprising:
a fluoro-aliphatic group-containing copolymer comprising a repeating unit A corresponding to a fluoro-aliphatic group-containing monomer, and a repeating unit B corresponding to at least one monomer, wherein each of the I/O value(s) of said at least one monomer constituting the repeating unit B is 1.0 or less.

(2) The coating composition as described in (1) above, wherein the fluoro-aliphatic group-containing copolymer comprises:
(i) a repeating unit corresponding to a fluoro-aliphatic group-containing monomer represented by the following formula (1);

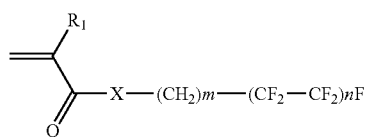

(1)

wherein $R_1$ represents a hydrogen atom or a methyl group; X represents an oxygen atom, a sulfur atom or $-N(R_2)-$; m represents an integer of from 1 to 6; n represents an integer of from 1 to 3; and $R_2$ represents a hydrogen atom or an alkyl group having from 1 to 4 carbon atoms; and
(ii) a repeating unit corresponding to a monomer represented by the following formula (2):

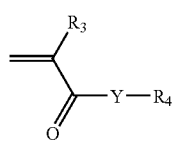

(2)

wherein $R_3$ represents a hydrogen atom or a methyl group; Y represents a divalent linking group; and $R_4$ represents a straight chain, branched or cyclic alkyl group having from 1 to 20 carbon atoms.

(3) The coating composition as described in (1),
wherein the fluoro-aliphatic group-containing copolymer comprises:
(i) a repeating unit corresponding to a fluoro-aliphatic group-containing monomer represented by the following formula (3):

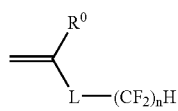

(3)

wherein $R^0$ represents a hydrogen atom, a halogen atom, or a methyl group; L represents a divalent linking group; and n represents an integer of from 1 to 18; and
(ii) a repeating unit corresponding to a monomer represented by the following formula (2).

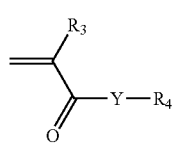

(2)

wherein $R_3$ represents a hydrogen atom or a methyl group; Y represents a divalent linking group; and $R_4$ represents a straight chain, branched or cyclic alkyl group having from 1 to 20 carbon atoms.

(4) The coating composition as described in (1), wherein the fluoro-aliphatic group-containing copolymer comprises:
(i) a repeating unit corresponding to a fluoro-aliphatic group-containing monomer represented by the following formula (4):

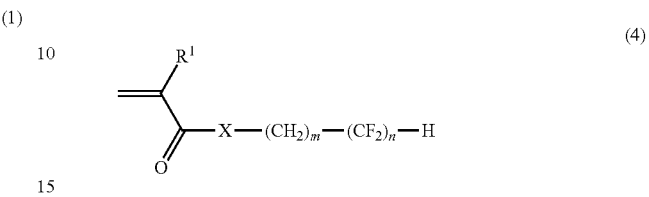

(4)

wherein $R^1$ represents a hydrogen atom, a halogen atom, or a methyl group; X represents an oxygen atom, a sulfur atom or $-N(R^2)-$; m represents an integer of from 1 to 6; n represents an integer of from 1 to 18; and $R^2$ represents a hydrogen atom or an alkyl group having from 1 to 8 carbon atoms which may have a substituent; and
(ii) a repeating unit corresponding to a monomer represented by the following formula (2).

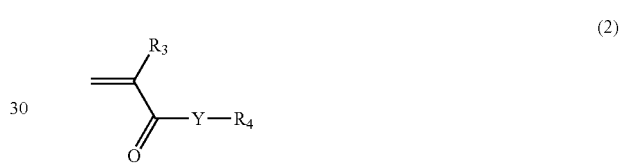

(2)

wherein $R_3$ represents a hydrogen atom or a methyl group; Y represents a divalent linking group; and $R_4$ represents a straight chain, branched or cyclic alkyl group having from 1 to 20 carbon atoms.

(5) The coating composition as described in (1),
wherein the fluoro-aliphatic group-containing copolymer comprises:
(i) a repeating unit corresponding to a fluoro-aliphatic group-containing monomer represented by the following general formula [5];

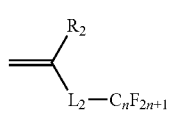

(5)

wherein, $R_2$ represents a hydrogen atom, halogen atom or methyl group, $L_2$ represents a divalent connecting group, and n represents an integer of from 1 to 6; and
(ii) a repeating unit corresponding to a monomer represented by the following formula (2).

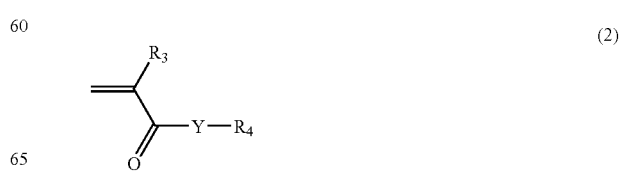

(2)

wherein $R_3$ represents a hydrogen atom or a methyl group; Y represents a divalent linking group; and $R_4$ represents a straight chain, branched or cyclic alkyl group having from 1 to 20 carbon atoms.

(6) An optical film comprising, on a transparent support, at least one layer formed by the coating composition set forth in one of (1) to (5) whereby said layer is formed by coating at a coating speed of 25 m/min or more.

(7) An anti-reflection film which is the optical film as described in (6), the optical film having an anti-reflection property.

(8) A polarizing plate comprising a polarizing film, wherein the anti-reflection film as described in (7) is used on at least one side of the polarizing film.

(9) A polarizing plate comprising a polarizing film, wherein the anti-reflection film described in (7) is used as a protective film of one side of the polarizing film, and an optical compensating film having optical anisotropy is used as a protective film of the other side of the polarizing film.

(10) An image display apparatus comprising the anti-reflection film as described in (7), or the polarizing plate described in (8) or (9).

Figure 1:
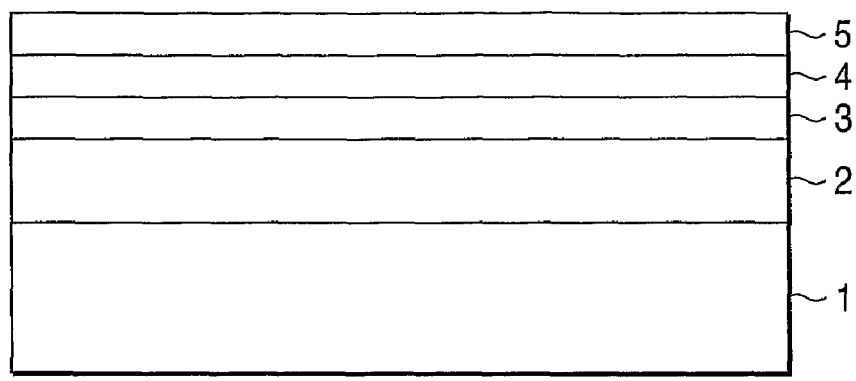
FIG. 1 is a typical cross-sectional view showing the fundamental layer structure of an anti-reflection film according to the invention.
Figure 2:
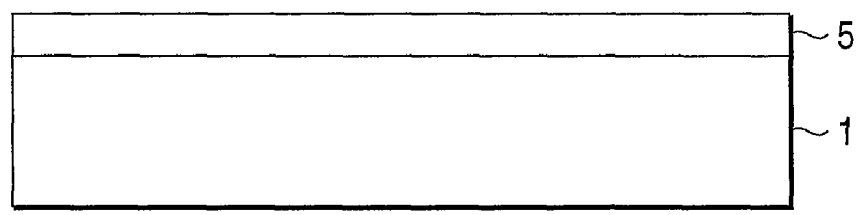
FIG. 2 is a typical cross-sectional view showing the layer structure of an anti-reflection film according to the invention.
Figure 3:
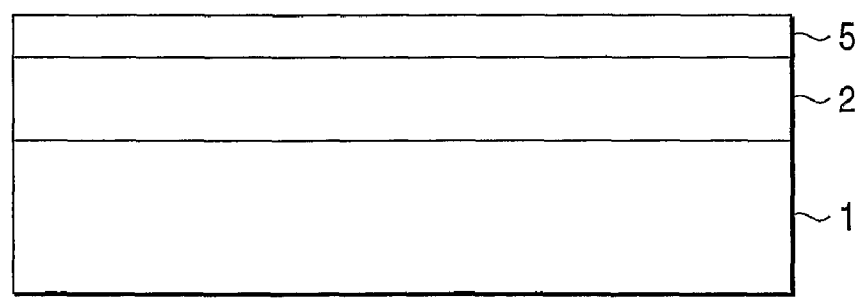
FIG. 3 is a typical cross-sectional view showing the layer structure of an anti-reflection film according to the invention.
Figure 4:
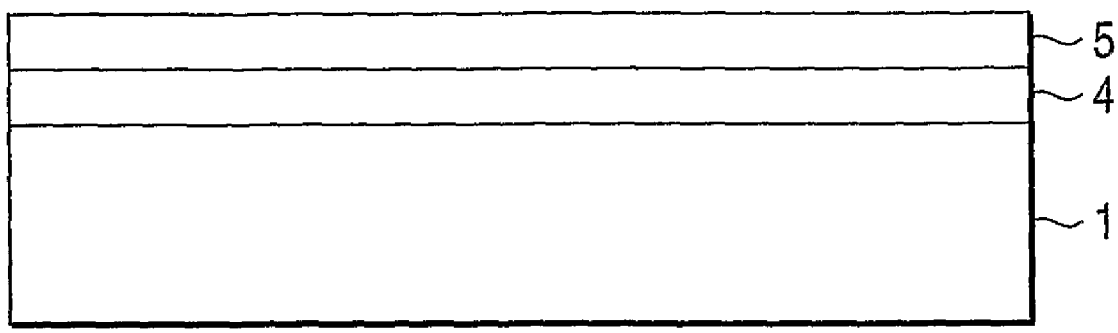
FIG. 4 is a typical cross-sectional view showing the layer structure of an anti-reflection film according to the invention.
Figure 5:
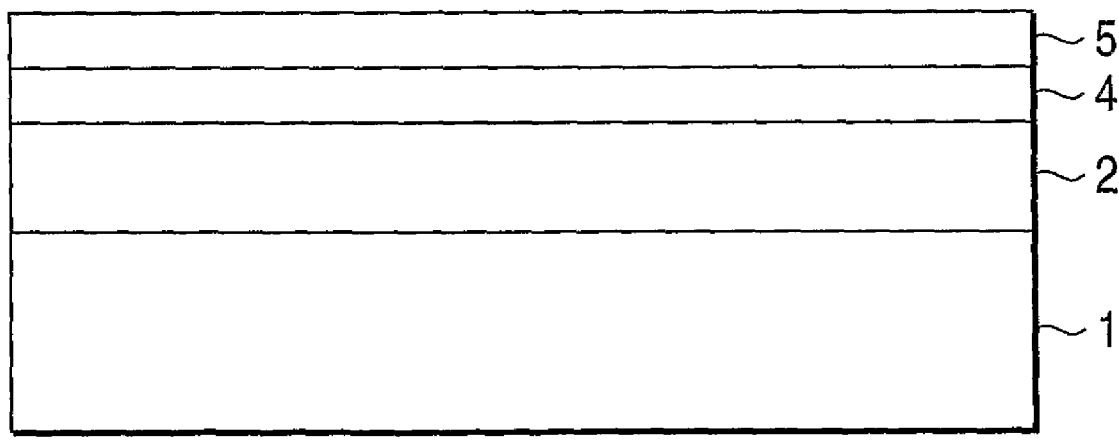
FIG. 5 is a typical cross-sectional view showing the layer structure of an anti-reflection film according to the invention.

(1) denotes a transparent support; (2) denotes a hard coat layer; (3) denotes a middle refractive index layer; (4) denotes a high refractive index layer; and (5) denotes a low refractive index layer

BEST MODE FOR CARRYING OUT THE INVENTION

The preferred embodiments of coating compositions, anti-reflection films, the manufacturing method of anti-reflection films, polarizing plates using the anti-reflection films, and image display apparatuses using these elements according to the invention are described in detail below. In the specification of the invention, "(meth)acryloyl" means "at least either acryloyl or(meth)acryloyl", and this applies to "(meth)acrylate" and "(meth)acrylic acid". When numerical values represent physical values and characteristic values, the description "from (numerical value 1) to (numerical value 2)" means "(numerical value 1) or more and (numerical value 2) or less". In addition, the expression "on the support" in the present invention contains both meanings of the direct surface of said support itself, and the surface of any layer (film) provided on said support.

Coating Composition:

The coating composition of the present invention is characterized by containing a fluoro-aliphatic group-containing copolymer (sometimes abbreviated as "fluorine-containing polymer") whereby said fluorine-containing polymer contains a repeating unit A corresponding to a fluoro-aliphatic group-containing monomer and a repeating unit B corresponding to at least one kind of a monomer, and whereby each of the I/O value(s) of the at least one of a monomer constituting said unit B is 1.0 or less.

The fluorine-containing polymer may be a copolymer of at least one monomer represented by, for example, general formula [1], [3], [4] or [5] with another kind of monomer capable of copolymerization therewith. Namely, the polymer may be a copolymer of a monomer represented by general formula [1], [3], [4] or [5] with another copolymerizable monomer such as those shown in [Example 2]. Such another copolymerizable monomer may be any one so long as it is capable of forming recurring unit B, does not contain fluorine, and whose I/O value is 1.0 or less.

The aforementioned I/O value in the present invention is the ratio of "inorganic nature (I)" to "organic nature (O)" obtained by the methods described in "Organic Compound Conception Diagram and Application thereof, Kagaku Gikkengaku 2(3), 225-257" Kawade Shobo (1941), Yoshio Kouda; "Organic Conception Diagram", Sankyo Shuppan Co., Ltd. (1984), "Formulation Design with Organic Conception Diagram" (Nihon Emulsion Co., Ltd., published in November 1998, revised on Mar. 26, 2001, and Nihon Emulsion Co., Ltd., "Formulation Design with Organic Conception Diagram", [Retrieved on Aug. 15, 2005.], Internet <URL: http://www.nihon-emulsion.co.jp/pdf/ocd-book_e.pdf>, etc. Among them, the method described in Nihon Emulsion Co., Ltd., "Formulation Design with Organic Conception Diagram" is preferred. An I/O value is used as a means for estimating various physicochemical properties of organic compounds. Great and small of organic properties is obtained by the comparison of great and smaill of carbon atom number, and great and small of inorganic properties is obtained by the comparison of the boiling points of hydrocarbons of the equivalent carbon atom number. For example, taking one ($—CH_2—$) (practically C) as the organic value 20, the inorganic value is determined as 100 from the influence of a hydroxyl group (—OH) on the boiling point. Taking this inorganic value 100 of (—OH) as standard, the value of other substituent (inorganic group) is obtained and shown as "inorganic group table". The ratio of inorganic value (I) to organic value (O), I/O, of each molecule obtained according to the inorganic group table is defined as "I/O value". Hydrophilic property increases with the increase of I/O value, and hydrophobic property increases with the decrease of I/O value.

The I/O value of the monomer capable of forming recurring unit B to be used in the present invention is 1.0 or less, and preferably 0.8 or less.

When a coating composition containing a fluorine polymer comprising a monomer having an I/O value of 1.0 or more is coated, good planar condition is shown against wind unevenness and drying unevenness, but level unevenness is conspicuously worsened as compared with the case where a coating composition not containing the fluorine polymer is coated. Periodic unevenness of tint is observed in the thus-obtained anti-reflection film, so that the film is not preferred as the anti-reflection film arranged on the surface of an image display apparatus. On the other hand, when a coating composition containing a fluorine polymer containing a monomer having in I/O value of 1.0 or more is coated, level unevenness is not worsened as compared with the case where a coating composition not containing the fluorine polymer is coated, and wind unevenness and drying unevenness are bettered, so that an anti-reflection film excellent in the in-plane uniformity can be obtained. When an anti-reflection film obtained in this manner is installed in an image display apparatus, an image display apparatus of high grade free of thickness unevenness can be obtained.

[Fluorine-Containing Polymer]

In the following, "the fluorine-containing polymer", which can be preferably used in the present invention, is described in detail.

The fluorine-containing polymer of the present invention is preferably a fluoro-aliphatic group-containing copolymer of at least one repeating unit A corresponding to a fluoro-aliphatic group-containing monomer represented by the following general formula [1], [3], [4] or [5] with at least one of repeating unit B corresponding to the monomer represented by the following general formula [2] free of a fluoro-aliphatic group.

In formula (2), $R_3$ represents a hydrogen atom or a methyl group, and Y represents a divalent linking group. As the divalent linking groups, an oxygen atom, a sulfur atom and $-N(R_5)-$ are preferred. $R_5$ represents a hydrogen atom, or an alkyl group having from 1 to 4 carbon atoms, e.g., a methyl group, an ethyl group, a propyl group, and a butyl group are preferred. $R_5$ more preferably represents a hydrogen atom or a methyl group. Y more preferably represents an oxygen atom. $R_4$ represents a straight chain, branched or cyclic alkyl group having from 4 to 20 carbon atoms. As the straight chain, branched or cyclic alkyl groups having from 4 to 20 carbon atoms, a straight chain or branched butyl group, pentyl group, hexyl group, heptyl group, octyl group, nonyl group, decyl group, undecyl group, dodecyl group, tridecyl group, tetradecyl group, pentadecyl group, octadecyl group and eicosanyl group, a monocyclic cycloalkyl group, e.g., a cyclohexyl group and a cycloheptyl group, and a polycyclic cycloalkyl group, e.g., a bicycloheptyl group, a bicyclodecyl group, a tricycloundecyl group, a tetracyclododecyl group, an adamantyl group, a norbornyl group and a tetracyclodecyl group are preferably used.

As the specific examples of the monomers represented by formula (2), the following monomers are exemplified, but the invention is not limited thereto.

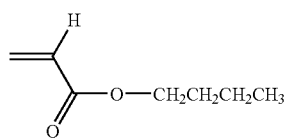

A-1

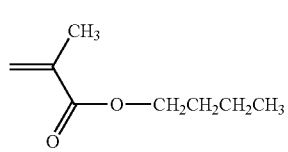

A-2

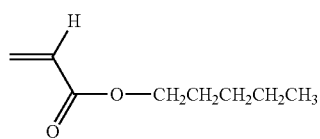

A-3

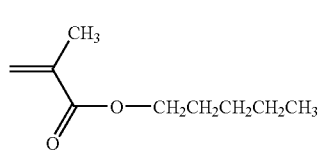

A-4

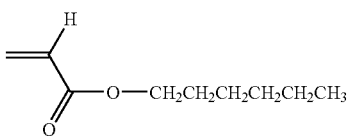

A-5

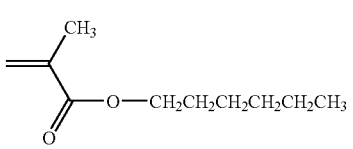

A-6

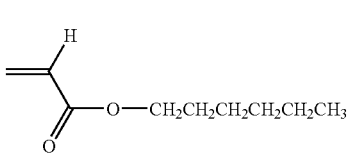

A-7

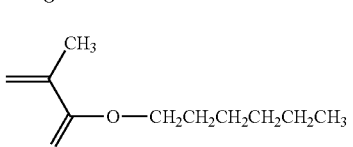

A-8

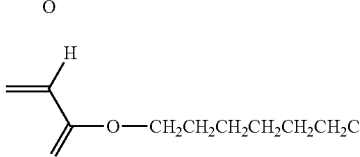

A-9

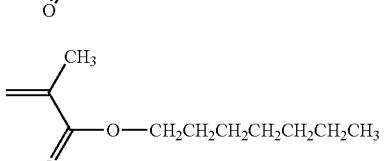

A-10

A-11

A-12

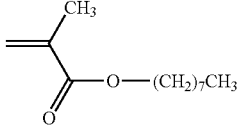

A-13

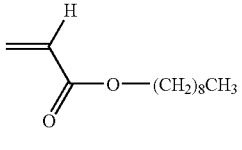

A-14

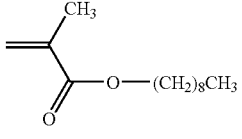

A-15

A-16 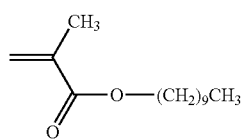
A-17 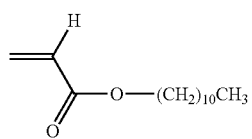
A-18 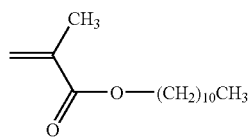
A-19 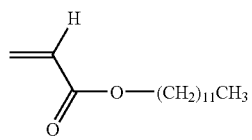
A-20 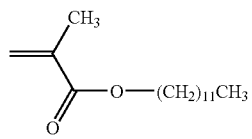
A-21 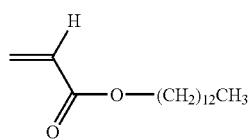
A-22 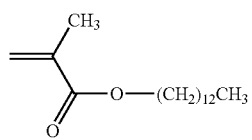
A-23 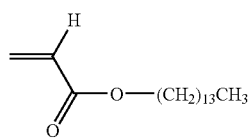
A-24 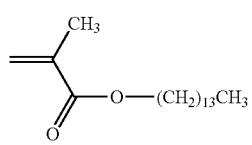
A-25 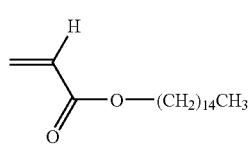
A-26 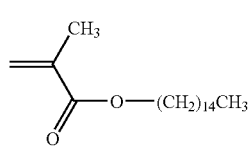
A-27 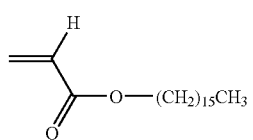
A-28 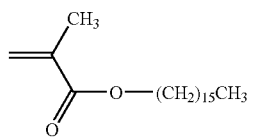
A-29 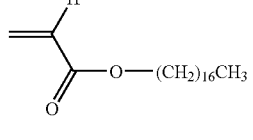
A-30 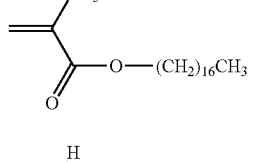
A-31 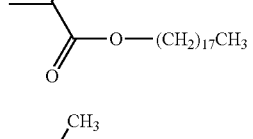
A-32 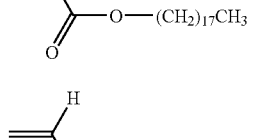
A-33 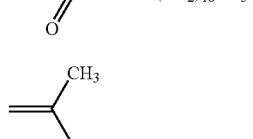
A-34 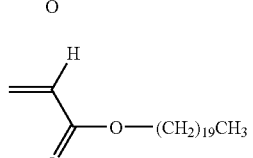
A-35 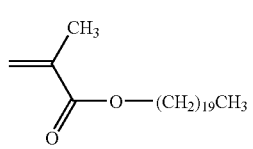
A-36 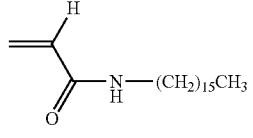
A-37

-continued
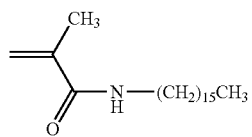 A-38
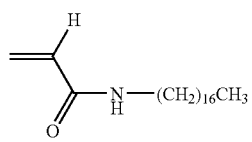 A-39
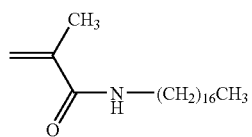 A-40
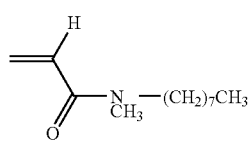 A-41
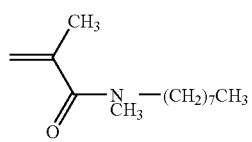 A-42
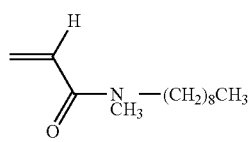 A-43
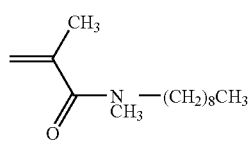 A-44
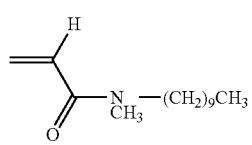 A-45
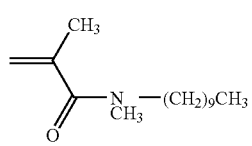 A-46
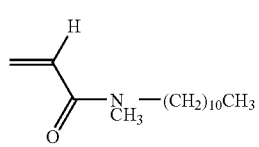 A-47
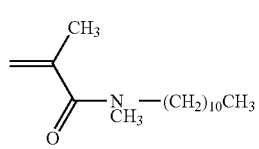 A-48
-continued
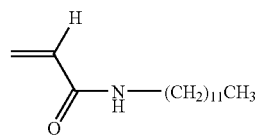 A-49
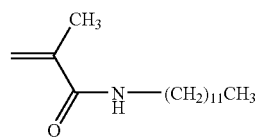 A-50
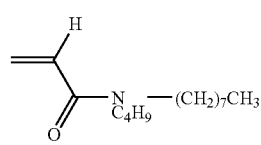 A-51
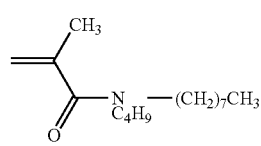 A-52
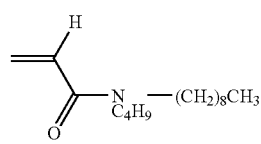 A-53
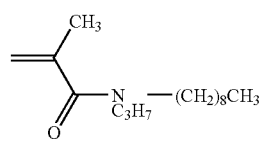 A-54
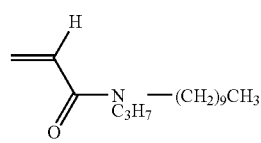 A-55
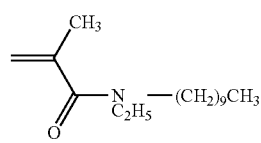 A-56
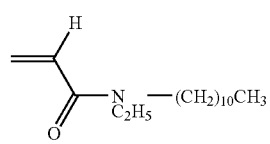 A-57
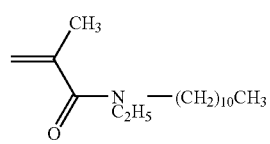 A-58
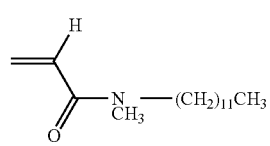 A-59

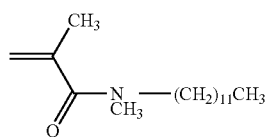 A-60
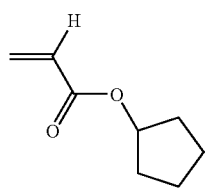 A-61
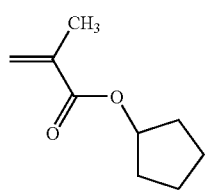 A-62
 A-63
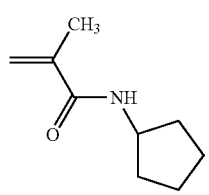 A-64
 A-65
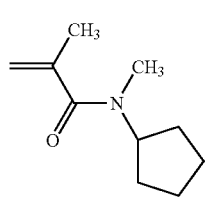 A-66
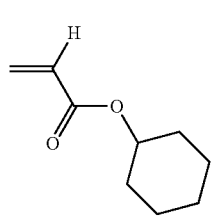 A-67
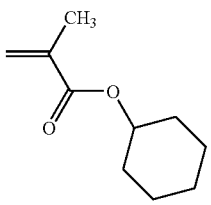 A-68
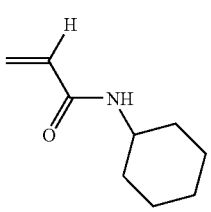 A-69
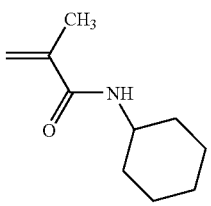 A-70
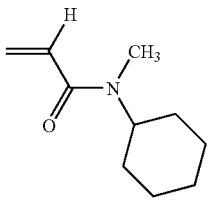 A-71
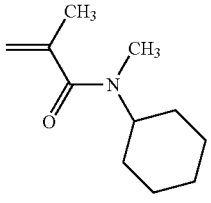 A-72
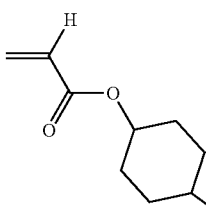 A-73
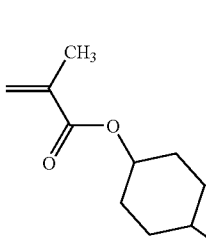 A-74

A-75 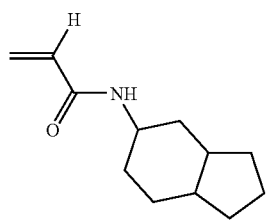
A-76 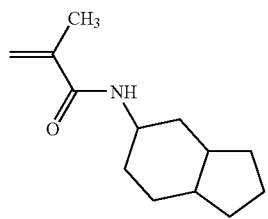
A-77 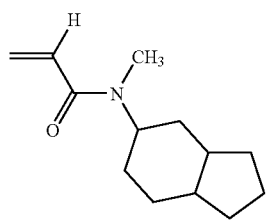
A-78 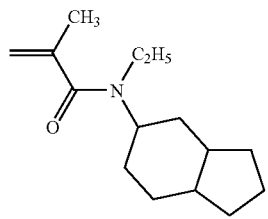
A-79 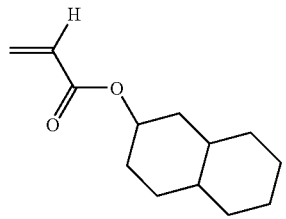
A-80 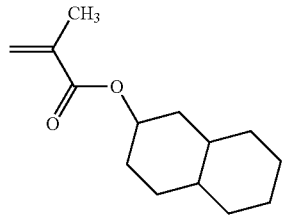
A-81 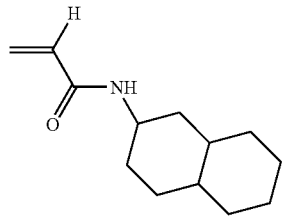
A-82 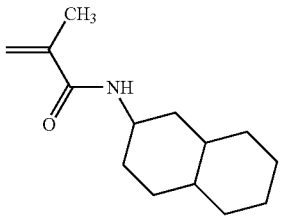
A-83 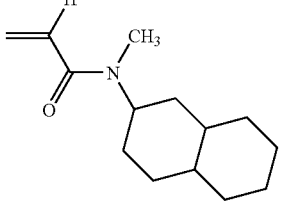
A-84 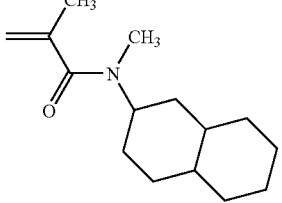
A-85 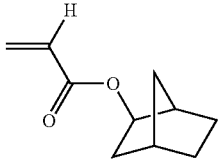
A-86 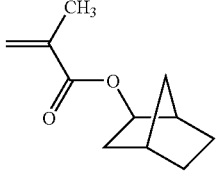
A-87 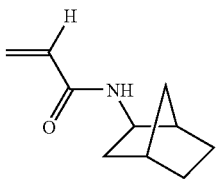
A-88 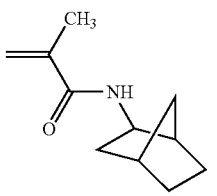
A-89

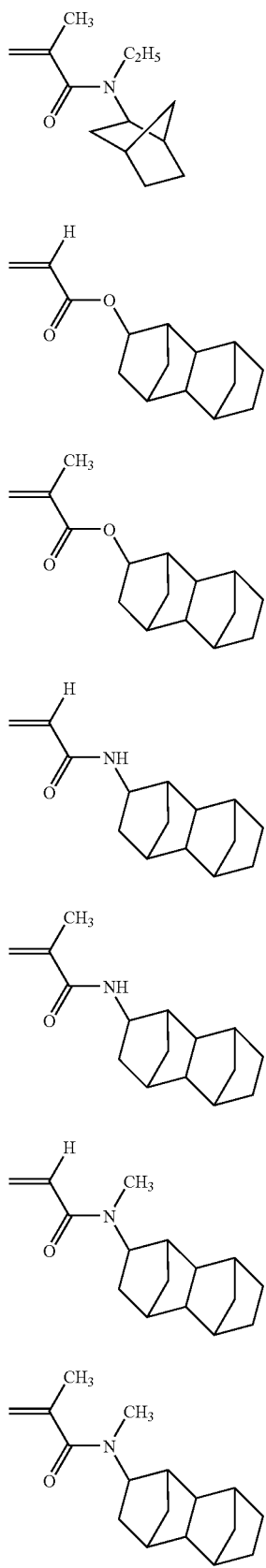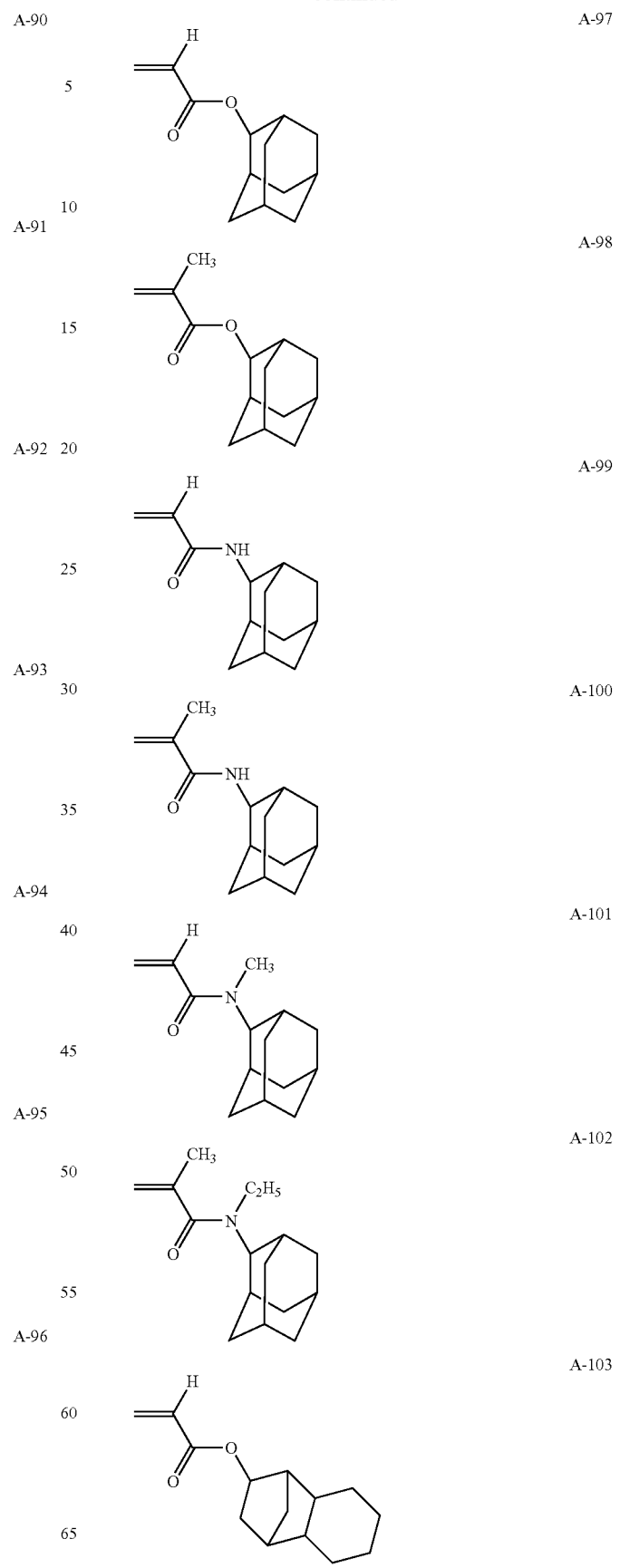

A-104
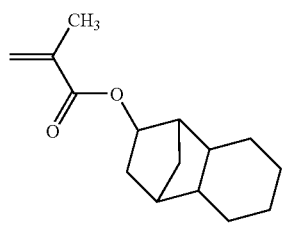
A-105
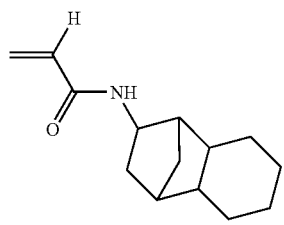
A-106
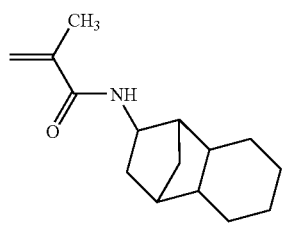
A-107
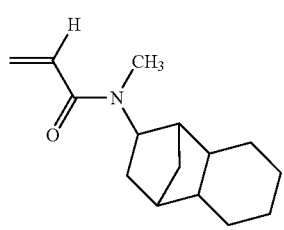
A-108
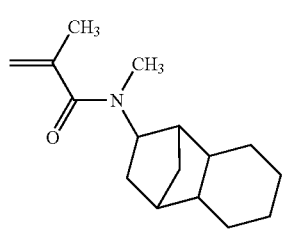
A-109
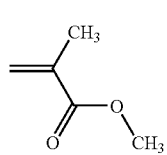
A-110
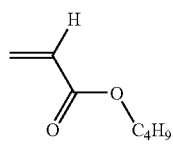
A-111
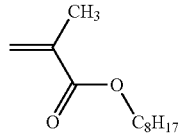
A-112
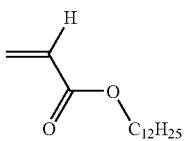
A-113
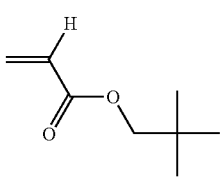
A-114
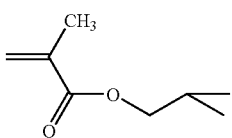
A-115
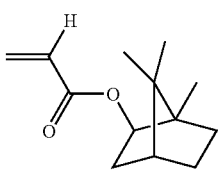
A-116
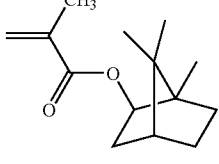
A-117
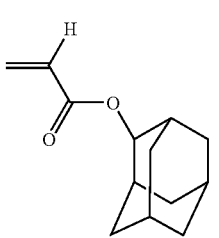
A-118
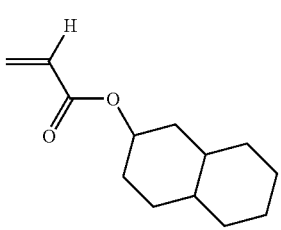
A-119
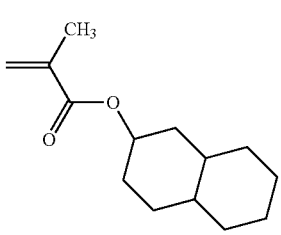

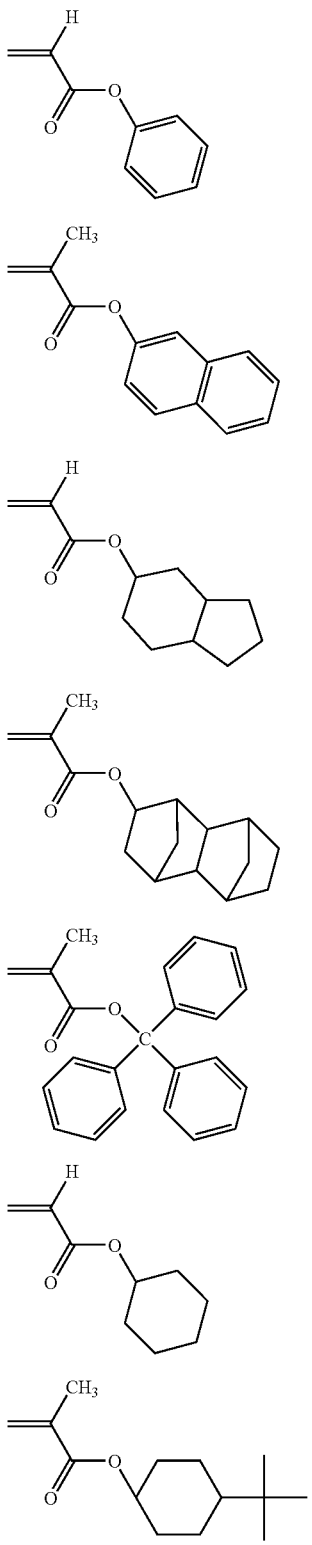

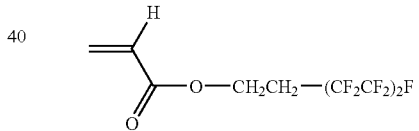

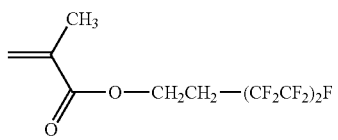

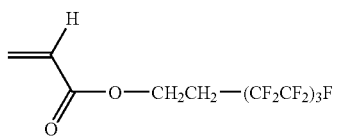

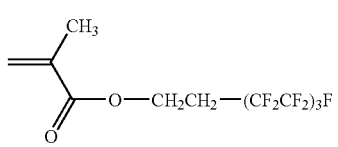

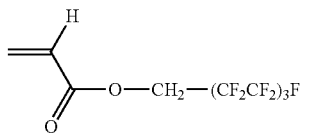

In formula (I), $R_1$ represents a hydrogen atom or a methyl group; X represents an oxygen atom, a sulfur atom or $-N(R_2)-$; $R_2$ represents a hydrogen atom or an alkyl group having from 1 to 4 carbon atoms, specifically a methyl group, an ethyl group, a propyl group, or a butyl group, preferably a hydrogen atom or a methyl group; X more preferably represents an oxygen atom; m represents an integer of from 1 to 6, particularly preferably 1; and n represents an integer of from 1 to 3, which may be a mixture of from 1 to 3, and particularly preferably 3.

$R_2$ in general formula [5] represents a hydrogen atom, halogen atom or methyl group, among which hydrogen atom and methyl group are preferred. n represents an integer of 1 to 6 whereby 4 to 6 are more preferred and 6 is the most preferred. L2 represents a divalent connecting group, specifically including a substituted or unsubstituted alkylene group, a substituted or unsubstituted arylene group, a substituted or unsubstituted alkylene group having therein a connecting group (exemplified by an ether, ester or amide group), and a substituted or unsubstituted arylene group having therein a connecting group. Among these, a substituted or unsubstituted alkylene group having 2 to 10 carbon atoms, a substituted or unsubstituted arylene group having 6 to 20 carbon atoms and an alkylene group having 3 to 10 carbon atoms and a connecting group therein are preferred. An unsubstituted alkylene group, an unsubstituted arylene group, and an alkylene group having therein an ether or ester connecting group are still more preferred. An unsubstituted alkylene group, and an alkylene group having therein an ether or ester connecting group are particularly preferred. As the substituent, a halogen, a hydroxy group, a mercapto group, a carboxyl group, an epoxy group, an alkyl group, an aryl group, etc. are mentioned whereby these substituents may be further substituted.

Further, in the aforementioned fluorine-containing polymer, two or more polymerization unit of a fluoro-aliphatic group-containing monomer represented by general formula [5] may be contained as constituent units.

More specific examples of the fluoro-aliphatic group-containing monomer represented by general formulae [1] and [5] are enumerated below, but are not limited to these.

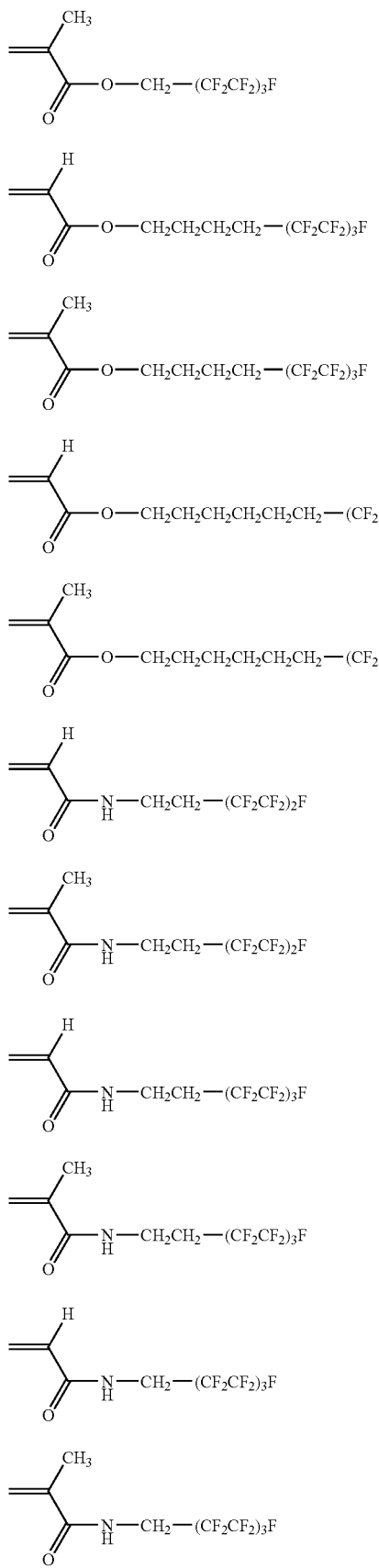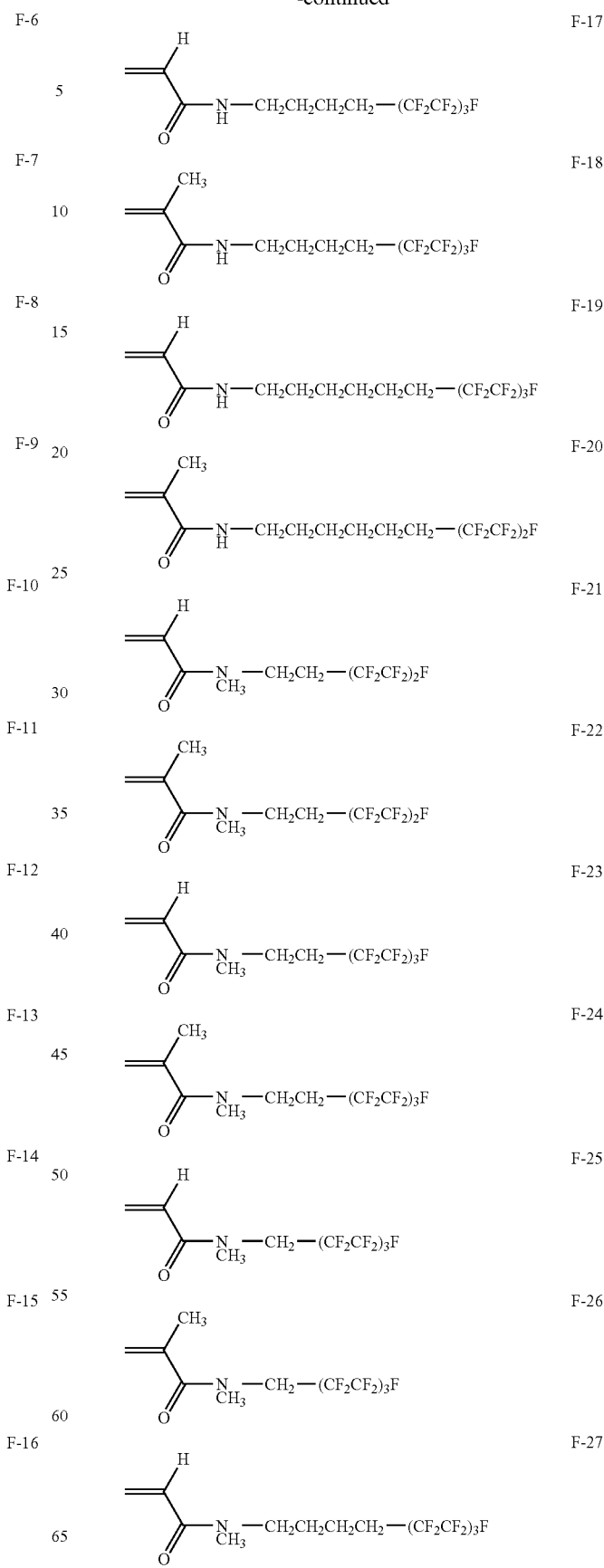

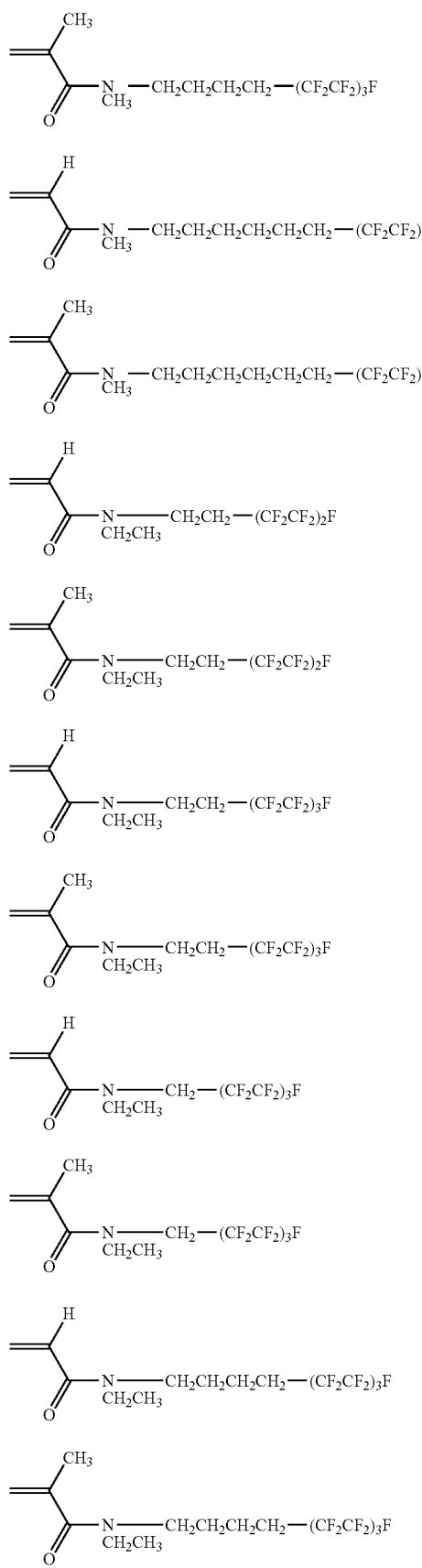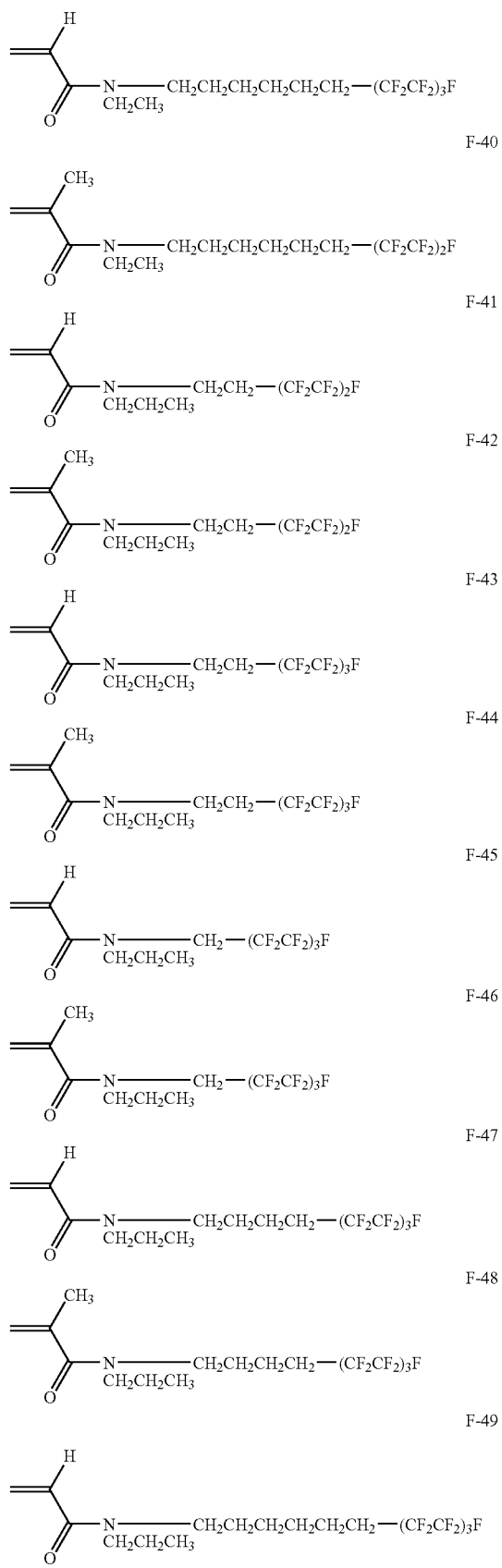

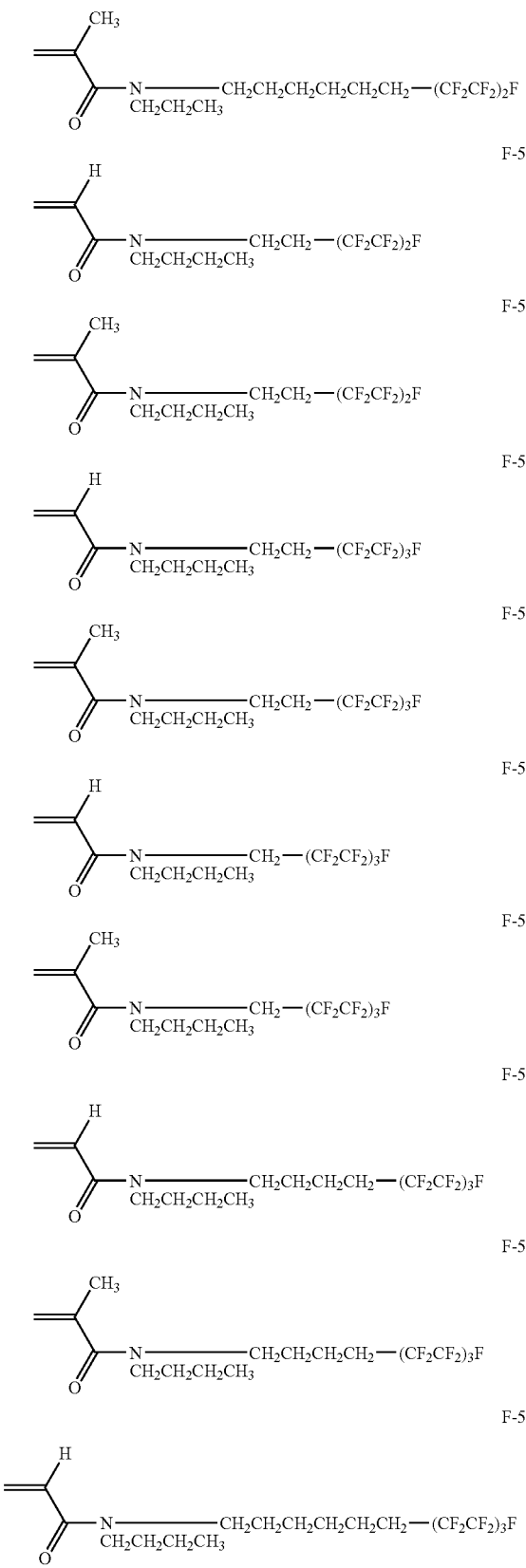
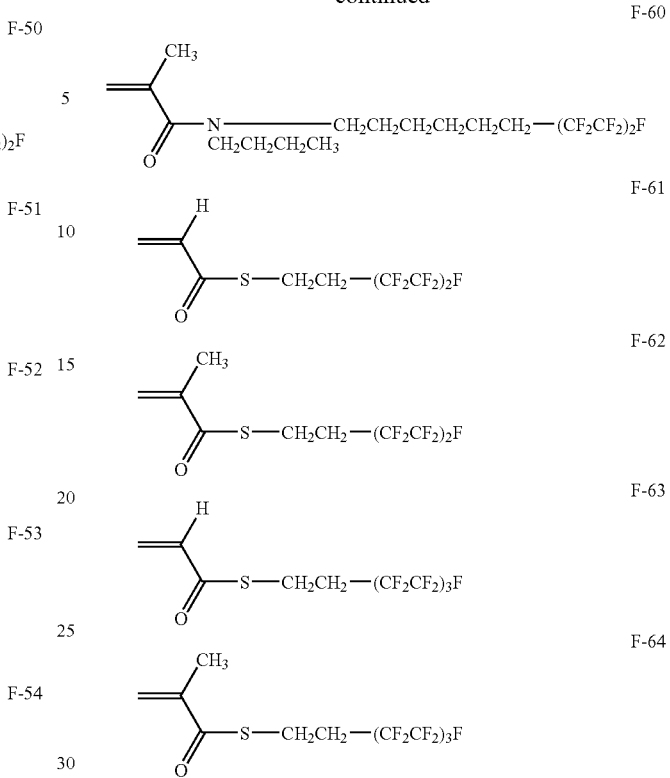

In formula (3), $R^0$ represents a hydrogen atom, a halogen atom, or a methyl group, more preferably a hydrogen atom or a methyl group. n represents an integer of from 1 to 18, preferably from 4 to 12, more preferably from 6 to 8, and most preferably 6. L represents a divalent connecting group, specifically including a substituted or unsubstituted alkylene group, a substituted or unsubstituted arylene group, a substituted or unsubstituted alkylene group having therein a connecting group (exemplified by an ether, ester or amide group), and a substituted or unsubstituted arylene group having therein a connecting group. Among these, a substituted or unsubstituted alkylene group having 2 to 10 carbon atoms, a substituted or unsubstituted arylene group having 6 to 20 carbon atoms and an alkylene group having 3 to 10 carbon atoms and a connecting group therein are preferred. An unsubstituted alkylene group, an unsubstituted arylene group, and an alkylene group having therein an ether or ester connecting group are still more preferred. An unsubstituted alkylene group, and an alkylene group having therein an ether or ester connecting group are particularly preferred. As the substituent, a halogen, a hydroxy group, a mercapto group, a carboxyl group, an epoxy group, an alkyl group, an aryl group, etc. are mentioned whereby these substituents may be further substituted.

Two or more kinds of polymerization units of a fluoro-aliphatic group-containing monomer represented by formula (3) may be contained in the fluorine polymer as the constitutional units.

In formula (4), $R^1$ represents a hydrogen atom, a halogen atom or a methyl group, more preferably a hydrogen atom or a methyl group. X represents an oxygen atom, a sulfur atom or —N($R_2$)—, more preferably an oxygen atom or —N($R_2$)—, and still more preferably an oxygen atom. $R_2$ represents a hydrogen atom or an alkyl group having from 1 to 8 carbon atoms, preferably a hydrogen atom or an alkyl group having from 1 to 4 carbon atoms, and more preferably a hydrogen atom or a methyl group. m represents an integer of from 1 to 6, preferably from 1 to 3, and more preferably 1. n represents an integer of from 1 to 18, preferably from 4 to 12, more preferably from 6 to 8, most preferably 6.

Two or more kinds of polymerization units of a fluoro-aliphatic group-containing monomer represented by formula (4) may be contained in the fluorine polymer as the constitutional units.

The specific examples of fluoro-aliphatic group-containing monomers represented by formula (3) or (4) are shown below, but the invention is not limited thereto.

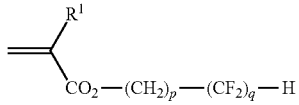

| | $R^1$ | p | q |
|---|---|---|---|
| F-1 | H | 1 | 4 |
| F-2 | $CH_3$ | 1 | 4 |
| F-3 | F | 1 | 4 |
| F-4 | H | 2 | 4 |
| F-5 | $CH_3$ | 3 | 4 |
| F-6 | H | 1 | 6 |
| F-7 | $CH_3$ | 1 | 6 |
| F-8 | F | 1 | 6 |
| F-9 | H | 2 | 6 |
| F-10 | $CH_3$ | 2 | 6 |
| F-11 | H | 3 | 6 |
| F-12 | H | 1 | 8 |
| F-13 | $CH_3$ | 1 | 8 |
| F-14 | F | 1 | 8 |
| F-15 | $CH_3$ | 2 | 8 |
| F-16 | H | 3 | 8 |
| F-17 | $CH_3$ | 3 | 8 |
| F-18 | H | 1 | 10 |
| F-19 | $CH_3$ | 1 | 10 |
| F-20 | F | 1 | 10 |
| F-21 | H | 2 | 10 |
| F-22 | H | 2 | 10 |

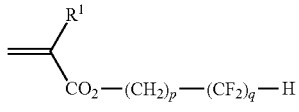

| | $R^1$ | p | q |
|---|---|---|---|
| F-23 | H | 1 | 12 |
| F-24 | $CH_3$ | 1 | 12 |
| F-25 | F | 1 | 12 |
| F-26 | H | 2 | 12 |
| F-27 | H | 3 | 12 |
| F-28 | H | 1 | 14 |
| F-29 | $CH_3$ | 1 | 14 |
| F-30 | F | 1 | 14 |
| F-31 | H | 2 | 14 |
| F-32 | $CH_3$ | 2 | 14 |
| F-33 | H | 1 | 16 |
| F-34 | $CH_3$ | 1 | 16 |
| F-35 | F | 1 | 16 |
| F-36 | $CH_3$ | 2 | 16 |
| F-37 | H | 3 | 16 |
| F-38 | H | 1 | 18 |
| F-39 | $CH_3$ | 1 | 18 |
| F-40 | F | 1 | 18 |
| F-41 | H | 3 | 18 |
| F-42 | $CH_3$ | 3 | 18 |

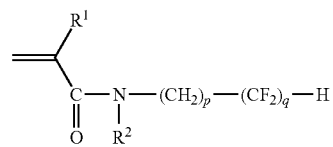

| | $R^1$ | $R^2$ | p | q |
|---|---|---|---|---|
| F-43 | H | H | 1 | 4 |
| F-44 | $CH_3$ | H | 1 | 4 |
| F-45 | H | $CH_3$ | 1 | 4 |
| F-46 | H | H | 2 | 4 |
| F-47 | H | H | 1 | 6 |
| F-48 | $CH_3$ | H | 1 | 6 |
| F-49 | H | $CH_3$ | 1 | 6 |
| F-50 | H | $C_2H_5$ | 1 | 6 |
| F-51 | $CH_3$ | H | 1 | 6 |
| F-52 | F | H | 2 | 6 |
| F-53 | H | H | 1 | 8 |
| F-54 | $CH_3$ | H | 1 | 8 |
| F-55 | H | $CH_3$ | 1 | 8 |
| F-56 | H | $C_4H_9$ (n) | 1 | 8 |
| F-57 | $CH_3$ | $C_2H_5$ | 1 | 8 |
| F-58 | H | $CH_2Ph$ | 1 | 8 |
| F-59 | H | H | 2 | 8 |
| F-60 | $CH_3$ | H | 3 | 8 |
| F-61 | H | H | 1 | 10 |
| F-62 | $CH_3$ | $CH_3$ | 1 | 10 |
| F-63 | H | H | 1 | 12 |
| F-64 | $CH_3$ | H | 1 | 12 |
| F-65 | H | H | 1 | 18 |
| F-66 | H | $CH_3$ | 1 | 18 |

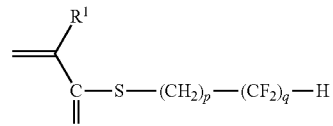

| | $R^1$ | p | q |
|---|---|---|---|
| F-67 | H | 1 | 4 |
| F-68 | $CH_3$ | 1 | 4 |
| F-69 | H | 2 | 4 |
| F-70 | H | 1 | 6 |
| F-71 | $CH_3$ | 1 | 6 |
| F-72 | $CH_3$ | 2 | 6 |
| F-73 | H | 1 | 8 |
| F-74 | $CH_3$ | 1 | 8 |
| F-75 | F | 1 | 8 |
| F-76 | H | 2 | 8 |
| F-77 | $CH_3$ | 3 | 8 |
| F-78 | H | 1 | 10 |
| F-79 | $CH_3$ | 1 | 10 |
| F-80 | H | 1 | 12 |
| F-81 | $CH_3$ | 1 | 12 |
| F-82 | H | 1 | 16 |
| F-83 | $CH_3$ | 2 | 16 |
| F-84 | H | 1 | 18 |
| F-85 | $CH_3$ | 1 | 18 |

A part of fluorine-based chemicals manufactured by electrolytic fluorination method so far been preferably used is low in biodegradability and highly cumulative in a living body, so that there is the possibility of generative toxicity or development toxicity, although the degree is not great. It can be said that the fluorine polymers according to the invention having hydrogen atoms on the terminals of a fluoro-aliphatic group are substances higher in environmental safety so that industrially advantageous.

The content of a polymerization unit of a fluoro-aliphatic group-containing monomer represented by formula (1), (3), (4) or (5) constituting the fluorine polymer for use in the invention preferably exceeds 50 mass % of the total polymerization units constituting the fluorine polymer, more preferably from 70 to 100 mass %, and still more preferably from 80 to 100 mass %.

The content of a polymerization unit of a monomer represented by formula (2) preferably used in the invention is preferably less than 50 mass % of the total polymerization units constituting the fluorine polymer, more preferably from 0 to 30 mass %, and still more preferably from 0 to 20 mass %.

The weight average molecular weight of the fluoro-aliphatic group-containing polymer used in the present invention is preferably from 3,000 to 100,000, more preferably from 6,000 to 80,000, still more preferably from 8,000 to 60,000 from the viewpoint of the prevention of surface irregularities caused by air stream. However, in cases where superficial defects such as repulsion occur depending on the formulation to which the polymer in concern is to be added, the weight average molecular weight is preferably from 1,000 to 20,000.

Here, the mass average molecular weight and the molecular weight are the molecular weights measured by a GPC analyzer using columns such as TSKgel GMHXL, TSKgel G4000HxL, TSKgel G2000HxL (trade names, manufactured by Toso Corporation) in terms of polystyrene, with solvent THF, and a differential refractometer.

The fluorine polymers in the invention can be manufactured according to conventionally well-known methods. For example, the polymers can be manufactured by polymerizing monomers such as the above (meth)acrylate having a fluoro-aliphatic group, (meth)acrylate having a straight, branched or cyclic alkyl group in organic solvents, and adding general purpose radical polymerization initiators. Alternatively, according to cases, they can be manufactured by adding other addition polymerizable unsaturated compounds and by the same method as above. For obtaining homogeneous polymers, it is also effective to adopt a dropping polymerization method of polymerizing by dropping monomers and initiatora to a reaction vessel according the polymerizability of each monomer.

The specific examples of the structures of fluorine polymers in the invention are shown below, but the invention is not limited thereto. The numerals in the following formulae show the mass ratio of each monomer component, and Mw represents a mass average molecular weight.

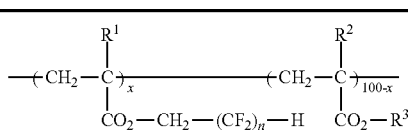

| | x | R¹ | n | R² | R³ | Mw |
|---|---|---|---|---|---|---|
| P-1 | 80 | H | 4 | CH₃ | CH₃ | 11000 |
| P-2 | 90 | H | 4 | H | C₄H₉(n) | 7000 |
| P-3 | 95 | H | 4 | H | C₆H₁₃(n) | 5000 |
| P-4 | 90 | CH₃ | 4 | H | CH₂CH(C₂H₅)C₄H₉(n) | 15000 |
| P-5 | 70 | H | 6 | CH₃ | C₂H₅ | 18000 |
| P-6 | 90 | H | 6 | CH₃ | ⟨C₆H₁₁⟩ | 12000 |

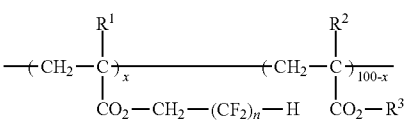

| | x | R¹ | n | R² | R³ | Mw |
|---|---|---|---|---|---|---|
| P-7 | 80 | H | 6 | H | C₄H₉(sec) | 9000 |
| P-8 | 90 | H | 6 | H | C₁₂H₂₅(n) | 21000 |
| P-9 | 60 | CH₃ | 6 | H | CH₃ | 15000 |
| P-10 | 60 | H | 8 | H | CH₃ | 10000 |
| P-11 | 70 | H | 8 | H | C₂H₅ | 24000 |
| P-12 | 70 | H | 8 | H | C₄H₉(n) | 5000 |
| P-13 | 50 | H | 8 | H | C₄H₉(n) | 16000 |
| P-14 | 80 | H | 8 | CH₃ | C₄H₉(iso) | 13000 |
| P-15 | 80 | H | 8 | CH₃ | C₄H₉(t) | 9000 |
| P-16 | 60 | H | 8 | H | ⟨C₆H₁₁⟩ | 7000 |
| P-17 | 80 | H | 8 | H | CH₂CH(C₂H₅)C₄H₉(n) | 8000 |
| P-18 | 90 | H | 8 | H | C₁₂H₂₅(n) | 6000 |
| P-19 | 80 | CH₃ | 8 | CH₃ | C₄H₉(sec) | 18000 |
| P-20 | 70 | CH₃ | 8 | CH₃ | CH₃ | 22000 |

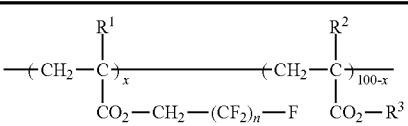

| | x | R¹ | n | R² | R³ | Mw |
|---|---|---|---|---|---|---|
| P-21 | 80 | H | 4 | CH₃ | CH₃ | 11000 |
| P-22 | 90 | H | 4 | H | C₄H₉(n) | 7000 |
| P-23 | 95 | H | 4 | H | C₆H₁₃(n) | 5000 |
| P-24 | 90 | CH₃ | 4 | H | CH₂CH(C₂H₅)C₄H₉(n) | 15000 |
| P-25 | 70 | H | 6 | CH₃ | C₂H₅ | 18000 |
| P-26 | 90 | H | 6 | CH₃ | ⟨C₆H₁₁⟩ | 12000 |
| P-27 | 80 | H | 6 | H | C₄H₉(sec) | 9000 |
| P-28 | 90 | H | 6 | H | C₁₂H₂₅(n) | 21000 |
| P-29 | 60 | CH₃ | 6 | H | CH₃ | 15000 |
| P-30 | 60 | H | 8 | H | CH₃ | 10000 |
| P-31 | 70 | H | 8 | H | C₂H₅ | 24000 |
| p-32 | 70 | H | 8 | H | C₄H₉(n) | 5000 |
| P-33 | 50 | H | 8 | H | C₄H₉(n) | 16000 |
| P-34 | 80 | H | 8 | CH₃ | C₄H₉(iso) | 13000 |
| P-35 | 80 | H | 8 | CH₃ | C₄H₉(t) | 9000 |
| P-36 | 60 | H | 8 | H | ⟨C₆H₁₁⟩ | 7000 |
| P-37 | 80 | H | 8 | H | CH₂CH(C₂H₅)C₄H₉(n) | 8000 |
| P-38 | 90 | H | 8 | H | C₁₂H₂₅(n) | 6000 |
| P-39 | 80 | CH₃ | 8 | CH₃ | C₄H₉(sec) | 18000 |
| P-40 | 70 | CH₃ | 8 | CH₃ | CH₃ | 22000 |

$$-(CH_2-\underset{\underset{CO_2-(CH_2)_p-(CF_2)_q-H}{|}}{\overset{R^1}{C}})_x-(CH_2-\underset{\underset{CO_2-R^3}{|}}{\overset{R^2}{C}})_{100-x}-$$

| | x | R¹ | p | q | R² | R³ | Mw |
|---|---|---|---|---|---|---|---|
| P-41 | 80 | H | 2 | 4 | H | $C_4H_9(n)$ | 18000 |
| P-42 | 90 | H | 2 | 4 | H | $C_8H_{17}(n)$ | 16000 |
| P-43 | 90 | $CH_3$ | 2 | 4 | F | $C_6H_{13}(n)$ | 24000 |
| P-44 | 80 | $CH_3$ | 1 | 6 | F | $C_4H_9(n)$ | 18000 |
| P-45 | 95 | H | 2 | 6 | H | $C_7H_{15}(n)$ | 21000 |
| P-46 | 90 | $CH_3$ | 3 | 6 | H | $CH_3$ | 9000 |
| P-47 | 75 | H | 1 | 8 | F | $CH_3$ | 12000 |
| P-48 | 80 | H | 2 | 8 | H | $CH_2CH(C_2H_5)C_4H_9(n)$ | 34000 |
| P-49 | 90 | $CH_3$ | 2 | 8 | H | $C_7H_{15}(n)$ | 11000 |
| P-50 | 80 | H | 3 | 8 | $CH_3$ | $CH_3$ | 18000 |
| P-51 | 90 | H | 1 | 10 | F | $C_4H_9(n)$ | 27000 |
| P-52 | 95 | H | 2 | 10 | H | $CH_2CH(C_3H_6)C_4H_9(n)$ | 12000 |
| P-53 | 85 | $CH_3$ | 2 | 10 | $CH_3$ | $C_4H_9(n)$ | 20000 |
| P-54 | 80 | H | 1 | 12 | H | $C_6H_{13}(n)$ | 8000 |
| P-55 | 90 | H | 1 | 12 | H | $C_8H_{17}(n)$ | 15000 |
| P-56 | 60 | $CH_3$ | 3 | 12 | $CH_3$ | $C_2H_5$ | 12000 |
| P-57 | 60 | H | 1 | 16 | H | $CH_2CH(C_2H_5)C_4H_9(n)$ | 20000 |
| P-58 | 80 | $CH_3$ | 1 | 16 | H | $C_6H_{13}(n)$ | 17000 |
| P-59 | 90 | H | 1 | 18 | H | $CH_3$ | 34000 |
| P-60 | 60 | H | 3 | 18 | $CH_3$ | $CH_3$ | 19000 |

$$-(CH_2-\underset{\underset{CO_2-(CH_2)_p-(CF_2)_q-F}{|}}{\overset{R^1}{C}})_x-(CH_2-\underset{\underset{CO_2-R^3}{|}}{\overset{R^2}{C}})_{100-x}-$$

| | x | R¹ | p | q | R² | R³ | Mw |
|---|---|---|---|---|---|---|---|
| P-61 | 80 | H | 2 | 4 | H | $C_4H_9(n)$ | 18000 |
| P-62 | 90 | H | 2 | 4 | H | $C_8H_{17}(n)$ | 16000 |
| P-63 | 90 | $CH_3$ | 2 | 4 | F | $C_6H_{13}(n)$ | 24000 |
| P-64 | 80 | $CH_3$ | 1 | 6 | F | $C_4H_9(n)$ | 18000 |
| P-65 | 95 | H | 2 | 6 | H | $C_7H_{15}(n)$ | 21000 |
| P-66 | 90 | $CH_3$ | 3 | 6 | H | $CH_3$ | 9000 |
| P-67 | 75 | H | 1 | 8 | F | $CH_3$ | 12000 |
| P-68 | 80 | H | 2 | 8 | H | $CH_2CH(C_2H_5)C_4H_9(n)$ | 34000 |
| P-69 | 90 | $CH_3$ | 2 | 8 | H | $C_7H_{15}(n)$ | 11000 |
| P-70 | 80 | H | 3 | 8 | $CH_3$ | $CH_3$ | 18000 |
| P-71 | 90 | H | 1 | 10 | F | $C_4H_9(n)$ | 27000 |
| P-72 | 95 | H | 2 | 10 | H | $CH_2CH(C_3H_5)C_4H_9(n)$ | 12000 |
| P-73 | 85 | $CH_3$ | 2 | 10 | $CH_3$ | $C_4H_9(n)$ | 20000 |
| P-74 | 80 | H | 1 | 12 | H | $C_6H_{13}(n)$ | 8000 |
| P-75 | 90 | H | 1 | 12 | H | $C_8H_{17}(n)$ | 15000 |
| P-76 | 60 | $CH_3$ | 3 | 12 | $CH_3$ | $C_2H_5$ | 12000 |
| P-77 | 60 | H | 1 | 16 | H | $CH_2CH(C_2H_5)C_4H_9(n)$ | 20000 |
| P-78 | 80 | $CH_3$ | 1 | 16 | H | $C_6H_{13}(n)$ | 17000 |
| P-79 | 90 | H | 1 | 18 | H | $CH_3$ | 34000 |
| P-80 | 60 | H | 3 | 18 | $CH_3$ | $CH_3$ | 19000 |

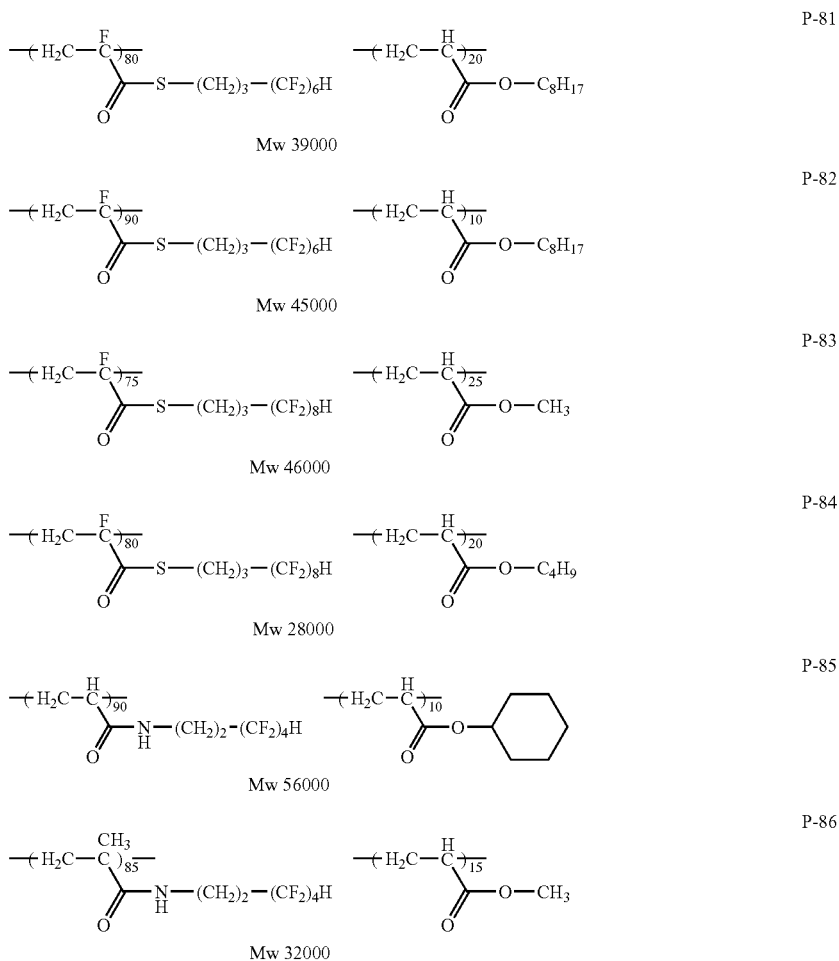

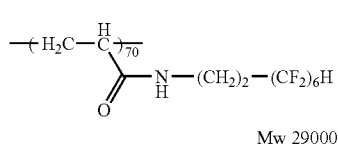 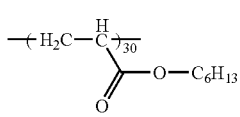
P-87
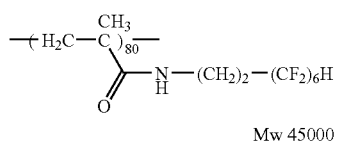 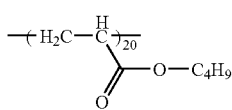
P-88
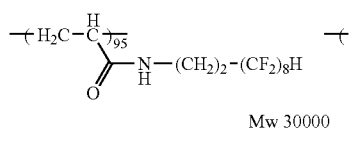 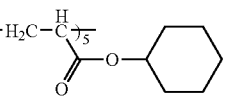
P-89
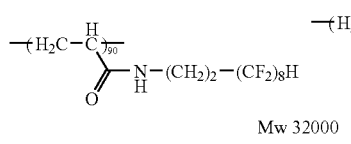 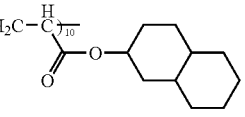
P-90
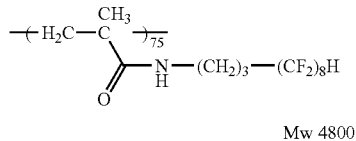 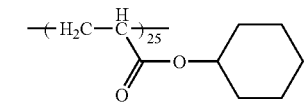
P-91
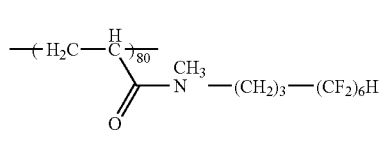 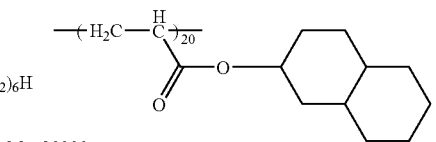
P-92
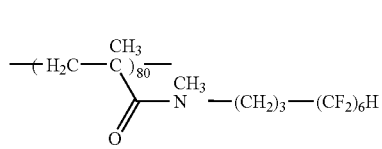 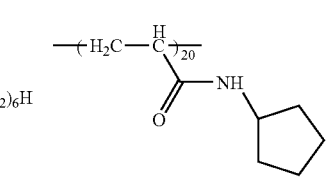
P-93
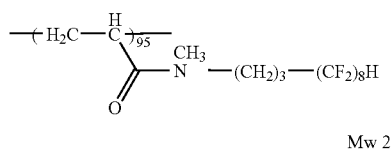 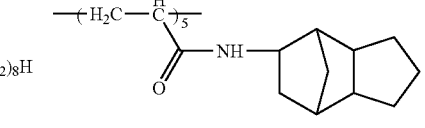
P-94
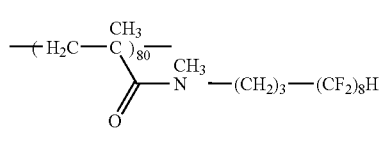 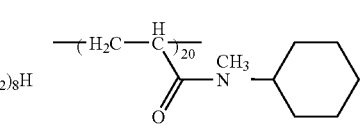
P-95
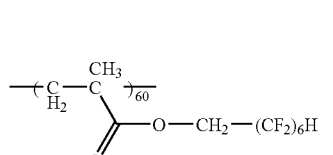 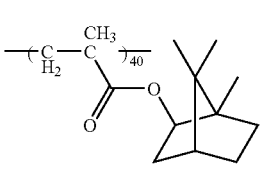
P-96

-continued
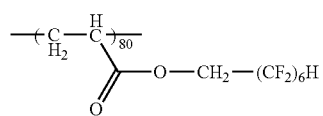 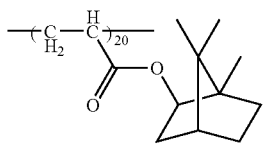 P-97
Mw 18500
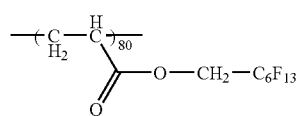 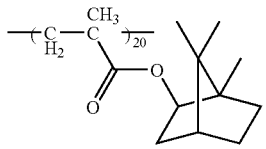 P-98
Mw 25000
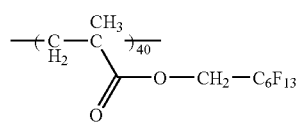 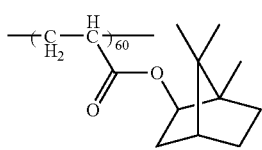 P-99
Mw 15000
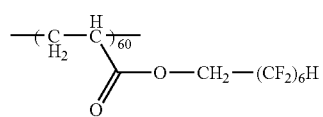 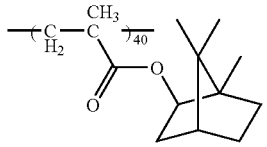 P-100
Mw 14000
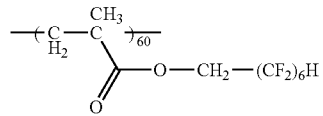 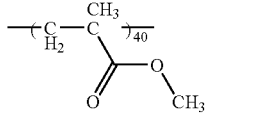 P-101
Mw 12000
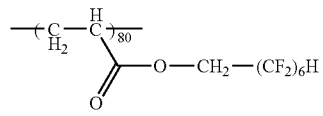 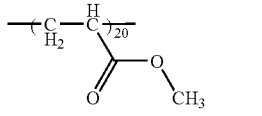 P-102
Mw 15000
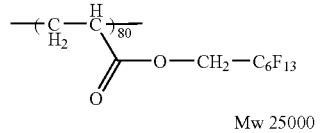 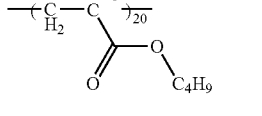 P-103
Mw 25000
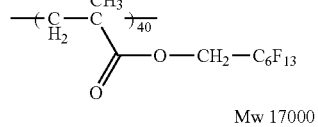 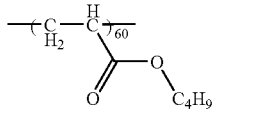 P-104
Mw 17000
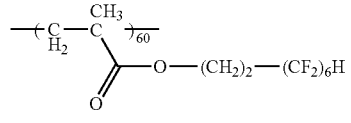 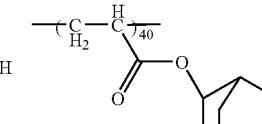 P-105
Mw 14000

-continued
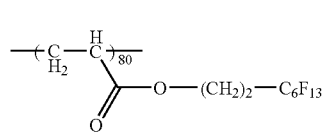 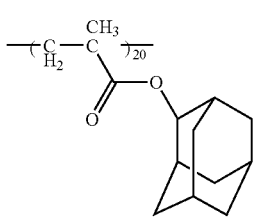   P-106
Mw 39000
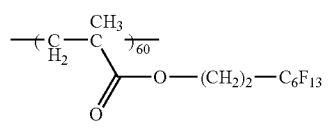 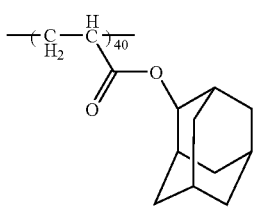   P-107
Mw 45000
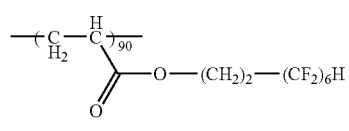 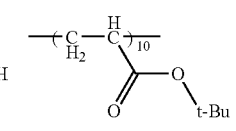   P-108
Mw 14000
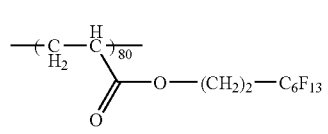 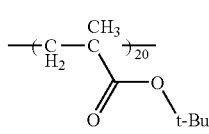   P-109
Mw 39000
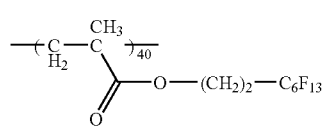 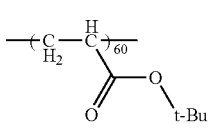   P-110
Mw 14500
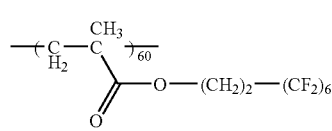 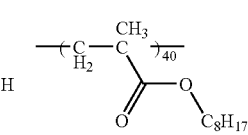   P-111
Mw 12000
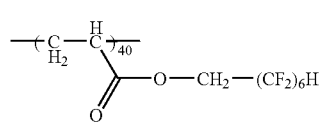 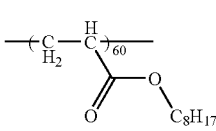   P-112
Mw 15000
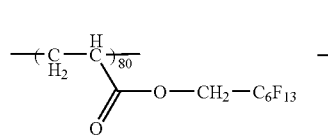 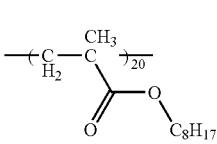   P-113
Mw 25000
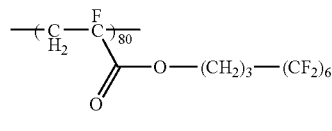 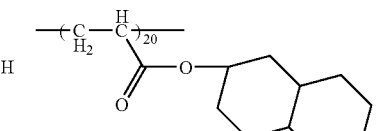   P-114
Mw 12000

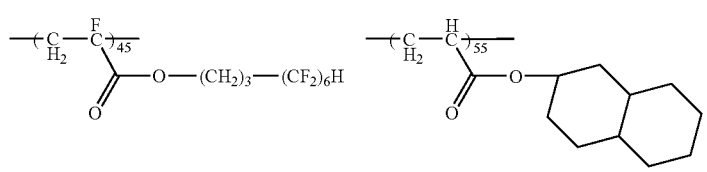 P-115

Mw 18000

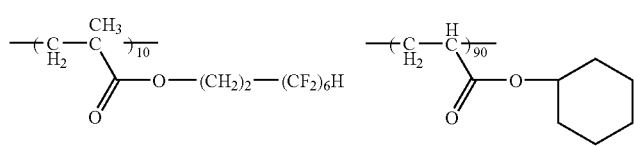 P-116

Mw 15000

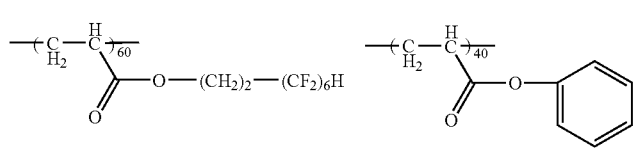 P-117

Mw 18000

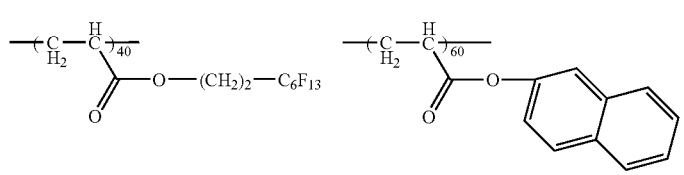 P-118

Mw 19000

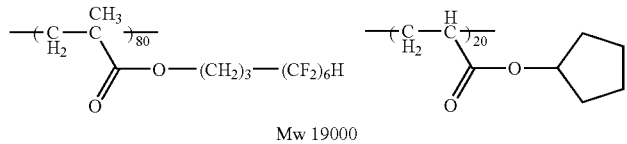 P-119

Mw 19000

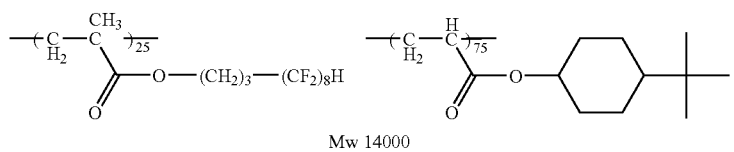 P-120

Mw 14000

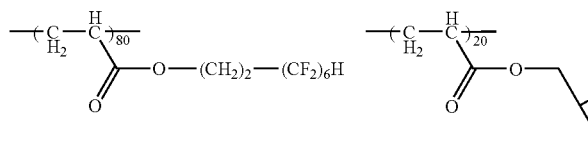 P-121

Mw 18000

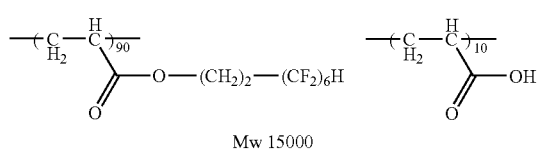 P-122

Mw 15000

The coating composition in the invention contains at least any one of the above fluorine polymers.

The addition amount of the fluorine polymers to the coating composition is preferably from 0.001 to 5.0 mass %, more preferably from 0.01 to 1.0 mass %.

The proportion of the mass of fluorine atoms of the fluorine polymers in the coating composition is preferably from 0.0003 to 3.0 mass %, more preferably from 0.003 to 0.6 mass %.

The coating composition preferably has a moisture content of 30 mass % or less from the point of the improvement of planar condition, more preferably 10 mass % or less.

The coating composition in the invention can contain necessary components such as a binder, inorganic filler, and a dispersion stabilizer according to purposes. One or two or more coating compositions of the invention can be coated on a support to form one or more functional layers to thereby make, e.g., an anti-reflection film and a polarizing plate.

The aforementioned fluorine polymer may be incorporated in any layer of the anti-reflection film. In particular, it is preferred to incorporate in a layer free of any fluorine compound. Specifically, it is preferred to incorporate in the antiglare hard coat layer, the hard coat layer, the middle refractive index layer or a high refractive index layer.

FIG. 1 is a typical cross-sectional view showing the fundamental layer structure of an anti-reflection film according to the invention. An anti-reflection film has a layer structure comprising a transparent support (1), a hard coat layer (2), a middle refractive index layer (3), a high refractive index layer (4), and a low refractive index layer (5).

It is preferred that the optical film thickness, i.e., the product of the refractive index and the film thickness, of each layer of a middle refractive index layer (3), a high refractive index layer (4) and a low refractive index layer (5) of an anti-reflection film having such a five-layer structure is $n\lambda/4$ or so or a multiple of the designed wavelength $\lambda$.

However, for realizing a low reflectance and a reflection characteristic of reduced tint of reflected light in the invention, it is necessary for a middle refractive index layer (3) to satisfy the following equation 1 particularly to the designed wavelength $\lambda$ (from 400 to 680 nm), a high refractive index layer (4) to satisfy the following equation 2, and a low refractive index layer (5) to satisfy the following equation 3, respectively. The designed wavelength $\lambda$ is preferably from 400 to 600 nm, more preferably from 450 to 550 nm, and most preferably from 475 to 525 nm.

$$\lambda/4 \times 0.80 < n1d1 < \lambda/4 \times 1.00 \quad (1)$$

$$\lambda/2 \times 0.75 < n2d2 < \lambda/2 \times 0.95 \quad (2)$$

$$\lambda/4 \times 0.95 < n3d3 < n\lambda/4 \times 1.05 \quad (3)$$

In the above equations, n1 represents the refractive index of a middle refractive index layer (3), d1 represents the thickness (nm) of a middle refractive index layer (3), n2 represents the refractive index of a high refractive index layer (4), d2 represents the thickness (nm) of a high refractive index layer (4), n3 represents the refractive index of a low refractive index layer (5), and d3 represents the thickness (nm) of a low refractive index layer (5).

Further, for instance, to a transparent support having a refractive index of from 1.45 to 1.55 comprising triacetyl cellulose (refractive index: 1.49), it is necessary that n1 is from 1.60 to 1.65, n2 is from 1.85 to 1.95, and n3 is from 1.35 to 1.45, and, for instance, to a transparent support having a refractive index of from 1.55 to 1.65 comprising polyethylene terephthalate (refractive index: 1.66), it is necessary that n1 is from 1.65 to 1.75, n2 is from 1.85 to 2.05, and n3 is from 1.35 to 1.45.

When the materials of a middle refractive index layer (3) and a high refractive index layer (4) having the above refractive indexes cannot be selected, it is well known that a substantially optically equivalent layer to a prescribed middle refractive index layer (3) or a high refractive index layer (4) can be formed by the principle of equivalent film of the combination of a plurality of layers of a layer having a higher refractive index and a layer having a lower refractive index than a prescribed refractive index respectively, and this can be used to realize the refractive index characteristics in the invention.

In the invention, it is possible to use an anti-reflection film having an anti-reflection layer comprising 4 layers or 5 layers having different refractive indexes by using such an equivalent film, in place of the 3 layers comprising the middle refractive index layer (3), the high refractive index layer (4) and the low refractive index layer (5).

Lamination comprising a low refractive index layer (5) as a refractive index layer coated on a transparent support (1) or on a hard coat layer (2) coated on a transparent support (1) can be preferably used as an anti-reflection film.

As shown in FIGS. 2 to 7, lamination comprising a high refractive index layer (4) and a low refractive index layer (5) coated on a transparent support (1) or on a hard coat layer (2) coated on a transparent support (1) can also be preferably used as an anti-reflection film.

Figure 6:
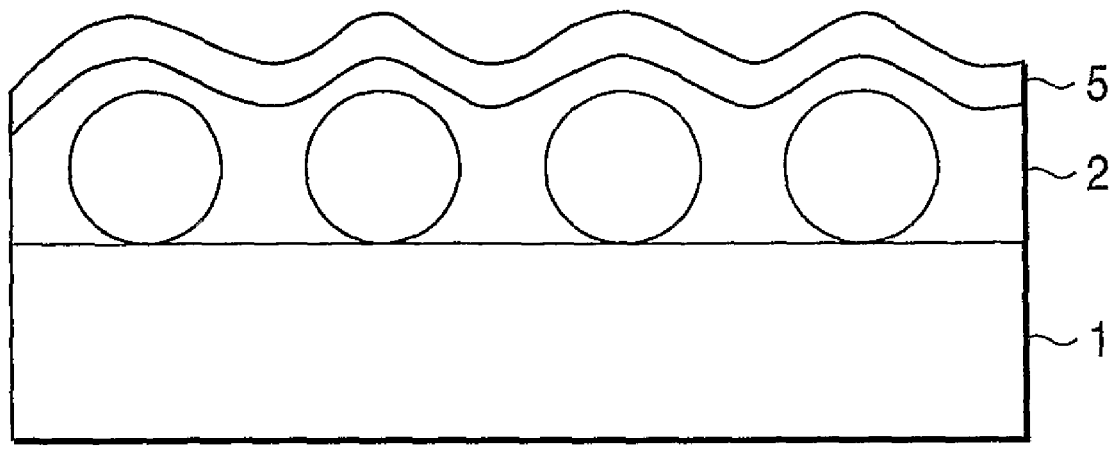
FIG. 6 is a typical cross-sectional view showing the layer structure of an anti-reflection film according to the invention.
Figure 7:
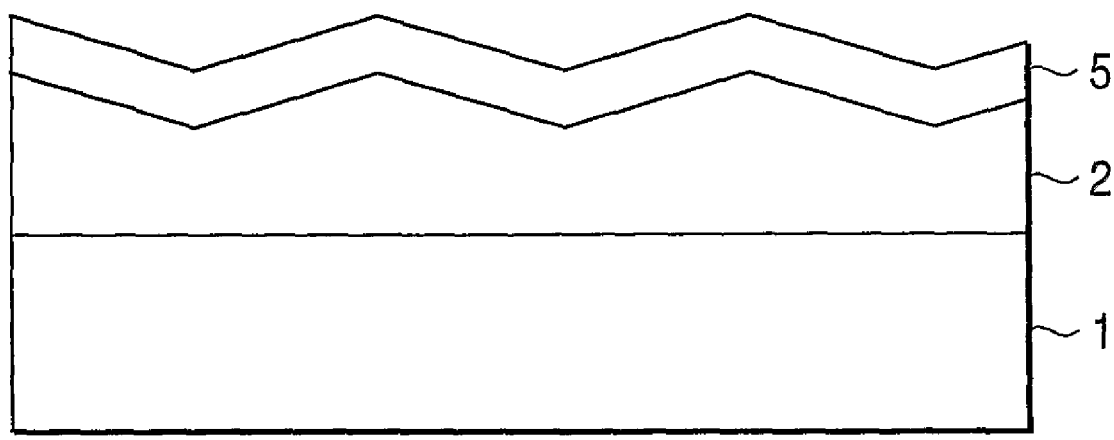
FIG. 7 is a typical cross-sectional view showing the layer structure of an anti-reflection film according to the invention.

A hard coat layer (2) may have a glare-proofing property. Glare-proofing property may comprise dispersion of matting grains as shown in FIG. 6, or glare-proofing property may be given on the surface by emboss process and the like as shown in FIG. 7.

Explanation of Materials of Each Layer:

Substrate Film (Support):

As transparent supports for anti-reflection films in the invention, it is preferred to use plastic films. The examples of materials of the plastic films include cellulose ester (e.g., triacetyl cellulose, diacetyl cellulose, propionyl cellulose, butyryl cellulose, acetylpropionyl cellulose, nitro cellulose), polyamide, polycarbonate, polyester (e.g., polyethylene terephthalate, polyethylene naphthalate, poly1,4-cyclohexanedimethylene terephthalate, polyethylene-1,2-diphenoxyethane-4,4'-dicarboxylate, polybutylene terephthalate), polystyrene (e.g. syndiotactic polystyrene), polyolefin (e.g., polypropylene, polyethylene, polymethyl-pentene), polysulfone, polyether sulfone, polyallylate, polyether imide, polymethyl methacrylate and polyether ketone. Particularly when an anti-reflection film in the invention is used as one side of a surface protective film of a polarizing plate for use in a liquid crystal display, an organic EL display and the like, triacetyl cellulose films are preferably used. As triacetyl cellulose films, well known films, such as TAC-TD80U (manufactured by Fuji Photo Film Co., Ltd.), and those described in Kokai Giho No. 2001-1745 are preferably used. Further, when an anti-reflection film is stuck on a glass substrate for use in plane CRT and PDP, polyethylene terephthalate and polyethylene naphthalate are preferably used. The light transmittance of a transparent support is preferably 80% or more, more preferably 86% or more. The haze of a transparent support is preferably 2.0% or less, more preferably 1.0% or less. The refractive index of a transparent support is preferably from 1.4 to 1.7. The thickness of a transparent support in the invention is not particularly restricted, but the thickness is preferably from 30 to 150 µm, more preferably from 40 to 130 µm, and still more preferably from 70 to 120 µm.

Hard Coat Layer:

A hard coat layer is provided on the surface of a transparent support for the purpose of giving physical strength to an anti-reflection film. It is particularly preferred to provide a hard coat layer between a transparent support and a high refractive index layer. An anti-reflection film may have a hard coat layer as a glare-proof layer, according to the required performances.

It is preferred that a hard coat layer is formed by at least any means of the crosslinking of a curable compound by light irradiation and heating, or by polymerization reaction. For instance, a hard coat layer can be formed by coating a coating composition containing polyester (meth)acrylate, polyurethane (meth)acrylate, a polyfunctional monomer, a polyfunctional oligomer, or a hydrolyzable functional group-containing organic metal compound on a transparent support, and crosslinking or polymerizing the curable compound.

As the curable functional groups, photopolymerizable functional groups are preferred, and as the hydrolyzable functional group-containing organic metal compounds, organic alkoxysilyl compounds are preferred. Specifically, the same compounds as the matrix binders of a high refractive index layer can be exemplified.

As more preferred embodiment, compounds curable by radical polymerization reaction and cationic polymerization reaction are exemplified. As the polymerizable compound, a radical polymerizable group and a cationic polymerizable group may be contained in the same molecule, or the polymerizable compound may be a mixture of compounds containing these groups in different molecules.

As a preferred specific embodiment of a curable composition for forming a hard coat layer, a curable composition comprising a crosslinkable polymer containing a repeating unit represented by the following formula (1), and a compound containing 2 or more ethylenic unsaturated groups in the same molecule can be exemplified, which composition is cured by the polymerization of a ring opening polymerizable group in the crosslinkable polymer and the ethylenic unsaturated groups.

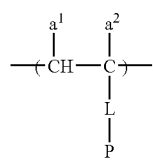

In formula (1), $a^1$ and $a^2$, which may be the same or different, each represents a hydrogen atom, an aliphatic group, —COOR$_1$, or —CH$_2$COOR$_1$, and R$_1$ represents a hydrocarbon group.

P represents a monovalent group containing a ring opening polymerizable group, or an ethylenic unsaturated group.

L represents a single bond or a divalent linking group.

The crosslinkable polymers containing a repeating unit represented by formula (1) are explained in detail. In formula (1), $a^1$ and $a^2$ each represents a hydrogen atom or an aliphatic group, preferably an alkyl group having from 1 to 4 carbon atoms, —COOR$_1$, or —CH$_2$COOR$_1$. R$_1$ represents a hydrocarbon group, preferably an alkyl group having from 1 to 4 carbon atoms, and more preferably a hydrogen atom or a methyl group.

L represents a single bond or a divalent linking group, preferably a single bond, —O—, an alkylene group, an arylene group, *—COO—, *—CONH—, *—OCO— or *—NHCO— (* is the side to be linked to the main chain).

P represents a monovalent group containing a ring opening polymerizable group, or an ethylenic unsaturated group. The monovalent group containing a ring opening polymerizable group is a monovalent group having a cyclic structure, and ring opening polymerization proceeds by the function of a cation, an anion or a radical, and cationic ring opening polymerizable group of heterocyclic compound is particularly preferred. The examples of preferred monovalent groups containing a ring opening polymerizable group include monovalent groups containing a vinyloxy group, or an iminoether ring, e.g., an epoxy ring, an oxetane ring, a tetrahydrofuran ring, a lactone ring, a carbonate ring, or an oxazoline ring. Of these monovalent groups, monovalent groups containing an epoxy ring, an oxetane ring or an oxazoline ring are particularly preferred, and a monovalent group containing an epoxy ring is most preferred.

When P represents an ethylenic unsaturated group, an acryloyl group, a methacryloyl group, a styryl group and a vinyloxycarbonyl group can be exemplified as the preferred ethylenic unsaturated groups.

It is easy and preferred to synthesize a crosslinkable polymer containing a repeating unit represented by formula (1) in the invention by the polymerization of corresponding monomer. In this case, radical polymerization is most simple and preferred as the polymerization reaction.

The preferred specific examples of the repeating units represented by formula (1) are shown below, but the invention is not limited to these compounds.

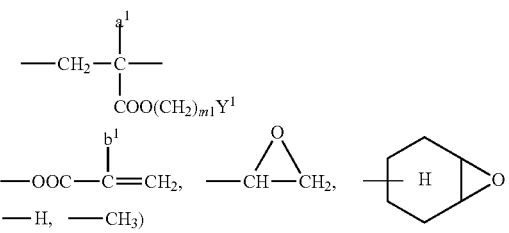

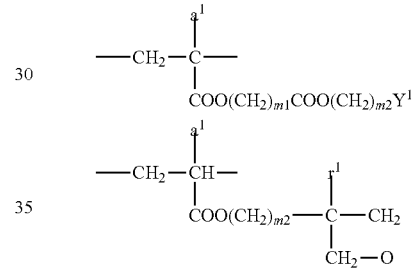

$m^2$: Integer of 1-4

$Y^1$: —H, —CH$_3$, —C$_2$H$_5$

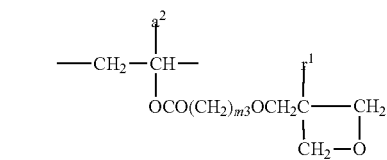

$a^2$: —H, —CH$_3$

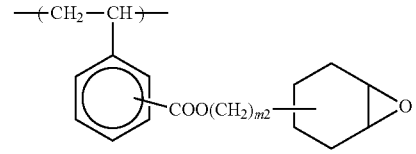

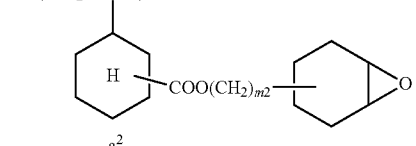

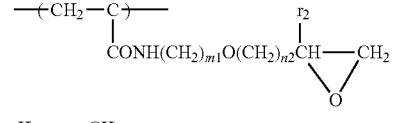

$r^2$: —H, —CH$_3$

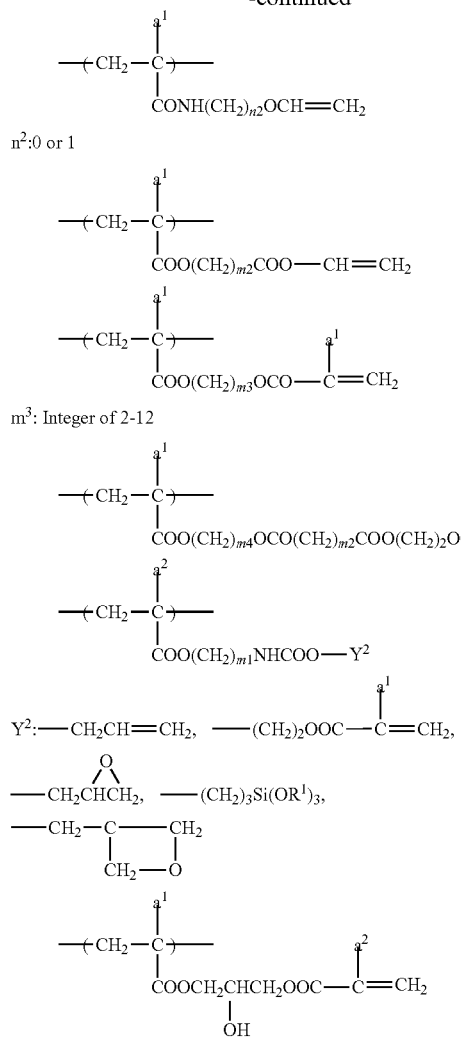

a1: —H or —CH$_3$, m1: Integer of 1 to 10, m4: Integer of 1 to 10, and r1: —H or —CH$_3$ Of the repeating units represented by formula (1) in the invention, more preferred repeating units are repeating units derived from methacrylate or acrylate having an epoxy ring, and particularly preferred examples of them are the repeating units derived from glycidyl methacrylate and alycidyl acrylate.

The crosslinkable polymers containing a repeating unit represented by formula (1) in the invention may be copolymers comprising a plurality of repeating units represented by formula (1), and copolymers especially with the repeating units derived from glycidyl methacrylate and alycidyl acrylate can effectively reduce the shrinkage by curing.

The crosslinkable polymers containing a repeating unit represented by formula (1) may be copolymers containing repeating units other than formula (1). In particular, when it is desired to control Tg and hydrophilic and hydrophobic properties of the crosslinkable polymers, or for the purpose of controlling the content of the ring opening polymerizable groups, copolymers containing repeating units other than repeating units represented by formula (1) can be used. For introducing repeating units other than repeating units represented by formula (1), a method of introducing a corresponding monomer by copolymerization is preferred.

When a repeating unit other than a repeating unit represented by formula (1) is introduced by copolymerization of a corresponding vinyl monomer, the examples of preferably used monomers include esters and amides derived from acrylic acids or α-alkylacrylic acids (e.g., methacrylic acid) (e.g., N-i-propylacrylamide, N-n-butylacrylamide, N-t-butyl-acrylamide, N,N-dimethylacrylamide, N-methylmethacrylamide, acrylamide, 2-acrylamide-2-methylpropanesulfonic acid, acrylamide, propyltrimethylammonium chloride, methacrylamide, diacetonacrylamide, acryloylmorpholine, N-methylolacrylamide, N-methylolmethacrylamide, alkyl ester (meth)acrylate (as the alkyl groups, a methyl group, an ethyl group, a propyl group, a butyl group, a pentyl group, a hexyl group, an octyl group, a decyl group, a dodecyl group, a hexadecyl group, an octadecyl group, etc., are exemplified), 2-hydroxyethyl (meth)acrylate, 2-hydroxypropyl (meth)acrylate, 2-methyl-2-nitropropyl (meth)acrylate, 2-methoxyethyl (meth)acrylate, 2-ethoxyethyl (meth)acrylate, 2-methoxymethoxyethyl (meth)acrylate, 2,2,2-trifluoroethyl (meth)acrylate, 3-methoxybutyl (meth)acrylate, ethylcarbitol (meth)acrylate, phenoxyethyl (meth)acrylate, octafluoropentyl (meth)acrylate, cyclohexyl (meth)acrylate, cyclopentyl (meth)acrylate, 2-isobornyl (meth)acrylate, 2-norbornylmethyl (meth)acrylate, 5-norbornen-2-ylmethyl (meth)acrylate, 3-methyl-2-norbornylmethyl (meth)acrylate, benzyl (meth)acrylate, phenethyl (meth)acrylate, heptadecafluorodecyl (meth)acrylate, and dimethylaminoethyl (meth)acrylate), acrylic acid, α-alkylacrylic acid (e.g., acrylic acid, methacrylic acid, itaconic acid, etc.), vinyl esters (e.g., vinyl acetate), esters derived from maleic acid or fumaric acid (e.g., dimethyl maleate, dibutyl maleate, diethyl fumarate, etc.), maleimides (e.g., N-phenylmaleimide, etc.), sodium salts of maleic acid, fumaric acid or p-styrenesulfonic acid, acrylonitrile, methacrylonitrile, dienes (e.g., butadiene, cyclopentadiene, isoprene), aromatic vinyl compounds (e.g., styrene, p-chlorostyrene, t-butylstyrene, α-methylstyrene, sodium styrene-sulfonate), N-vinylpyrrolidone, N-vinyloxazolidone, N-vinylsuccinimide, N-vinylformamide, N-vinyl-N-methylformamide, N-vinylacetamide, N-vinyl-N-methylacetamide, 1-vinylimidazole, 4-vinylpyridine, vinylsulfonic acid, sodium vinylsulfonate, sodium allylsulfonate, sodium methallyl sulfonate, vinylidene chloride, vinyl alkyl ethers (e.g., methyl vinyl ether), ethylene, propylene, 1-butene and isobutene. Two or more of these vinyl monomers may be used in combination. Besides the above monomers, vinyl monomers described in *Research Disclosure*, No. 19551 (July, 1980) can be used.

Vinyl monomers especially preferably used in the invention are esters and amides derived from acrylic acid or methacrylic acid, and aromatic vinyl compounds.

As the repeating units other than the repeating units represented by formula (1), repeating units having reactive groups other than ring opening polymerizable groups and ethylenic unsaturated groups can also be introduced. In particular, when it is desired to increase the hardness of a hard coat layer, or to increase adhesion between layers in the case where another functional group is used on a substrate or a hard coat layer, copolymers containing a reactive group other than a ring opening polymerizable group can be preferably used. For the introduction of a repeating unit having a reactive group other than a ring opening polymerizable group, a method of introducing a corresponding vinyl monomer (hereinafter referred to as "a reactive monomer") by copolymerization is easy and preferred.

The specific examples of preferred reactive monomers are shown below, but the invention is not limited to these compounds.

Preferred Specific Examples of Reactive Monomers:

The preferred specific examples of reactive monomers include hydroxyl group-containing vinyl monomers (e.g., hydroxyethyl acrylate, hydroxyethyl methacrylate, allyl alcohol, hydroxypropyl acrylate, hydroxypropyl methacrylate, etc.), isocyanate group-containing vinyl monomers (e.g., isocyanate ethyl acrylate, isocyanate ethyl methacrylate, etc.), N-methylol group-containing vinyl monomers (e.g., N-methylolacrylamide, N-methylolmethacrylamide, etc.), carboxyl group-containing vinyl monomers (e.g., acrylic acid, methacrylic acid, itaconic acid, carboxyethyl acrylate, vinyl benzoate), alkyl halide-containing vinyl monomers (e.g., chloromethylstyrene, 2-hydroxy-3-chloropropyl methacrylate), acid anhydride-containing vinyl monomers (e.g., maleic anhydride), formyl group-containing vinyl monomers (e.g., acrolein, methacrolein), sulfinic acid-containing vinyl monomers (e.g., potassium styrenesulfinate), active methylene-containing vinyl monomers (e.g., acetoacetoxyethyl methacrylate), amino group-containing monomers (e.g., allylamine), and alkoxysilyl group-containing monomers (e.g., methacryloyloxypropyltrimethoxysilane, acryloyloxypropyl-trimethoxysilane).

The content of a repeating unit represented by formula (1) in the crosslinkable polymer containing a repeating unit represented by formula (1) is from 30 to 100 mass %, preferably from 50 to 100 mass %, and especially preferably from 70 to 100 mass %. When repeating units other than a repeating unit represented by formula (1) do not contain crosslinking reactive groups, the hardness of the repeating units lowers if too much an amount is used, and when the repeating units contain crosslinking reactive groups, there are cases where curing shrinkage increases or brittleness deteriorates, even if hardness can be maintained. In particular, when crosslinking reaction is accompanied by the molecular weight reduction, e.g., dehydration and dealcoholization, such as the case where a copolymer of an alkoxysilyl group-containing monomer (e.g., methacryloyloxypropyltrimethoxysilane) and a repeating unit represented by formula (1) is used, curing shrinkage is liable to increase. When a repeating unit having a crosslinking reactive group whose molecular weight reduces with the progress of crosslinking reaction is introduced to the crosslinkable polymer containing a repeating unit represented by formula (1) of the invention, the proportion of the content of a repeating unit represented by formula (1) is preferably from 70 to 99 mass %, more preferably from 80 to 99 mass %, and especially preferably from 90 to 99 mol %.

The molecular weight of the crosslinkable polymers containing a repeating unit represented by formula (1) is preferably from 1,000 to 1,000,000 as mass average molecular weight, more preferably from 3,000 to 200,000, and most preferably from 5,000 to 100,000. The mass average molecular weight is a value in terms of polystyrene measured by a GPC method.

Compounds containing two or more ethylenic unsaturated groups in the same molecule that can be used in the invention are described below. The preferred examples of ethylenic unsaturated groups are an acryloyl group, a methacryloyl group, a styryl group and a vinyl ether group, more preferred groups are a methacryloyl group and an acryloyl group, and an especially preferred group is an acryloyl group. It is sufficient for compounds having ethylenic unsaturated groups to have two or more ethylenic unsaturated groups in the molecule, but it is more preferred to have three or more ethylenic unsaturated groups. Above all, compounds having acryloyl groups are preferred. Compounds having from two to six acrylate groups in the molecule referred to as polyfunctional acrylate monomers, and oligomers having several acrylate groups in the molecule and a molecular weight of from several hundreds to several thousands referred to as urethane acrylate, polyester acrylate and epoxy acrylate can be preferably used. Specifically, the same compounds as polyfunctional monomers described above in the high refractive index layer can be exemplified.

It is preferred that these polymerizable compounds are used in combination with polymerization initiators, and specifically the polymerization initiators described in the high refractive index layer can be exemplified.

It is preferred for a hard coat layer to contain inorganic fine grains having the average grain size of primary grains of 300 nm or less, more preferably from 10 to 150 nm, and still more preferably from 20 to 100 nm. The average grain size is a mass average grain size. By using inorganic fine grains having the average grain size of primary grains of 200 nm or less, a hard coat layer whose transparency is not damaged can be formed.

Inorganic fine grains have functions of increasing the hardness of a hard coat layer and restraining the curing shrinkage of a coated layer. Inorganic fine grains are also added to control the refractive index of a hard coat layer.

The specific compositions of a hard coat layer are disclosed, e.g., in JP-A-2002-144913, JP-A-2000-9908 and WO 00/46617 pamphlet.

The content of inorganic fine grains in a hard coat layer is preferably from 10 to 90 mass % based on the total mass of the hard coat layer, and more preferably from 15 to 80 mass %.

As described above, a high refractive index layer can double as a hard coat layer. When a high refractive index layer doubles as a hard coat layer, it is preferred to form the hard coat layer by add inorganic fine grains to the hard coat layer as fine dispersion according to the method as described in the high refractive index layer.

The thickness of a hard coat layer can be appropriately designed according to purposes. The thickness of a hard coat layer is preferably from 0.2 to 15 µm, more preferably from 0.5 to 12 µm, and especially preferably from 0.7 to 10 µm.

The strength of a hard coat layer is preferably H or higher by a pencil hardness test according to JIS K5400, more preferably 2H or higher, and most preferably 3H or higher.

In a taper test according to JIS K5400, the abrasion loss of a sample piece before and after the test is preferably as small as possible.

Glare-Proof Hard Coat Layer:

A glare-proof hard coat layer in the invention is described below.

A glare-proof hard coat layer comprises a binder for providing a hard coat property, matting grains for imparting a glare-proofing property, and inorganic fillers for giving a high refractive index, prevention of shrinkage due to crosslinking and increase of strength.

As the binders, polymers having a saturated hydrocarbon chain or a polyether chain are preferred, and polymers having a saturated hydrocarbon chain as the main chain are more preferred.

Further, it is preferred for the binder polymers to have a crosslinking structure. As the binder polymers having a saturated hydrocarbon chain as the main chain, polymers of ethylenic unsaturated monomers are preferred. As the binder polymers having a saturated hydrocarbon chain as the main chain and a crosslinking structure, polymers comprising monomers having two or more ethylenic unsaturated groups are preferred.

For making a monomer high refractive index, it is preferred to incorporate an aromatic ring, a halogen atom other than a fluorine atom, and at least one atom selected from a sulfur atom, a phosphorus atom and a nitrogen atom into the structure of the monomer.

The examples of the monomers having two or more ethylenic unsaturated groups include esters of polyhydric alcohol and (meth)acrylic acid (e.g., ethylene glycol di(meth)acrylate, 1,4-cyclohexane diacrylate, pentaerythritol tetra(meth)-acrylate, pentaerythritol tri(meth)acrylate, trimethylol-propane tri(meth)acrylate, trimethylolethane tri(meth)-acrylate, dipentaerythritol tetra(meth)acrylate, dipentaerythritol penta(meth)acrylate, dipentaerythritol hexa-(meth)acrylate, pentaerythritol hexa(meth)acrylate, 1,2,3-cyclohexane tetra(meth)acrylate, polyurethane polyacrylate, and polyester polyacrylate), vinylbenzene and derivatives thereof (e.g., 1,4-divinylbenzene, 4-vinylbenzoic acid-2-acryloylethyl ester, and 1,4-divinylcyclohexanone), vinyl sulfone (e.g., divinyl sulfone), acrylamide (e.g., methylene-bisacrylamide), and methacrylamide. These monomers may be in combination of two or more kinds.

As the specific examples of high refractive index monomers, bis(4-methacryloylthiophenyl)sulfide, vinyl-naphthalene, vinylphenyl sulfide, and 4-methacryloxyphenyl-4-methoxyphenyl thioether are exemplified. These monomers can also be used in combination of two or more kinds.

Polymerization of these monomers having an ethylenic unsaturated group can be performed by irradiation with ionizing radiation or heating in the presence of a photo-radical polymerization initiator or a thermal radical polymerization initiator.

Accordingly, an anti-reflection film can be formed by preparing a coating solution containing a monomer having an ethylenic unsaturated group, a photo-radical polymerization initiator or a thermal radical polymerization initiator, matting grains and an inorganic filler, coating the coating solution on a transparent support, and then performing polymerization reaction by irradiation with ionizing radiation or heating to thereby cure the coated layer.

As the photo-radical polymerization initiators, acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums are exemplified. The examples of acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)butanone.
The examples of benzoins include benzoylbenzenesulfonic ester, benzoin-toluenesulfonic ester, benzoin methyl ether, benzoin ethyl ether and benzoin isopropyl ether. The examples of benzophenones include benzophenone, 2,4-dichlorobenzophenone, 4,4-dichlorobenzophenone and p-chlorobenzophenone. The examples of phosphine oxides include 2,4,6-trimethylbenzoyl-diphenylphosphine oxides.

Various examples of photo-radical polymerization initiators are described in *Saishin UV Koka Gijutsu* (*The Latest Techniques of UV Curing*), p. 159, representative publisher, Kazuhiro Takasusuki, published by Joho Gijutsu Kyokai (1991), and these compounds can be used in the invention.

As commercially available photo-cleavage type photo-radical polymerization initiators, Irgacure 651, 184 and 907 (trade names, manufactured by Ciba Geigy Japan Limited) can be preferably used in the invention.

Photo-polymerization initiators are preferably used in an amount of from 0.1 to 15 mass parts per 100 mass parts of the polyfunctional monomer, and more preferably from 1 to 10 mass parts.

A photo-sensitizer may be used in addition to a photo-polymerization initiator. The specific examples of photo-sensitizers include n-butylamine, triethylamine, tri-n-butylphosphine, Michler's ketone and thioxanthone.

As the thermal radical polymerization initiators, organic or inorganic peroxides, organic azo and diazo compounds can be used.

Specifically, the examples of organic peroxides include benzoyl peroxide, halogen benzoyl peroxide, lauroyl peroxide, acetyl peroxide, dibutyl peroxide, cumene hydroperoxide, and butyl hydroperoxide, the examples of inorganic peroxides include hydrogen peroxide, ammonium persulfate, and potassium persulfate, the examples of azo compounds include 2-azo-bis-isobutyronitrile, 2-azo-bis-propionitrile, and 2-azo-bis-cyclohexanedinitrile, and the examples of diazo compounds include diazoaminobenzene and p-nitrobenzenediazonium.

As polymers having a polyether chain as the main chain, ring opening polymers of polyfunctional epoxy compounds are preferred. Ring opening polymerization of a polyfunctional epoxy compound can be effected by irradiation with ionizing radiation or heating in the presence of a photo-acid generator or a heat-acid generator.

Accordingly, an anti-reflection film can be formed by preparing a coating solution containing a polyfunctional epoxy compound, a photo-acid generator or a heat-acid generator, matting grains and an inorganic filler, coating the coating solution on a transparent support, and then performing polymerization reaction with ionizing radiation or heating to thereby cure the coated layer.

In place of or in addition to a monomer having two or more ethylenic unsaturated groups, crosslinkable functional groups may be introduced into a polymer by using a monomer having crosslinkable functional groups, and a crosslinking structure may be introduced to a binder polymer by the reaction of the crosslinkable functional groups.

The examples of crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, cyano acrylate derivative, melamine, etherified methylol, ester and urethane, and metal alkoxide, such as tetramethoxysilane, can also be used as monomers for introducing a crosslinking structure. A functional group showing a crosslinking property as a result of decomposition reaction, such as a block isocyanate group, can also be used as a crosslinkable functional group. That is, in the invention, crosslinkable functional groups may be those that show reactivity as a result of decomposition even if they do not show reactivity at once.

By coating binder polymers having these crosslinkable functional groups and then heating, a crosslinking structure can be formed.

For the purpose of imparting a glare-proof property, matting grains having an average grain size of from 1 to 10 μm, preferably from 1.5 to 7.0 μm, which are greater than filler grains, e.g., grains of inorganic compounds or resin grains, are contained in a glare-proof hard coat layer.

As the specific examples of matting grains, e.g., grains of inorganic compounds, e.g., silica grains and $TiO_2$ grains; and resin grains, e.g., crosslinked acrylic grains, crosslinked styrene grains, melamine resin grains and benzoguanamine resin grains are exemplified. Of these grains, grains of crosslinked acrylic such as crosslinked polymethyl methacrylate are preferred.

Further, two or more matting grains each having different grain size may be used together. It is possible to give a glare-preventing property by smaller size matting grains and give other optical properties by larger size matting grains. For instance, an optical property called dazzle-proof is required when an anti-reflection film is stuck on a high precision display of 133 ppi or more. Dazzle results from the enlargement or reduction of pixels due to slight unevenness of the surface of the anti-reflection film and losing the uniformity of display property. This phenomenon can be greatly improved by using matting grains having a grain size smaller by 5 to 50% than that of the matting grains for providing glare-proofing property.

The grain size distribution of matting grains is preferably monodispersion. The grain sizes of all the grains are preferably equivalent as far as possible. Taking the grains having grain sizes greater than the average grain size by 20% or more as coarse grains, the proportion of the coarse grains is preferably 1% or less of all the grain number, more preferably 0.1% or less, and still more preferably 0.01% or less. Matting grains having such grain size distribution are obtained by classification after ordinary synthesizing reaction. By increasing the number of times of classification or raising the degree of classification, matting grains having more preferred grain size distribution can be obtained.

For increasing the refractive index of a layer, it is preferred to add an inorganic filler to a glare-proof hard coat layer in addition to matting grains. For example, inorganic fillers comprising at least one oxide of metal selected from titanium, zirconium, aluminum, indium, zinc, tin and antimony, and having an average grain size of from 0.5 nm to 0.2 µm, preferably from 1 nm to 0.1 µm, and more preferably from 1 nm to 0.06 µm are preferably used.

Contrary to this, in a glare-proof hard coat layer containing high refractive index matting grains for the purpose of increasing the refractive index difference between the matting grains, it is also preferred to use a silicon oxide for maintaining the refractive index of the layer lowish. The preferred grain size is the same as that of the above inorganic fillers.

The specific examples of inorganic fillers for use in a glare-proof hard coat layer include $TiO_2$, $ZrO_2$, $Al_2O_3$, $In_2O_3$, ZnO, $SnO_2$, $Sb_2O_3$, ITO (indium-tin oxide) and $SiO_2$. $TiO_2$ and $ZrO_2$ are especially preferred for increasing a refractive index. It is also preferred for the surfaces of inorganic fillers to be treated with a silane coupling agent or a titanium coupling agent, and surface treating agents having functional groups capable of reacting with the binder are preferably used on the surfaces of fillers.

The addition amount of these inorganic fillers is preferably from 10 to 90% of the entire mass of the glare-proof hard coat layer, more preferably from 20 to 80%, and especially preferably from 30 to 75%.

These grain sizes of these fillers are sufficiently smaller than the wavelength of light, so that light scattering does not occur and a dispersion comprising a binder polymer having dispersed therein these fillers behaves as an optically uniform material.

The total refractive index of the mixture of a binder and an inorganic filler in a glare-proof hard coat layer in the invention is preferably from 1.48 to 2.00, more preferably from 1.50 to 1.80. The above range of refractive index can be reached by the selection of the ratio of the kinds and amounts of binder and inorganic filler. The selection can be known experimentally in advance.

The thickness of a glare-proof hard coat layer is preferably from 1 to 10 µm, more preferably from 1.2 to 8 µm.

High Refractive Index Layer:

A high refractive index layer in the invention comprises a cured film having a refractive index of from 1.55 to 2.40 formed by coating a curable composition (a composition for forming a high refractive index layer) containing typically at least fine grains of a high refractive index inorganic compound and a matrix binder (hereinafter sometimes referred to as "matrix"), and then curing. The above refractive index is preferably from 1.65 to 2.30, and especially preferably from 1.80 to 2.00. The refractive index of a high refractive index layer in the invention is from 1.55 to 2.40, this is a layer that is called a middle refractive index layer or a high refractive index layer, but this layer is sometimes referred to as a high refractive index layer generally in the following specification.

Composition for High Refractive Index Layer:

High Refractive Index Grains:

High refractive index inorganic fine grains contained in a high refractive index layer in the invention are preferably grains having a refractive index of from 1.80 to 2.80 and the average grain size of primary grains of from 3 to 150 nm. When the refractive index is in the above range, the effect of increasing the refractive index of a film is sufficient and grains are free of coloring. Further, when the average grain size of primary grains is in the above range, a film having a low haze value, that is, transparent, and a high refractive index can be obtained. More preferred inorganic fine grains in the invention are grains having a refractive index of from 1.90 to 2.80 and the average grain size of primary grains of from 3 to 100 nm, more preferably a refractive index of from 1.90 to 2.80 and the average grain size of primary grains of from 5 to 80 nm.

The specific examples of preferred inorganic fine grains having a high refractive index include grains comprising oxide, compound oxide or sulfide of Ti, Zr, Ta, In, Nd, Sn, Sb, Zn, La, W, Ce, Nb, V, Sm and Y as the main component. Here, the main component means a component whose percentage (mass %) is the most among the components constituting a grain. Preferred grains in the invention are grains comprising, as the main component, oxide or compound oxide containing at least one metal element selected from Ti, Zr, Ta, In and Sn. Various elements may be contained in the inorganic fine grains for use in the invention. For example, Li, Si, Al, B, Ba, Co, Fe, Hg, Ag, Pt, Au, Cr, Bi, P and S are exemplified. For increasing the electric conductivity of grains, it is preferred for tin oxide and indium oxide to contain elements such as Sb, Nb, P, B, In, V and halogen, and grains containing about 5 to 20 mass % of antimony oxide are especially preferred.

Particularly preferred inorganic fine grains are inorganic fine grains mainly comprising titanium dioxide containing at least one element selected from Co, Zr and Al (hereinafter sometimes referred to as "specific oxides"). A particularly preferred element is Co. The total content of Co, Al and Zr to Ti is preferably from 0.05 to 30 mass % based on Ti, more preferably from 0.1 to 10 mass %, still more preferably from 0.2 to 7 mass %, especially preferably from 0.3 to 5 mass %, and most preferably from 0.5 to 3 mass %. Co, Al and Zr are present inside or on the surface of inorganic fine grains mainly comprising titanium dioxide. It is more preferred that these elements be present inside of inorganic fine grains mainly comprising titanium dioxide, and to be present both inside and on the surface is most preferred. These specific metal elements may be present in the form of oxides.

As other preferred inorganic grains, fine grains of double oxide comprising a titanium element and at least one metal element selected from metal elements having a refractive index of oxide of 1.95 or higher (hereinafter sometimes abbreviated to "Met"), and the double oxide is doped with at least one metal ion selected from Co ion, Zr ion and Al ion (hereinafter sometimes referred to as "specific double oxide") are exemplified. As the metal elements of metal oxides having a refractive index of 1.95 or higher, Ta, Zr, In, Nd, Sb, Sn and Bi are preferred, Ta, Zr, Sn and Bi are particularly preferred. The content of metal ions to be doped to a double oxide is preferably not more than 25 mass % of the total metal amount (Ti+Met) constituting the double oxide in view of the maintenance of the refractive index. More preferably the content is from 0.05 to 10 mass %, still more preferably from 0.1 to 5 mass %, and most preferably from 0.3 to 3 mass %.

The doped metal ion may be present as a metal ion or a metal atom, and arbitrarily present from the surface to the inside of the double oxide. The doped metal ion is preferably present both on the surface and inside of the double oxide.

Inorganic fine grains for use in the invention preferably have a crystal structure or an amorphous structure. The crystal structure is preferably rutile, mixed crystal of rutile and anatase, or anatase as a main component. It is particularly preferred that rutile structure is a main component. By this crystal structure, it becomes possible that inorganic fine grains of specific oxides or specific double oxides of the invention have a refractive index of from 1.90 to 2.80, preferably from 2.10 to 2.80, and more preferably from 2.20 to 2.80. The photo catalytic activity of titanium dioxide can be restrained by this crystal structure, thus the weather resistance of the high refractive index layer in the invention can be conspicuously improved.

The specific metal elements or metal ions can be doped by well-known methods, e.g., according to the methods described in JP-A-5-330825, JP-A-11-263620, JP-T-11-512336 (the term "JP-T" as used herein means a published Japanese translation of a PCT patent application), EP 0335773, and ion doping methods (e.g., Shun-ichi Gonda, Junzo Ishikawa and Eiji Kamijo compiled, *Ion Beam Oyo Gijutsu* (*Ion Beam Applied Technology*), CMC Publishing Co. (1989), Ko Aoki, *Hyomen Kagaku* (*Superficial Science*), Vol. 18, No. 5, p. 262 (1998), Masakazu Anpo et al., *Hyomen Kagaku* (*Superficial Science*), Vol. 20, No. 2, p. 60 (1999)).

Inorganic fine grains for use in the invention may be subjected to surface treatment. Surface treatment is performed with inorganic compounds and/or organic compounds to modify the surfaces of the inorganic fine grains, by which wetting of the surfaces of inorganic fine grains can be adjusted, and finely graining in an organic solvent and dispersibility and dispersion stability of the inorganic fine grains in a composition for forming a high refractive index layer can be improved. As inorganic compounds capable of modifying grain surfaces by physical adsorption onto the surfaces of grains, e.g., inorganic compounds containing silicon ($SiO_2$, etc.), inorganic compounds containing aluminum ($Al_2O_3$, $Al(OH)_3$, etc.), inorganic compounds containing cobalt ($CoO_2$, $Co_2O_3$, $Co_3O_4$, etc.), inorganic compounds containing zirconium ($ZrO_2$, $Zr(OH)_4$, etc.), and inorganic compounds containing iron ($Fe_2O_3$, etc.) can be exemplified.

As the examples of organic compounds for use in the surface treatment, surface modifiers of inorganic fillers, such as metallic oxides and inorganic pigments so far been known, e.g., the compounds described in *Ganryo Bunsan Anteika to Hyomen Shori Gijutsu-Hyoka* (*Pigment Dispersion Stabilization and Techniques of Surface Treatment-Evaluation*), Chapter 1, published by Gijutsu Joho Kyokai (2001) are exemplified.

Specifically, organic compounds having a polar group having affinity with the surfaces of the inorganic fine grains for use in the invention are exemplified. Compounds called coupling compounds are included in the organic compounds. The examples of the polar groups having affinity with the surfaces of the inorganic fine grains include a carboxyl group, a phosphono group, a hydroxyl group, a mercapto group, a cyclic acid anhydride group, and an amino group are exemplified, and compounds having at least one polar group in the molecule are preferred. For instance, long chain aliphatic carboxylic acids (e.g., stearic acid, lauric acid, oleic acid, linoleic acid, linolenic acid, etc.), polyol compounds (e.g., pentaerythritol triacrylate, dipentaerythritol pentaacrylate, ECH (epichlorohydrin)-modified glycerol triacrylate, etc.), phosphono group-containing compounds (e.g., EO-(ethylene oxide)-modified phosphoric acid triacrylate, etc.), and alkanolamine (e.g., ethylenediamine EO adduct (5 mols), etc.) are exemplified.

As the coupling compounds, conventionally well-known organic metallic compounds including a silane coupling agent, a titanate coupling agent and an aluminate coupling agent are exemplified. A silane coupling agent is most preferred of them. Specifically, the compounds disclosed in JP-A-2002-9908, and paragraphs [0011] to [0015] of JP-A-2001-310423, are exemplified.

Two or more surface treatments can be used in combination.

As fine grains of oxide for use in the invention, fine grains having a core/shell structure with the fine grain as the core and an inorganic compound as the shell are also preferred. As the shell, an oxide comprising at least one element selected from Al, Si and Zr is preferred. The specific examples of the core/shell structures are disclosed in JP-A-2001-166104.

The configuration of inorganic fine grains for use in the invention is not especially restricted but ellipsoidal, spherical, cubic, spindle-like, or amorphous is preferred. Inorganic fine grains may be used alone but two or more kinds of inorganic fine grains can be used in combination.

Dispersant:

For using inorganic grains as stable and prescribed super fine grains, it is preferred to use a dispersant together. As the dispersant, low molecular weight compounds or high molecular weight compounds having a polar group having affinity with the surfaces of the inorganic fine grains are preferred.

The examples of the polar groups include a hydroxyl group, a mercapto group, a carboxyl group, a sulfo group, a phosphono group, an oxyphosphono group, a —P(=O)($R_1$) (OH) group, an —O—P(=O)($R_1$)(OH) group, an amido group (—CONH$R_2$, —SO$_2$NH$R_2$), a cyclic acid anhydride-containing group, an amino group and a quaternary ammonium group.

$R_1$ represents a hydrocarbon group having from 1 to 18 carbon atoms (e.g., a methyl group, an ethyl group, a propyl group, a butyl group, a hexyl group, an octyl group, a decyl group, a dodecyl group, an octadecyl group, a chloroethyl group, a methoxyethyl group, a cyanoethyl group, a benzyl group, a methylbenzyl group, a phenethyl group, a cyclohexyl group, etc.), and $R_2$ represents a hydrogen atom or the same meaning as $R_1$.

In the above polar groups, groups having a dissociable proton may be a salt thereof. The above amino group and quaternary ammonium group may be any of a primary amino group, a secondary amino group or a tertiary amino group, and more preferably a tertiary amino group or a quaternary ammonium group. A group bonded to the nitrogen atom of the secondary amino group, tertiary amino group or quaternary ammonium group is preferably an aliphatic group having from 1 to 12 carbon atoms (the same meaning as the group represented by the above R, etc.). The tertiary amino group may be a cyclic amino group containing a nitrogen atom (e.g., a piperidine ring, a morpholine ring, a piperazine ring, a pyridine ring, etc.), and further the quaternary ammonium group may be the quaternary ammonium groups of these cyclic amino groups. An alkyl group having from 1 to 6 carbon atoms is more preferred.

As the polar groups of the dispersant in the invention, anionic groups having pKa of 7 or less or the salts of these dissociable groups are preferred. A carboxyl group, a sulfo group, a phosphono group, an oxyphosphono group, and the salts of these dissociable groups are especially preferred.

It is preferred for dispersants to further contain a crosslinkable or polymerizable functional group. The examples of crosslinkable or polymerizable functional groups include ethylenic unsaturated groups capable of addition reaction and polymerization reaction by radical seeds (e.g., (meth)acryloyl group, an allyl group, a styryl group, a vinyloxy group, a carbonyl group, a vinyloxy group, etc.), cationic polymerizable groups (e.g., an epoxy group, a thioepoxy group, an oxetanyl group, a vinyloxy group, a spiro-ortho ester group, etc.), and polycondensation reactive groups (e.g., a hydrolyzable silyl group and an N-methylol group), preferably an ethylenic unsaturated group, an epoxy group, and a hydrolyzable silyl group.

Specifically, the compounds disclosed in JP-A-11-153703, U.S. Pat. No. 6,210,858, JP-A-2002-2776069, and JP-A-2001-310423, paragraphs [0013] to [0015] are exemplified.

It is also preferred that the dispersants for use in the invention are polymer dispersants. In particular, polymer dispersants containing anionic groups, and crosslinkable or polymerizable functional groups are exemplified, and these functional groups have the same meaning as described above.

The addition amount of dispersants to inorganic fine grains is preferably from 1 to 100 mass %, more preferably from 3 to 50 mass %, and most preferably from 5 to 40 mass %. Two or more dispersants may be used in combination.

Dispersion Medium:

The dispersion medium used in wet dispersion of inorganic fine grains in the invention can be arbitrarily selected from among water and organic solvents, and liquids having a boiling point of 50° C. or more are preferred, and organic solvents having a boiling point of from 60 to 180° C. are more preferred.

The dispersion medium is preferably used in proportion of from 5 to 50 mass % of the total dispersion composition including inorganic fine particles and a dispersant, more preferably from 10 to 30 mass %. When the dispersion medium is used in this range, dispersing easily progresses and the obtained dispersion has viscosity of good workability.

As the examples of dispersion media, alcohols, ketones, esters, amides, ethers, ether esters, hydrocarbons and halogenated hydrocarbons are exemplified. Specifically, alcohols (e.g., methanol, ethanol, propanol, butanol, benzyl alcohol, ethylene glycol, propylene glycol, ethylene glycol monoacetate, etc.), ketones (e.g., methyl ethyl ketone, methyl isobutyl ketone, cyclohexanone, methyl cyclohexanone, etc.), esters (e.g., methyl acetate, ethyl acetate, propyl acetate, butyl acetate, ethyl formate, propyl formate, butyl formate, ethyl lactate, etc.), aliphatic hydrocarbons (e.g., hexane, cyclohexane), halogenated hydrocarbons (e.g., methyl chloroform, etc.), aromatic hydrocarbons (e.g., benzene, toluene, xylene, etc.), amides (e.g., dimethylformamide, dimethylacetamide, n-methylpyrrolidone, etc.), ethers (e.g., dioxane, tetrahydrofuran, ethylene glycol dimethyl ether, propylene glycol dimethyl ether, etc.), and ether alcohols (e.g., 1-methoxy-2-propanol, ethyl cellosolve, methyl carbinol, etc.) are exemplified. These dispersion media may be used alone or two or more can be used in combination. Preferred dispersion media are toluene, xylene, methyl ethyl ketone, methyl isobutyl ketone, cyclohexanone and butanol. Coating solvent systems mainly comprising a ketone solvent (e.g., methyl ethyl ketone, methyl isobutyl ketone, cyclo-hexanone, etc.) are also preferably used as dispersion media.

Super Fine Graining of Inorganic Fine Grains:

By dispersing inorganic super fine grains having an average grain size of 100 nm or less in a curable coating composition for forming a high refractive index layer in the invention, the liquid stability of the coating composition is improved, and the inorganic fine grains are homogeneously dispersed in the state of super fine grains in the matrix of a cured film formed of the curable coating composition, so that a transparent high refractive index film having uniform optical properties can be obtained. The grain size of the super fine grains present in the matrix of the cured film is preferably from 3 to 100 nm as the average grain size, more preferably from 5 to 100 nm, and most preferably from 10 to 80 nm.

Further, it is preferred that large grains having an average grain size of 500 nm or more are not contained in the composition, and it is especially preferred that large grains having an average grain size of 300 nm or more are not contained, by which specific unevenness described above can be formed on the surface of the cured film.

The dispersion in the size of super fine grains of the high refractive index inorganic grains not containing the coarse grains of the above range can be achieved by a dispersing method according to a wet dispersing method using the above dispersant together with media having an average size of less than 0.8 mm.

As wet dispersers, well-known dispersers, such as a sand grinder mill (e.g., beads mill with pins), a Dyno mill, a high speed impeller, a pebble mill, a roller mill, an attritor, and a colloid mill are exemplified. Particularly for dispersing oxide fine grains in the invention to super fine grains, a sand grinder mill, a Dyno mill and a high speed impeller are preferred.

The media to be used with these dispersers have an average size of less than 0.8 mm, by using media having an average size of this range the grain size of the inorganic fine grains becomes 100 nm or less, and super fine grains having narrow grain size distribution can be obtained. The average size of media is preferably 0.5 mm or less, more preferably from 0.05 to 0.3 mm.

Beads are preferred as the media for use in wet dispersion. Specifically, zirconia beads, glass beads, ceramic beads and steel beads are exemplified, and zirconia beads having a size of from 0.05 to 0.2 mm are especially preferred for the reason of durability such that beads are hardly damaged, and for capable of super fine graining. The dispersing temperature in a dispersing process is preferably from 20 to 60° C., more preferably from 25 to 45° C. When the composition is dispersed to super fine grains at the temperature in this range, re-flocculation and precipitation of dispersed grains do not occur. This is thought due to the fact that the adsorption of dispersant onto the grains of inorganic compound is properly performed, and dispersion stabilization failure by desorption of the dispersant from the grains at room temperature does not occur.

By the above dispersing method, a high refractive index film whose transparency is not damaged, excellent in uniformity of refractive index, film strength and adhesion to the contiguous layer is formed.

Pre-dispersing process may be carried out before the wet dispersing process. Dispersers such as a ball mill, a three-roll mill, a kneader and an extruder are used in pre-dispersing process.

For the dispersed grains in a dispersion to satisfy the average grain size and for the monodispersibility of the grain size to satisfy the above range, it is also preferred to select the material of a filter, so that the coarse coagulated substances in the dispersion are precisely filtered in the separation process of beads. It is preferred that the filter materials in precision filtration have a size of filtering the grains of 25 μm or smaller. The types of filter materials for precision filtration are not especially restricted so long as they have the above performance and, e.g., a filament type, a felt type and a mesh type are exemplified. The materials of filters for precision filtration of a dispersion are not especially limited so long as they have the above performance and are not maleficent to the coating solution and, e.g., stainless steel, polyethylene, polypropylene and nylon are exemplified.

Matrix of High Refractive Index Layer:

A high refractive index layer comprises at least high refractive index inorganic super fine grains and a matrix.

According to a preferred embodiment of the invention, a matrix is formed by coating a high refractive index layer-forming composition containing at least either (i) an organic binder, or (ii) a hydrolyzed product of an organic metal compound having a hydrolyzable functional group and a partial condensation product of the hydrolyzed product, and then curing.

(i) Organic Binder

As organic binders, the following binders are exemplified:
(a) Well-known thermoplastic resin
(b) Combination of a well-known reactive curable resin and a curing agent, or
(c) Combination of a binder precursor (the later-described curable polyfunctional monomer and polyfunctional oligomer) and a polymerization initiator A coating composition for forming a high refractive index layer is prepared from the binder-forming component (a), (b) or (c), and a dispersion containing fine grains of a high refractive index compound oxide and a dispersant. The coating composition is coated on a transparent support and, after a coated layer is formed, the coated layer is cured by a method suited to the binder-forming component, whereby a high refractive index layer is formed. A curing method is selected arbitrarily according to the kind of a binder component. For instance, methods of causing a crosslinking reaction or a polymerization reaction of the curable compounds (e.g., polyfunctional monomers and polyfunctional oligomers) by at least any means of heating and light irradiation are exemplified. Above all, a method of subjecting a curable compound to a crosslinking reaction or a polymerization reaction using the above combination (c) with light irradiation to cure a binder is preferred.

Further, it is preferred that the dispersant contained in a dispersion of fine grains of a high refractive index compound oxide is subjected to a crosslinking reaction or a polymerization reaction simultaneously with the coating of a high refractive index layer-forming coating composition or after coating.

The binder in the thus-prepared cured film takes the form of taking in the anionic group of the dispersant as a result of the crosslinking or polymerization reaction of the dispersant and a curable polyfunctional monomer and a polyfunctional oligomer of the binder precursor. Further, since the anionic group has a function of maintaining the state of dispersion of the inorganic fine grains, the crosslinking or polymerization structure gives a film-forming property to the binder, and physical strength of the cured film containing fine grains of high refractive index inorganic compound, chemical resistance and weather resistance can be improved.

As the thermoplastic resins, e.g., polystyrene resins, polyester resins, cellulose resins, polyether resins, vinyl chloride resins, vinyl acetate resins, vinyl chloride-vinyl acetate copolymer resins, polyacrylic resins, polymethacrylic resins, polyolefin resins, urethane resins, silicone resins and imide resins are exemplified.

It is preferred to use at least any of the above reactive curable resins, i.e., thermosetting resins and ionizing radiation-curable resins. As the thermosetting resins, phenolic resins, urea resins, diallyl phthalate resins, melamine resins, guanamine resins, unsaturated polyester resins, polyurethane resins, epoxy resins, aminoalkyd resins, melamine-urea co-condensation resins, silicone resins, and polysiloxane resins are exemplified. The ionizing radiation-curable resins are resins having at least either functional group of a radical polymerizable unsaturated group (e.g., a (meth)acryloyloxy group, a vinyloxy group, a styryl group, a vinyl group, etc.) or a cationic polymerizable group (e.g., an epoxy group, a thioepoxy group, a vinyloxy group, an oxetanyl group, etc.), and, e.g., a relatively low molecular weight polyester resins, polyether resins, (meth)acrylic resins, epoxy resins, urethane resins, alkyd resins, spiroacetal resins, polybutadiene resins, and polythiol polyene resins are exemplified.

To these reactive curable resins are added, according to necessity, well-known compounds, e.g., curing agents such as crosslinking agents (an epoxy compound, a polyisocyanate compound, a polyol compound, a polyamine compound, a melamine compound, etc.), and polymerization initiators (a UV photo-polymerization initiator, e.g., an azobis compound, an organic peroxide compound, an organic halogen compound, an onium salt compound, a ketone compound, etc.), and polymerization accelerators (an organic metal compound, an acid compound, a basic compound, etc.). Specifically, the compounds described in Shinzo Yamashita and Tosuke Kaneko, *Kakyozai Handbook* (*Handbook of Crosslinking Agent*), Taiseisha Co. (1981) are exemplified.

A preferred method of subjecting a curable compound to a crosslinking reaction or a polymerization reaction using the above combination (c) with light irradiation to cure a binder is primarily described below.

The functional groups of photo-curable polyfunctional monomers and polyfunctional oligomers may be either radical polymerizable groups or cationic polymerizable groups.

As the radical polymerizable functional groups, ethylenic unsaturated groups, e.g., a (meth)acryloyl group, a vinyloxy group, a styryl group and an ally group are exemplified, and a (meth)acryloyl group is especially preferred.

It is preferred to contain a polyfunctional monomer having two or more radical polymerizable groups in the molecule.

As the radical polymerizable polyfunctional monomers, they are preferably selected from the compounds having at least two terminal ethylenic unsaturated bonds, and more preferably compounds having from two to six terminal ethylenic unsaturated bonds. These compounds are widely known in the field of polymer materials, and they can be used in the invention with no limitation. These compounds can have the chemical forms of, e.g., a monomer and a prepolymer, i.e., a dimer, a trimer and an oligomer, a mixture thereof, and a copolymer thereof.

As the examples of the radical polymerizable monomers, unsaturated carboxylic acids (e.g., acrylic acid, methacrylic acid, itaconic acid, crotonic acid, isocrotonic acid, maleic acid, etc.), and esters and amides of these unsaturated carboxylic acids are exemplified, preferably esters of unsaturated carboxylic acids with aliphatic polyhydric alcohol compounds and amides of unsaturated carboxylic acids with aliphatic polyhydric amine compounds are exemplified. Further, addition reactants of esters and amides of unsaturated carboxylic acids having a nucleophilic substituent such as a hydroxyl group, an amino group or a mercapto group with monofunctional or polyfunctional isocyanates or epoxies, and dehydration condensation reactants of the above esters and amides of unsaturated carboxylic acids with polyfunctional carboxylic acids are also preferably used. Further, reactants of esters or amides of unsaturated carboxylic acids having an electrophilic substituent such as an isocyanate group or an epoxy group with monofunctional or polyfunctional alcohols, amines and thiols are also preferably used. As another example, it is also possible to use compounds substituting these unsaturated carboxylic acids with unsaturated phosphonic acids or styrene.

As the aliphatic polyhydric alcohol compounds, alkanediol, alkanetriol, cyclohexanediol, cyclohexanetriol, inositol, cyclohexanedimethanol, pentaerythritol, sorbitol, dipentaerythritol, tripentaerythritol, glycerol and diglycerol are exemplified. As the examples of polymerizable ester compounds of these aliphatic polyhydric alcohol compounds with unsaturated carboxylic acids (monoester and polyester), the compounds disclosed in JP-A-2001-139663, paragraphs [0026] to [0027] are exemplified.

As the examples of other polymerizable esters, e.g., vinyl methacrylate, allyl methacrylate, allyl acrylate, aliphatic alcohol esters disclosed in JP-B-46-27926 (the term "JP-B" as used herein means an "examined Japanese patent publication"), JP-B-51-47334 and JP-A-57-196231, esters having an aromatic skeleton disclosed in JP-A-2-226149, and esters having an amino group disclosed in JP-A-1-165613 are also preferably used.

As the specific examples of polymerizable amide formed of aliphatic polyhydric amine compounds and unsaturated carboxylic acids, methylenebis(meth)acrylamide, 1,6-hexamethylenebis(meth)acrylamide, diethylenetriaminetris(meth)acrylamide, xylylenebis(meth)acrylamide, and compounds having a cyclohexylene structure as disclosed in JP-B-54-21726 are exemplified.

Vinyl urethane compounds containing two or more polymerizable vinyl groups in one molecule (JP-B-48-41708), urethane acrylates (JP-B-2-16765), urethane compounds having an ethylene oxide skeleton (JP-B-62-39418), polyester acrylates (JP-B-52-30490), and photo-curable monomers and oligomers described in *Nippon Setchaku Kyokaishi* (*Bulletin of Japan Adhesion Association*), Vol. 20, No. 7, pp. 300 to 308 (1984) can also be used.

These radical polymerizable polyfunctional monomers may be used in combination of two or more.

Compounds containing cationic polymerizable groups that can be used for forming a binder for a high refractive index layer (hereinafter sometimes referred to as "cationic polymerizable compound" or "cationic polymerizable organic compound") are described below.

As the cationic polymerizable compound for use in the invention, compounds capable of causing at least either a polymerization reaction or a crosslinking reaction when irradiated with actinic energy rays in the presence of an actinic energy-sensitive cationic polymerization initiator can be used. As representative examples, an epoxy compound, a cyclic thioether compound, a cyclic ether compound, a spiro-ortho ester compound and a vinyl ether compound can be exemplified. In the invention, the cationic polymerizable organic compounds may be used alone, or may be used two or more in combination.

As cationic polymerizable group-containing compounds, the number of cationic polymerizable groups in one molecule is preferably from 2 to 10, and especially preferably from 2 to 5. The molecular weight of these compounds is 3,000 or less, preferably from 200 to 2,000, and particularly preferably from 400 to 1,500. When the molecular weight is too small, a problem of evaporation arises in a film-forming process, while when the molecular weight is too great, the compatibility with a high refractive index layer-forming composition lowers.

As the epoxy compounds, aliphatic epoxy compounds and aromatic epoxy compounds are exemplified.

As the aliphatic epoxy compounds, e.g., aliphatic polyhydric alcohols and polyglycidyl ether of alkylene oxide addition product of polyhydric alcohol, polyglycidyl ester of aliphatic long chain polybasic acid, homopolymers and copolymers of glycidyl acrylate and glycidyl methacrylate can be exemplified. In addition to the above epoxy compounds, e.g., monoglycidyl ethers of aliphatic higher alcohols, glycidyl esters of higher fatty acids, epoxidized soybean oil, butyl epoxystearate, octyl epoxystearate, epoxidized linseed oil, and epoxidized polybutadiene can be exemplified. As alicyclic epoxy compounds, polyglycidyl ether of polyhydric alcohol having at least one alicyclic ring, or cyclohexene oxide- or cyclopentene oxide-containing compounds obtained by epoxidizing unsaturated alicyclic ring (e.g., cyclohexene, cyclopentene, dicyclooctene, tricyclodecene)-containing compounds with a proper oxidant, e.g., hydrogen peroxide or peracid, can be exemplified.

As the aromatic epoxy compounds, e.g., monohydric or polyhydric phenols having at least one aromatic nucleus, and mono- and polyglycidyl ethers of alkylene oxide adducts of the monohydric or polyhydric phenols can be exemplified. As the specific examples of these epoxy compounds, the compounds disclosed in JP-A-11-242101, paragraphs from [0084] to [0086], the compounds disclosed in JP-A-10-158385, paragraphs from [0044] to [0046] are exemplified.

Of these epoxy compounds, aromatic epoxide and alicyclic epoxide are preferred for their quick-curing property, and alicyclic epoxide is especially preferred. In the invention, these epoxy compounds may be used alone, or two or more of these compounds may be used in arbitrary combination.

As the cyclic thioether compounds, the above compounds having a thioepoxy ring in place of the epoxy ring are exemplified.

As the compounds containing an oxetanyl group as cyclic ether, specifically, e.g., the compounds disclosed in JP-A-2000-239309, paragraphs from [0024] to [0025] are exemplified. It is preferred that these compounds are used in combination with an epoxy group-containing compound.

As the spiro-ortho ester compounds, the compounds disclosed in JP-T-2000-506908 can be exemplified.

As the vinyl hydrocarbon compounds, styrene compounds, vinyl group-substituted alicyclic hydrocarbon compounds (e.g., vinylcyclohexane, vinylbicycloheptene, etc.), propenyl compounds (*Journal of Polymer Science: Part A: Polymer Chemistry*, Vol. 32, 2895 (1994)), alkoxyallene compounds (*Journal of Polymer Science: Part A: Polymer Chemistry*, Vol. 33, 2493 (1995)), vinyl compounds (*Journal of Polymer Science: Part A: Polymer Chemistry*, Vol. 34, 1015 (1996), and JP-A-2002-29162), and isopropenyl compounds (*Journal of Polymer Science: Part A: Polymer Chemistry*, Vol. 34, 2051 (1996)) can be exemplified.

These compounds may be used in combination of arbitrary two or more kinds.

As the polyfunctional compounds in the invention, it is preferred to use a compound containing at least one group selected from the above radical polymerizable groups and at least one group selected from cationic polymerizable groups in the molecule. For example, the compounds disclosed in JP-A-8-277320, paragraphs from [0031] to [0052] and JP-A-2000-191737, paragraph [0015] are exemplified, however the compounds for use in the invention are not limited thereto.

It is preferred to contain the radical polymerizable compound and cationic polymerizable compound in mass ratio of radical polymerizable compound/cationic polymerizable compound of from 90/10 to 20/80, more preferably from 80/20 to 30/70.

Polymerization initiators for use in combination with the binder precursor in the above combination (c) are described in detail below.

As the polymerization initiators, thermal polymerization initiators and photo-polymerization initiators are exemplified.

Polymerization initiator (L) in the invention is a compound capable of generating a radical or an acid by any means of light irradiation and heating. It is preferred that the maximum absorption wavelength of polymerization initiator (L) for use in the invention is 400 nm or lower. By bringing absorption wavelength into the ultraviolet region like this, handling under safelight becomes possible. In addition, compounds having maximum absorption wavelength in the near infrared region can also be used.

In the first place compound (L1) generating a radical is described in detail.

Radical-generating compound (L1) preferably used in the invention is a compound generating a radical by irradiation with light and/or heat to thereby initiate and accelerate the polymerization of a compound having a polymerizable unsaturated group.

As radical-generating compound (L1), well-known polymerization initiators and compounds having a bond small in bond and dissociation energy can be arbitrarily selected and used. Radical-generating compounds can be used alone or in combination of two or more.

As radical-generating compounds, e.g., well-known organic peroxide compounds, thermal radical polymerization initiators such as azo polymerization initiators, and photo-radical polymerization initiators such as amine compounds (JP-B-44-20189), organic halide compounds, carbonyl compounds, metallocene compounds, hexaarylbiimidazole compounds, organic boric acid compounds, and disulfone compounds are exemplified.

As the specific examples of the organic halide compounds, the compounds described, e.g., in Wakabayashi et al., *Bull. Chem. Soc. Japan,* 42, 2924 (1969), U.S. Pat. No. 3,905,815, JP-A-63-298339, M. P. Hutt, *Journal of Heterocyclic Chemistry,* 1, No. 3 (1970) are exemplified, in particular, oxazole compounds substituted with a trihalomethyl group, i.e., S-triazine compounds, are especially exemplified.

More preferably, s-triazine derivatives in which at least one mono-, di- or trihalogen-substituted methyl group is bonded to the s-triazine ring are exemplified.

As the examples of other organic halide compounds, the ketones, sulfides, sulfones, and nitrogen-containing heterocyclic rings disclosed in JP-A-5-27830, paragraphs from [0039] to [0048] are exemplified.

As the examples of the carbonyl compounds, the compounds described in *Saishin UV Koka Gijutsu* (*The Latest Techniques of UV Curing*), pp. 60-62, published by Joho Gijutsu Kyokai (1991), JP-A-8-134404, paragraphs from [0015] to [0016], JP-A-11-217518, paragraphs from [0029] to [0031] are exemplified, e.g., acetophenone, hydroxyacetophenone, benzophenone, thioxane, benzoin compounds, such as benzoin ethyl ether and benzoin isobutyl ether, benzoic ester derivatives, such as ethyl p-dimethylaminobenzoate and ethyl p-diethylaminobenzoate, benzyl dimethyl ketal, and acylphosphine oxide are exemplified.

As the examples of the organic peroxide compounds, the compounds disclosed in JP-A-2001-139663, paragraph [0019] are exemplified.

As the examples of the metallocene compounds, various titanocene compounds disclosed in JP-A-2-4705 and JP-A-5-83588, and iron-allene complexes disclosed in JP-A-1-304453 and JP-A-1-152109 are exemplified.

As the examples of the hexaarylbiimidazole compounds, various compounds disclosed in JP-B-6-29285, U.S. Pat. Nos. 3,479,185, 4,311,783 and 4,622,286 are exemplified.

As the examples of the organic borate compounds, the organic borate compounds disclosed in Japanese Patent 2764769, JP-A-2002-116539, and Kunz, Martin, *Rad Tech' 98, Proceeding Apr.* 19-22, 1998, Chicago, and the compounds disclosed in JP-A-2002-116539, paragraphs from [0022] to [0027] are exemplified.

As the examples of other organic boron compounds, the organic boron transition metal coordination complexes disclosed in JP-A-6-348011, JP-A-7-128785, JP-A-7-140589, JP-A-7-306527 and JP-A-7-292014 are exemplified.

As the examples of the sulfone compounds, the compounds disclosed in JP-A-5-239015, and as the examples of the disulfone compounds, the compounds represented by formulae (II) and (III) in JP-A-61-166544 are exemplified.

These radical-generating compounds may be used alone or two or more compounds may be used in combination. The addition amount of radical-generating compounds is from 0.1 to 30 mass % to the total amount of radical polymerizable monomers, preferably from 0.5 to 25 mass %, and especially preferably from 1 to 20 mass %. When the addition amount is in this range, a composition for a high refractive index layer having high aging stability and high polymerizability can be obtained.

Photo-acid generator (L2) that can be used as polymerization initiator (L) is described in detail below.

As photo-acid generator (L2), a photo-initiator of photo-cationic polymerization, a photo-decoloring agent of dyes, a photo-discoloring agent, and well-known acid generators and well-known compounds and mixtures of these compounds used in micro-resists can be exemplified.

In addition, as photo-acid generator (L2), e.g., an organic halide compound and a disulfone compound are exemplified. The specific examples of the organic halide compound and the disulfone compound are the same as those exemplified in the above radical-generating compounds.

The examples of onium compounds include diazonium salt, ammonium salt, iminium salt, phosphonium salt, iodonium salt, sulfonium salt, arsonium salt and selenonium salt, and specific examples are disclosed in JP-A-2002-29162, paragraphs from [0058] to [0059].

As photo-acid generator (L2) particularly preferably used in the invention, onium salts are exemplified, and diazonium salt, iodonium salt, sulfonium salt and iminium salt are especially preferred for photosensitivity of photo-polymerization initiators and material stability of compounds.

As the specific examples of onium salts that can be preferably used in the invention, the aluminized sulfonium salts disclosed in JP-A-9-268205, paragraph [0035], diaryliodonium salts or triarylsulfonium salts disclosed in JP-A-2000-71366, paragraphs [0010] to [0011], sulfonium salt of S-phenyl ester thiobenzoate disclosed in JP-A-2001-133696, paragraphs from [0030] to [0033] are exemplified.

As other examples of acid generators, organic metal/organic halide compounds, photo-acid generators having an o-nitrobenzyl type protective group, and compounds generating a sulfonic acid by photo-decomposition (iminosulfonate, etc.) disclosed in JP-A-2002-29162, paragraphs from [0059] to [0062] are exemplified.

These acid generators may be used alone, or two or more acid generators may be used in combination. The addition amount of these acid generators is from 0.1 to 20 mass % of the total mass of the entire cationic polymerizable monomers, preferably from 0.5 to 15 mass %, and especially preferably from 1 to 10 mass %. The addition amount of the above range is preferred from the stability of the high refractive index layer composition and polymerization reactivity.

It is preferred for the high refractive index layer composition of the invention to contain from 0.5 to 10 mass % of a radical polymerization initiator and from 1 to 10 mass % of a cationic polymerization initiator to the total mass of the radical polymerization initiator and the cationic polymerization initiator, more preferably contain from 1 to 5 mass % of a radical polymerization initiator and from 2 to 6 mass % of a cationic polymerization initiator.

When a polymerization reaction is performed by ultraviolet irradiation, the high refractive index layer composition in the invention may contain well-known ultraviolet spectral sensitizer and chemical sensitizer in combination. For example, Michler's ketone, amino acid (glycine, etc.), organic amine (butylamine and dibutylamine) are exemplified.

When a polymerization reaction is performed by near infrared irradiation, it is preferred to use a near infrared spectral sensitizer in combination.

As the near infrared spectral sensitizers to be used in combination, light-absorbing substances having absorption band at least a part of the wavelength region of 700 nm or higher are sufficient, and compounds having a value of molar extinction coefficient of 10,000 or more are preferred. Compounds having absorption in the region of from 750 to 1,400 nm, and a value of molar extinction coefficient of 20,000 or more are preferred. It is more preferred that the valley of absorption is in the visible ray wavelength of from 420 to 700 nm and optically transparent. As near infrared spectral sensitizers, various pigments and dyes known as near infrared absorbing pigments and near infrared absorbing dyes can be used. It is especially preferred to use well-known near infrared absorbers.

Commercially available dyes and the dyes described in literatures can be used, e.g., *Kagaku Kogyo* (*Chemical Industry*), pp. 45-51, "Near Infrared Absorbing Dyes", May (1986), 90 *Nendai Kinosei Shikiso no Kaihatsu to Shiji Doko* (*Development of Functional Dyes and the Trend of Market in the 1990s*), Chap. 2, Item 2.3 (1990), CMC Publishing Co., Ltd., *Tokushu Kino Shikiso* (*Special Functional Dyes*), compiled by Ikemori and Hashiratani (1986), CMC Publishing Co., Ltd., J. Fabian, *Chem. Rev.*, 92, pp. 1197-1226 (1992), catalogs published by Nippon Kanko Shikiso Kenkyu-sho in 1995, catalogs of laser dyes published by Exciton Inc. in 1989, and various patent specifications are exemplified.

(ii) Organic Metal Compound Having Hydrolyzable Functional Group:

As the matrix of a high refractive index layer in the invention, it is preferred to form a cured film by a sol/gel reaction with an organic metal compound containing a hydrolyzable functional group after film coating. As the organic metal compounds, compounds comprising Si, Ti, Zr and Al are exemplified. As the hydrolyzable functional groups, an alkoxyl group, an alkoxycarbonyl group, a halogen atom and a hydroxyl group are exemplified, and an alkoxyl group, such as a methoxy group, an ethoxy group, a propoxy group, or a butoxy group is especially preferred. Preferred organic metal compounds are an organic silicon compound represented by the following formula (1') and a partially hydrolyzed product (partially condensed product) of the compound. It is a well-known fact that an organic silicon compound represented by formula (1') is easily hydrolyzed and continuously a dehydration condensation reaction occurs.

$$(R^a)_m\text{—Si}(X)_n \quad (1')$$

In formula (1'), $R^a$ represents a substituted or unsubstituted aliphatic group having from 1 to 30 carbon atoms, or an aryl group having from 6 to 14 carbon atoms, X represents a halogen atom (e.g., a chlorine atom, a bromine atom, etc.), an OH group, an $OR^2$ group or an $OCOR^2$ group, $R^2$ represents a substituted or unsubstituted alkyl group, m represents an integer of from 0 to 3, and n represents an integer of from 1 to 4, and the sum total of m and n is 4, provided that when m is 0, X represents an $OR^2$ group or an $OCOR^2$ group.

In formula (1'), the aliphatic group represents by $R^a$ preferably is an aliphatic group having from 1 to 18 carbon atoms (e.g., methyl, ethyl, propyl, butyl, pentyl, hexyl, octyl, decyl, dodecyl, hexadecyl, octadecyl, benzyl, phenethyl, cyclohexyl, cyclohexylmethyl, hexenyl, decenyl, dodecenyl, etc.), more preferably from 1 to 12 carbon atoms, and especially preferably from 1 to 8.

The aryl group represented by $R^a$ is a phenyl group, a naphthyl group or an anthranyl group, and a phenyl group is preferred.

The substituents are not particularly restricted, and preferably a halogen atom (e.g., fluorine, chlorine, bromine, etc.), a hydroxyl group, a mercapto group, a carboxyl group, an epoxy group, an alkyl group (e.g., methyl, ethyl, i-propyl, propyl, t-butyl, etc.), an aryl group (e.g., phenyl, naphthyl, etc.), an aromatic heterocyclic group (e.g., furyl, pyrazolyl, pyridyl, etc.), an alkoxyl group (e.g., methoxy, ethoxy, i-propoxy, hexyloxy, etc.), an aryloxy group (e.g., phenoxy, etc.), an alkylthio group (e.g., methylthio, ethylthio, etc.), an arylthio group (e.g., phenylthio, etc.), an alkenyl group (e.g., vinyl, 1-propenyl, etc.), an alkoxysilyl group (e.g., trimethoxysilyl, triethoxysilyl, etc.), an acyloxy group (e.g., acetoxy, (meth)acryloyl, etc.), an alkoxycarbonyl group (e.g., methoxycarbonyl, ethoxycarbonyl, etc.), an aryloxycarbonyl group (e.g., phenoxycarbonyl, etc.), a carbamoyl group (e.g., carbamoyl, N-methylcarbamoyl, N,N-dimethylcarbamoyl, N-methyl-N-octylcarbamoyl, etc.), and an acylamino group (e.g., acetylamino, benzoylamino, acrylamino, methacrylamino, etc.) are exemplified.

Of these substituents, a hydroxyl group, a mercapto group, a carboxyl group, an epoxy group, an alkyl group, an alkoxysilyl group, an acyloxy group and acylamino group are more preferred, and an epoxy group, a polymerizable acyloxy group ((meth)-acryloyl), a polymerizable acylamino group (acrylamino, methacrylamino) are especially preferred. These substituents may further be substituted.

$R^2$ represents a substituted or unsubstituted alkyl group, and the explanation of the substituents of the alkyl group is the same as that in $R^1$.

m represents an integer of from 0 to 3, and n represents an integer of from 1 to 4, and the sum total of m and n is 4. m is preferably 0, 1 or 2, especially preferably 1. When m is 0, X represents an $OR^2$ group or an $OCOR^2$ group.

The content of the compound represented by formula (1') is preferably from 10 to 80 mass % of the total solids content of the high refractive index layer, more preferably from 20 to 70 mass %, and especially preferably from 30 to 50 mass %.

The specific examples of the compounds represented by formula (1') are disclosed in JP-A-2001-166104, paragraphs from [0054] to [0056].

In a high refractive index layer, it is preferred for an organic binder to contain a silanol group. By containing a silanol group, the physical strength, chemical resistance and weather resistance of the high refractive index layer can be further improved.

The silanol group can be introduced to a binder, for example, by blending an organic silicon compound represented by (1') having a crosslinkable or polymerizable functional group, as a binder-forming component constituting a coating composition for forming a high refractive index layer, with the coating composition together with a binder precursor (a curable polyfunctional monomer or a polyfunctional oligomer), a polymerization initiator, and a dispersant contained in a dispersion of high refractive index inorganic fine grains, coating the coating composition on a transparent support, and subjecting the dispersant, polyfunctional monomer or polyfunctional oligomer, and organic silicon compound represented by (1') to a crosslinking reaction or a polymerization reaction.

It is preferred to perform hydrolysis and condensation reaction for curing the organic metal compound in the presence of a catalyst. As the catalyst, inorganic acids, e.g., hydrochloric acid, sulfuric acid and nitric acid, organic acids, e.g., oxalic acid, acetic acid, formic acid, trifluoroacetic acid, methanesulfonic acid and toluenesulfonic acid, inorganic bases, e.g., sodium hydroxide, potassium hydroxide and ammonia, organic bases, e.g., triethylamine and pyridine, metal alkoxides, e.g., triisopropoxyaluminum, tetrabutoxyzirconium and tetrabutoxytitanate, and metal chelating compounds, e.g., β-diketones and β-keto esters are exemplified. Specifically, the compounds disclosed in JP-A-2000-275403, paragraphs from [0071] to [0083] are exemplified.

The proportion of these catalysts in the composition is from 0.01 to 50 mass % based on the organic metal compounds, preferably from 0.1 to 50 mass %, and more preferably from 0.5 to 10 mass %. The reaction condition is preferably arbitrarily adjusted by the reactivity of the organic metal compounds.

It is preferred for the matrix in a high refractive index layer to have a specific polar group.

As the specific polar groups, an anionic group, an amino group and a quaternary ammonium group are exemplified. As the specific examples of the anionic group, amino group and quaternary ammonium group, the same groups as described in the above dispersant are exemplified.

The matrix of a high refractive index layer having a specific polar group can be obtained by blending a dispersion containing high refractive index inorganic fine grains and a dispersant, at least either a combination of a binder precursor having a specific polar group (a curable polyfunctional monomer or oligomer having a specific polar group) and a polymerization initiator, or a combination of an organic silicon compound represented by formula (1') having a specific polar group and a crosslinkable or polymerizable functional group, as a curable film-forming component, and further, if necessary, blending a monofunctional monomer having a specific polar group and a crosslinkable or polymerizable functional group, with a high refractive index layer-forming coating composition, coating the coating composition on a transparent support, and subjecting the dispersant, at least any of monofunctional monomer, polyfunctional monomer, polyfunctional oligomer, and organic silicon compound represented by (1'), to a crosslinking reaction or a polymerization reaction.

The monofunctional monomer having a specific polar group functions as an auxiliary dispersant of inorganic fine grains in a coating composition. Further, by crosslinking reaction or polymerization reaction with a dispersant, a polyfunctional monomer and a polyfunctional oligomer after coating to form a binder, good uniform dispersibility of inorganic fine grains can be maintained, and a high refractive index layer having excellent physical strength, chemical resistance and weather resistance can be manufactured.

The addition amount of the monofunctional monomer having an amino group or a quaternary ammonium group to the dispersant is preferably from 0.5 to 50 mass %, more preferably from 1 to 30 mass %. When a binder is formed by crosslinking or polymerization reaction simultaneously with the coating of the high refractive index layer or after coating, the mono-functional monomer can effectively function before coating of the high refractive index layer.

As the matrix of a high refractive index layer in the invention, a matrix cured and formed of an organic polymer containing well-known crosslinkable or polymerizable functional group corresponding to the above-described (a) of the organic binders can be exemplified. It is preferred that the polymer after forming a high refractive index layer further has a crosslinked or polymerized structure. The examples of the polymers include polyolefin (comprising saturated hydrocarbon), polyether, polyurea, polyurethane, polyester, polyamine, polyamide and melamine resins. Of these polymers, polyolefin, polyether and polyurea are preferred, and polyolefin and polyether are more preferred. The mass average molecular weight of organic polymers before curing is preferably from $1 \times 10^3$ to $1 \times 10^6$, and more preferably from $3 \times 10^3$ to $1 \times 10^5$.

Organic polymers before curing are preferably copolymers having a specific polar group as above and a repeating unit having a crosslinking or polymerization structure. The ratio of the repeating unit having an anionic group in the polymers is preferably from 0.5 to 99 mass % of the entire repeating units, more preferably from 3 to 95 mass %, and most preferably from 6 to 90 mass %. The repeating unit may have two or more same or different anionic groups.

When a repeating unit having a silanol group is contained in an organic polymer, the proportion of the repeating unit is preferably from 2 to 98 mol %, more preferably from 4 to 96 mol %, and most preferably from 6 to 94 mol %.

When a repeating unit having an amino group or a quaternary ammonium group is contained, the proportion of the repeating unit is preferably from 0.1 to 50 mass %, more preferably from 0.5 to 30 mass %.

The same effect can be obtained when the silanol group, amino group and quaternary ammonium group are contained in the repeating unit having an anionic group, or when contained in the repeating unit having a crosslinking or polymerization structure.

The proportion of the repeating unit having a crosslinking or polymerization structure in a polymer is preferably from 1 to 90 mass %, more preferably from 5 to 80 mass %, and most preferably from 8 to 60 mass %.

A matrix formed by the crosslinking or polymerization of a binder is preferably formed by coating a high refractive index layer-forming coating composition on a transparent support, and crosslinking or polymerization reaction simultaneously with coating or after coating.

Other compounds can further be arbitrarily added to a high refractive index layer in the invention. For example, when a high refractive index layer has a low refractive index layer thereon, it is preferred that the refractive index of the high refractive index layer is higher than the refractive index of a transparent support. When a high refractive index layer contains an aromatic ring, a halogen element other than fluorine (e.g., Br, I, Cl, etc.), and an atom such as S, N or P, the refractive index of an organic compound becomes high, thus a binder obtained by the crosslinking or polymerization reaction of a curable compound containing these compounds can also be preferably used.

Other Components of High Refractive Index Layer:

Other compounds can be arbitrarily added to a high refractive index layer in the invention according to the usage and purpose. For example, it is preferred that the refractive index of a high refractive index layer is higher than the refractive index of a transparent support, so that a binder capable of being obtained by the crosslinking or polymerization reaction of a curable compound containing an aromatic ring, a halide element other than fluorine (e.g., Br, I, Cl, etc.), and an atom such as S, N or P can also be preferably used in a high refractive index layer.

To a high refractive index layer can be added, besides the above components (inorganic fine grains, a polymerization initiator, a sensitizers, etc.), a resin, a surfactant, an antistatic agent, a coupling agent, a thickener, an anti-colorant, a colorant (a pigment, a dye), a defoaming agent, a leveling agent, a flame retardant, a UV absorber, an infrared absorber, an adhesive providing agent, a polymerization inhibitor, an antioxidant, a surface modifier, and electrically conductive metal fine grains.

Middle Refractive Index Layer:

It is preferred that an anti-reflection film in the invention has a high refractive index layer of a lamination structure comprising two refractive index layers having different refractive indexes. That is, a three-layer structure laminated such that a low refractive index layer formed by coating a coating composition by the above method is formed on a high refractive index layer having a higher refractive index than that of the low refractive index layer, and a middle refractive index layer having a refractive index intermediate between the refractive index of a support and the refractive index of the high refractive index layer is formed contiguous to the high refractive index layer and opposite to the low refractive index layer is preferred. As described above, the refractive index of each refractive index layer is a relative value.

Well-known materials can be used as the materials of a middle refractive index layer, but the same materials as those of a high refractive index layer described above are preferred. It is easy to adjust a refractive index by the kind and amount of inorganic fine grains to be used, and a thin layer is formed similarly to the above-described high refractive index layer in a thickness of preferably from 30 to 500 nm, more preferably from 50 to 300 nm.

Low Refractive Index Layer:

It is preferred that a low refractive index layer is formed of a cured film of a copolymer having a repeating unit derived from a fluorine-containing vinyl monomer and a repeating unit having a (meth)acryloyl group on the side chain as essential constituents. Further, from the viewpoint of the compatibility of the copolymer with lowering of a refractive index and the film hardness, a curing agent of polyfunctional (meth) acrylate and fillers of inorganic and organic fine grains are also preferably used.

The refractive index of a low refractive index layer is preferably from 1.20 to 1.49, more preferably from 1.25 to 1.48, and especially preferably from 1.30 to 1.46.

The thickness of a low refractive index layer is preferably from 50 to 200 nm, more preferably from 70 to 100 nm. The haze of a low refractive index layer is preferably 3% or less, more preferably 2% or less, and most preferably 1% or less. The specific strength of a low refractive index layer is preferably H or higher by a pencil hardness test using a load of 500 g, more preferably 2H or higher, and most preferably 3H or higher.

Further, for the purpose of improving the antifouling property of an anti-reflection film, the contact angle of the surface to water is preferably 90° or more, more preferably 95° or more, and especially preferably 100° or more.

The copolymers for use in a low refractive index layer are described below.

As the specific examples of the fluorine-containing vinyl monomer units, fluoroolefins (e.g., fluoroethylene, vinylidene fluoride, tetrafluoroethylene, perfluorooctylethylene, hexafluoropropylene, perfluoro-2,2-dimethyl-1,3-dioxole, etc.), partially or completely fluorinated alkyl ester derivatives of (meth)acrylic acid (e.g., Viscoat 6FM, manufactured by Osaka Organic Chemical Industry Ltd., and M-2020, manufactured by Daikin Industries Ltd.), and completely or partially fluorinated vinyl ethers are exemplified. Of these monomers, perfluoroolefins are preferred, and hexafluoro-propylene is especially preferred from the aspects of refractive index, solubility, transparency and availability.

As constitutional units for providing crosslinking reactivity, constitutional units capable of obtaining by polymerization of a monomer having a self crosslinkable functional group in the molecule in advance such as glycidyl (meth) acrylate and glycidyl vinyl ether, constitutional units capable of obtaining by polymerization of a monomer having a carboxyl group, a hydroxyl group, an amino group or a sulfo group (e.g., (meth)acrylic acid, methylol (meth)acrylate, hydroxyalkyl (meth)acrylate, allyl acrylate, hydroxyethyl vinyl ether, hydroxybutyl vinyl ether, maleic acid, crotonic acid, etc.), and constitutional units obtained by introducing a crosslinking reactive group such as a (meth)acryloly group to the above constitutional units by a polymer reaction (for example, introduction can be effected by making acrylic acid chloride act upon a hydroxyl group) are exemplified.

Besides the above fluorine-containing monomer units and constitutional units for providing crosslinking reactivity, monomers not containing fluorine may be arbitrarily copolymerized from the viewpoints of the solubility in a solvent and the transparency of film. The monomer units usable in combination are not especially restricted, e.g., olefins (e.g., ethylene, propylene, isoprene, vinyl chloride, vinylidene chloride, etc.), acrylic esters (e.g., methyl acrylate, ethyl acrylate, 2-ethylhexyl acrylate, etc.), methacrylic esters (e.g., methyl methacrylate, ethyl methacrylate, butyl methacrylate, ethylene glycol dimethacrylate, etc.), styrene derivatives (e.g., styrene, divinylbenzene, vinyltoluene, α-methylstyrene, etc.), vinyl ethers (e.g., methyl vinyl ether, ethyl vinyl ether, cyclohexyl vinyl ether, etc.), vinyl esters (e.g., vinyl acetate, vinyl propionate, vinyl cinnamate, etc.), acrylamides (e.g., N-tert-butylacrylamide, N-cyclohexylacrylamide, etc.), methacrylamides, and acrylonitrile derivatives can be exemplified.

Curing agents may be arbitrarily used in these polymers as disclosed in JP-A-10-25388 and JP-A-10-147739.

Fluorine-containing polymers useful in the invention are random copolymers of perfluoroolefin and vinyl ethers or vinyl esters. It is especially preferred that fluorine-containing polymers have a group capable of crosslinking reaction by oneself (a radical reactive group such as a (meth)acryloyl group, a ring opening polymerizable group such as an epoxy group or an oxetanyl group). It is preferred that the crosslinking reactive group-containing polymerization unit accounts for from 5 to 70 mol % of the total polymerization units of polymers, particularly preferably from 30 to 60 mol %.

As the copolymers preferably used in the invention, a compound represented by the following formula 1 can be exemplified.

Formula 1

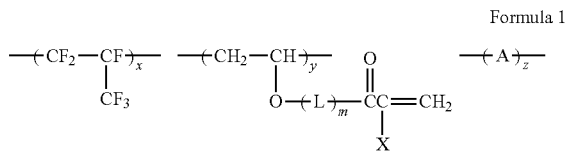

In formula 1, L represents a linking group having from 1 to 10 carbon atoms, more preferably a linking group having from 1 to 6 carbon atoms, and particularly preferably a linking group having from 2 to 4 carbon atoms, which may be a straight chain, branched or cyclic structure, and may have a hetero atom selected from O, N and S.

The preferred examples of linking groups include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—** and *—$CH_2CH_2OCONH(CH_2)_3$—O—** (* represents the linking position on the side of a main chain of the polymer, and ** represents the linking position on the side of the (meth)acryloyl group side). m represents 0 or 1.

In formula 1, X represents a hydrogen atom or a methyl group. A hydrogen atom is more preferred from the viewpoint of curing reactivity.

In formula 1, A represents a repeating unit derived from an arbitrary vinyl monomer, and the repeating unit is not especially restricted so long as it is the constituent of a monomer copolymerizable with hexafluoropropylene, and the repeating unit can be optionally selected considering, e.g., adhesion to a substrate, Tg of a polymer (which contributes to film hardness), solubility in a solvent, transparency, a sliding property, a dust-preventing property and an antifouling property. The repeating unit may comprise one or two or more vinyl monomers according to purpose.

The preferred examples of the monomers include vinyl ethers, e.g., methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, and allyl vinyl ether, vinyl esters, e.g., vinyl acetate, vinyl propionate, and vinyl butyrate, (meth)-acrylate, e.g., methyl (meth)acrylate, ethyl (meth)acrylate, hydroxyethyl (meth)acrylate, glycidyl (meth)acrylate, allyl (meth)acrylate, and (meth)acryloyloxypropyltrimethoxysilane, styrene derivatives, e.g., p-hydroxymethylstyrene, unsaturated carboxylic acids, e.g., crotonic acid, maleic acid and itaconic acid, and derivatives of these carboxylic acids. The more preferred are vinyl ether derivatives and vinyl ester derivatives, and vinyl ether derivatives are especially preferred.

x, y and z represent mol % of respective constituting components, which respectively satisfy $30 \leq x \leq 60$, $5 \leq y \leq 70$ and $0 \leq z \leq 65$, preferably $35 \leq x \leq 55$, $30 \leq y \leq 60$ and $0 \leq z \leq 20$, and particularly preferably $40 \leq x \leq 55$, $40 \leq y \leq 55$ and $0 \leq z \leq 10$.

As the copolymers preferably used in the invention, a compound represented by the following formula 2 can be exemplified.

Formula 2

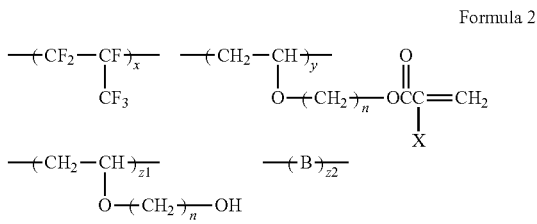

In formula 2, X, x and y each has the same meaning as in formula 1, and preferred ranges are also the same.

n is an integer of $2 \leq n \leq 10$, more preferably $2 \leq n \leq 6$, and especially preferably $2 \leq n \leq 4$.

B represents a repeating unit derived from an arbitrary vinyl monomer, which may be a single composition or may be constituted of a plurality of compositions. As the examples thereof, the same examples as described in A in formula 1 are exemplified.

z1 and z2 represent mol % of respective repeating units, which respectively satisfy the values $0 \leq z1 \leq 65$, $0 \leq z2 \leq 65$, preferably $0 \leq z1 \leq 30$, $0 \leq z2 \leq 10$, and particularly preferably $0 \leq z1 \leq 10$, $0 \leq z2 \leq 5$.

Copolymers represented by formula 1 or 2 can be synthesized by introducing a (meth)acryloyl group to a copolymer comprising, e.g., hexafluoropropylene component and hydroxyalkyl vinyl ether component by any means.

The preferred specific examples of the copolymers useful in the invention are shown below, but the invention is not limited to these compounds.

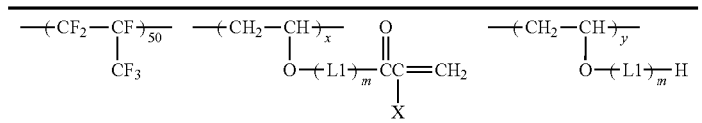

|  | x | y | m | L1 | X | Number Average Molecular Weight Mn (×10⁴) |
|---|---|---|---|---|---|---|
| P-1 | 50 | 0 | 1 | *—$CH_2CH_2O$— | H | 3.1 |
| P-2 | 50 | 0 | 1 | *—$CH_2CH_2O$— | $CH_3$ | 4.0 |
| P-3 | 45 | 5 | 1 | *—$CH_2CH_2O$— | H | 2.8 |
| P-4 | 40 | 10 | 1 | *—$CH_2CH_2O$— | H | 3.8 |
| P-5 | 30 | 20 | 1 | *—$CH_2CH_2O$— | H | 5.0 |
| P-6 | 20 | 30 | 1 | *—$CH_2CH_2O$— | H | 4.0 |
| P-7 | 50 | 0 | 0 | — | H | 11.0 |

-continued $$-(CF_2-CF)_{50}-(CH_2-CH)_x-(CH_2-CH)_y-$$
$$\phantom{-(CF_2-}|\phantom{CF)_{50}}\phantom{-(}|\phantom{CH_2-CH)_x}\phantom{-(}|\phantom{CH_2-CH)_y-}$$
$$\phantom{-(CF_2-}CF_3\phantom{)_{50}}\phantom{-(}O-(L1)_m-\overset{O}{\underset{X}{\overset{\|}{C}}}-C=CH_2\phantom{-(}O-(L1)_m-H$$

|     | x  | y | m | L1 | X | Number Average Molecular Weight Mn (×10⁴) |
|-----|----|---|---|----|---|-------------------------------------------|
| P-8 | 50 | 0 | 1 | *—C₄H₈O— | H | 0.8 |
| P-9 | 50 | 0 | 1 | *—(CH₂)₂—O—(CH₂)₂—O— | H | 1.0 |
| P10 | 50 | 0 | 1 | *—⌬—O— | H | 7.0 |

*indicates the main chain side of the polymer.

$$-(CF_2-CF)_{50}-(CH_2-CH)_x-(CH_2-CH)_y-$$
$$\phantom{-(CF_2-}CF_3\phantom{)_{50}}\phantom{-(}O-(L1)_m-\overset{O}{\underset{X}{\overset{\|}{C}}}-C=CH_2\phantom{-(}O-(L1)_m-H$$

|      | x  | y | m | L1 | X | Number Average Molecular Weight Mn (×10⁴) |
|------|----|---|---|----|---|-------------------------------------------|
| P-11 | 50 | 0 | 1 | *—CH₂CH₂NH— | H | 4.0 |
| P-12 | 50 | 0 | 1 | *—CH₂CH₂OC(=O)NHCH₂CH₂O— | H | 4.5 |
| P-13 | 50 | 0 | 1 | *—CH₂CH₂OC(=O)NHCH₂CH₂O— | CH₃ | 4.5 |
| P-14 | 50 | 0 | 1 | *—CH₂CH₂CH₂CH₂OC(=O)NHCH₂CH₂O— | CH₃ | 5.0 |
| P-15 | 50 | 0 | 1 | *—CH₂CH(OH)CH₂O— | H | 3.5 |
| P-16 | 50 | 0 | 1 | *—CH₂CH(CH₂OH)O— | H | 3.0 |
| P-17 | 50 | 0 | 1 | *—CH₂CH₂OCH₂—CH(OH)CH₂O— | H | 3.0 |
| P-18 | 50 | 0 | 1 | *—CH₂OCH₂CH(CH₂OH)—O— | CH₃ | 3.0 |
| P-19 | 50 | 0 | 1 | *—CH₂OCH₂CH(CH₂OH)—O— | CH₃ | 3.0 |

-continued

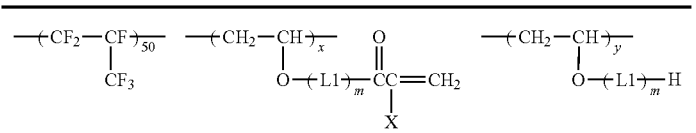

| | x | y | m | L1 | X | Number Average Molecular Weight Mn (×10⁴) |
|---|---|---|---|---|---|---|
| P-20 | 40 | 10 | 1 | *—CH$_2$CH$_2$O— | CH$_3$ | 0.6 |

*indicates the main chain side of the polymer.

$$-(CF_2-CF)_a-(CH_2-CH)_b- \quad -(A)_c-$$
$$\phantom{-(CF_2-}|\phantom{CF)_a} \phantom{(CH_2-}|$$
$$\phantom{-(CF_2-}CF_3 \phantom{)} \phantom{(CH_2-}O-L1-\overset{O}{\underset{\|}{C}}CH=CH_2$$

| | a | b | c | L1 | A | Number Average Molecular Weight Mn (×10⁴) |
|---|---|---|---|---|---|---|
| P-21 | 55 | 45 | 0 | *—CH$_2$CH$_2$O—** | — | 1.8 |
| P-22 | 45 | 55 | 0 | *—CH$_2$CH$_2$O—** | — | 0.8 |
| P-23 | 50 | 45 | 5 | *—CH$_2$CH$_2$OCNHCH$_2$CH$_2$O—** (with C=O) | —CH$_2$—CH— with OCH$_2$CH$_2$OH | 0.7 |
| P-24 | 50 | 45 | 5 | *—CH$_2$CH(OH)—CH$_2$O—** | —CH$_2$—CH— with O—CH$_2$ (epoxide) | 4.0 |
| P-25 | 50 | 45 | 5 | *—CH$_2$CH(CH$_2$OH)O—** | —CH$_2$—CH— with O—CH$_2$ (epoxide) | 4.0 |
| P-26 | 50 | 40 | 10 | *—CH$_2$CH$_2$O—** | —CH$_2$—CH— with OCH$_2$CH$_3$ | 4.0 |
| P-27 | 50 | 40 | 10 | *—CH$_2$CH$_2$O—** | —CH$_2$—CH— with O-cyclohexyl | 4.0 |
| P-28 | 50 | 40 | 10 | *—CH$_2$CH$_2$O—** | —CH(CH$_3$)—CH(COOH)— | 5.0 |

*indicates the main chain side of the polymer, and
**indicates the acryloyl group side.

$$-(CF_2-CF)_x- \quad -(CH_2-CH)_y- \underset{O-(CH_2)_n OCC=CH_2}{} \quad -(CH_2-CH)_{z1}- \quad -(B)_{z2}-$$
(with CF₃ on first unit; X on acrylate; O—(CH₂)ₙ—OH on third unit)

|  | x | y | z1 | z2 | n | X | B | Number Average Molecular Weight Mn (×10⁴) |
|---|---|---|---|---|---|---|---|---|
| P-29 | 50 | 40 | 5 | 5 | 2 | H | —CH₂—CH(O—CH₂CH₃)— | 5.0 |
| P-30 | 50 | 35 | 5 | 10 | 2 | H | —CH₂—CH(O—C(CH₃)₃)— | 5.0 |
| P-31 | 40 | 40 | 10 | 10 | 4 | CH₃ | —CH₂—CH(O—cyclohexyl)— | 4.0 |

$$-(CF_2-CF)_{50}- \quad -(Y)_a- \quad -(Z)_b-$$
(CF₃ on first unit)

|  | a | b | Y | Z | Number Average Molecular Weight Mn (×10⁴) |
|---|---|---|---|---|---|
| P-32 | 45 | 5 | —CH(CH₃)—CH(CO₂CH₂CHOHCH₂OCC(CH₃)=CH₂)— | —CH(CH₃)—CH(COOH)— | 4.0 |
| P-33 | 40 | 10 | —CH(CO₂H)—CH(CONHCH₂CH₂OCCH=CH₂)— | —CH—CH— (succinic anhydride ring: O=C—O—C=O) | 4.0 |

$$-(CH_2-CH)_x- \quad -(CH_2-CH)_y- \quad -(CH_2-CH)_z-$$
(each with O=C—O— side chain: Rf; L—CCH=CH₂ (O); L—H)

|  | x | y | z | Rf | L | Number Average Molecular Weight Mn (×10⁴) |
|---|---|---|---|---|---|---|
| P-34 | 60 | 40 | 0 | —CH₂CH₂C₈F₁₇-n | *—CH₂CH₂O— | 11 |
| P-35 | 60 | 30 | 10 | —CH₂CH₂C₄F₈H-n | *—CH₂CH₂O— | 30 |
| P-36 | 40 | 60 | 0 | —CH₂CH₂C₆F₁₂H | *—CH₂CH₂CH₂CH₂O— | 4.0 |

*indicates the main chain side of the polymer.

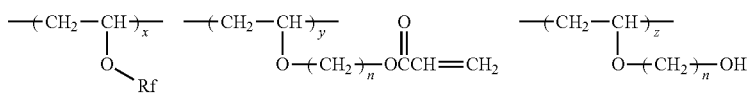

| | x | y | z | n | Rf | Number Average Molecular Weight Mn (×10⁴) |
|---|---|---|---|---|---|---|
| P-37 | 50 | 50 | 0 | 2 | —CH$_2$C$_4$F$_8$H-n | 5.0 |
| P-38 | 40 | 55 | 5 | 2 | —CH$_2$C$_4$F$_8$H-n | 4.0 |
| P-39 | 30 | 70 | 0 | 4 | —CH$_2$C$_8$F$_{17}$-n | 10 |
| P-40 | 60 | 40 | 0 | 2 | —CH$_2$CH$_2$C$_8$F$_{16}$H-n | 5.0 |

The copolymers preferably used in the invention can be synthesized by polymerizing the precursor of a hydroxyl group-containing polymer by various polymerization methods, e.g., solution polymerization, precipitation polymerization, suspension polymerization, block polymerization, and emulsion polymerization, and then introducing a (meth)acryloyl group by the above-described polymer reaction. Polymerization reaction can be done by various well-known systems such as a batch system, a semi-continuous system and a continuous system.

As described above, the addition of additives, e.g., a curing agent, is not necessarily advantageous from the viewpoint of the hardness of a cured film of a low refractive index layer, but curing agents, e.g., a polyfunctional (meth)acrylate compound, a polyfunctional epoxy compound, a polyisocyanate compound, aminoplasts, and polybasic acid or acid anhydride thereof can be added from the viewpoint of interfacial adhesion with a high refractive index layer. When curing agents, etc. are added, the addition amount is preferably from 0 to 30 mass % of the total solids content of the low refractive index layer, more preferably from 0 to 20 mass %, and especially preferably from 0 to 10 mass %.

Well-known silicon-based and fluorine-based antifouling agents, sliding agents and the like can be added for the purpose of providing an antifouling property, water resistance, chemical resistance and a sliding property. When these additives are used, the addition amount is preferably from 0 to 20 mass % of the total solids content of the low refractive index layer, more preferably from 0 to 10 mass %, and especially preferably from 0 to 5 mass %.

Both radical polymerization initiators capable of generating radicals by the action of heat and by the action of light are usable in the invention.

As the compounds that initiate radical polymerization by the action of heat, organic and inorganic peroxides, organic azo and diazo compounds can be used.

Specifically, as organic peroxides, benzoyl peroxide, halogenobenzoyl peroxide, lauroyl peroxide, acetyl peroxide, dibutyl peroxide, cumene hydroperoxide and butyl hydroperoxide, as inorganic peroxides, hydrogen peroxide, ammonium persulfate and potassium persulfate, as azo compounds, 2-azobisisobutyronitrile, 2-azobispropionitrile and 2-azobiscyclohexanedinitrile, and as diazo compounds, diazoaminobenzene and p-nitrobenzenediazonium are exemplified.

When compounds that initiate radical polymerization by the action of light are used, film is cured by the irradiation of actinic energy rays.

As the examples of such photo-radical polymerization initiators, acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums are used. The examples of acetophenones include 2,2-diethoxy-acetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)butanone. The examples of benzoins include benzoinbenzenesulfonate, benzointoluene-sulfonate, benzoin methyl ether, benzoin ethyl ether and benzoin isopropyl ether. The examples of benzophenones include benzophenone, 2,4-dichlorobenzophenone, 4,4-dichlorobenzophenone, and, p-chlorobenzophenone. The examples of phosphine oxides include 2,4,6-trimethylbenzoyl-diphenyl phosphine oxide. Sensitizing dyes are preferably used in combination with these photo-radical polymerization initiators.

The addition amount of the compounds that initiate radical polymerization by the action of heat or light should be sufficient to initiate polymerization of carbon-carbon double bond, but the amount is generally preferably from 0.1 to 15 mass % of the total solid contents in the low refractive index layer-forming composition, more preferably from 0.5 to 10 mass %, most preferably from 2 to 5 mass %

The solvent contained in a low refractive index layer coating composition is not particularly restricted so long as the composition containing a fluorine-containing copolymer is uniformly dissolved or dispersed without causing precipitation, and two or more solvents may be used in combination. The examples of preferred solvents include ketones (e.g., acetone, methyl ethyl ketone, methyl isobutyl ketone, etc.), esters (e.g., ethyl acetate, butyl acetate, etc.), ethers (e.g., tetrahydrofuran, 1,4-dioxane, etc.), alcohols (e.g., methanol, ethanol, isopropyl alcohol, butanol, ethylene glycol, etc.), aromatic hydrocarbons (e.g., toluene, xylene, etc.), and water.

A low refractive index layer can contain, besides fluorine-containing compounds, a filler (e.g., inorganic and organic fine grains, etc.), a silane coupling agent, a sliding agent (e.g., a silicone compound, e.g., dimethylsilicone, etc.), and a surfactant. It is particularly preferred to contain inorganic fine grains, a silane coupling agent and a sliding agent.

Inorganic fine grains that can be contained in a low refractive index layer in the invention are described below.

The coating weight of inorganic fine grains is preferably from 1 to 100 mg/m$^2$, more preferably from 5 to 80 mg/m$^2$, and still more preferably from 10 to 60 mg/m$^2$. When the coating weight of inorganic fine grains is in the above range, the effect of improving scratch resistance is exhibited and slight unevenness never forms on the surface of the low refractive index layer, so that the phenomena of deterioration of external appearance such as enhancement of black due to the slight unevenness and deterioration of integrated reflectance do not occur.

It is desired that the inorganic fine grains contained in a low refractive index layer have a low refractive index. For example, inorganic fine grains of magnesium fluoride and silica are exemplified. Silica fine grains are especially preferred in the points of the refractive index, dispersion stability and costs. The average grain size of silica fine grains is preferably from 30 to 150% of the thickness of the low refractive index layer, more preferably from 35 to 80%, and still more preferably from 40 to 60%. That is, when the thickness of the low refractive index layer is 100 nm, the grain size of the silica fine grains is preferably from 30 to 150 nm, more preferably from 35 to 80 nm, and still more preferably from 40 to 60 nm.

When the grain size of the silica fine grains is in the above range, the effect of improving scratch resistance is exhibited and slight unevenness never forms on the surface of the low refractive index layer, so that the phenomena of deterioration of external appearance such as enhancement of black due to the slight unevenness and deterioration of integrated reflectance do not occur.

The silica fine grains may be crystalline or amorphous, may be monodispersed grains, or may be aggregate so long as the grains satisfy the prescribed grain size. A spherical shape is most preferred as the grain shape but amorphous grains can be used with no problem.

The average grain size of silica fine grains is measured with a coulter counter.

For the purpose of lessening the increase of the refractive index of a low refractive index layer, it is preferred to use hollow silica fine grains, and the refractive index of the hollow silica fine grains is preferably from 1.17 to 1.40, more preferably from 1.17 to 1.35, and still more preferably from 1.17 to 1.30. The refractive index of the hollow silica fine grains means the refractive index of the grains as a whole and does not mean the refractive index of only the silica of the outer shells forming the hollow silica fine grains. At this time, void ratio x represented by the following equation (VIII) is preferably from 10 to 60%, more preferably from 20 to 60%, and most preferably from 30 to 60%, with the radius of the void in a grain as a and the radius of the shell of the grain as b:

$$x=(4\pi a^3/3)/(4\pi b^3/3)\times 100 \qquad (VIII)$$

When it is tried to make the refractive index of a hollow silica fine grain lower and the void ratio greater, the thickness of the shell becomes thinner and the strength of the grain weakens, so that a grain having a refractive index of less than 1.17 is not materialized from the viewpoint of scratch resistance.

The refractive index of hollow silica grains was measured with an Abbe's refractometer (manufactured by ATAGO CO., LTD.).

It is preferred to use at least one kind of silica fine grains having an average grain size of less than 25% of the thickness of a low refractive index layer (referred to as "small size silica fine grains") in combination with silica fine grains having the above grain size (referred to as "great size silica fine grains").

Since small size silica fine grains can exist in the spaces among great size silica fine grains, small size silica fine grains can serve as the retainer of great size silica fine grains.

When the thickness of a low refractive index layer is 100 nm, the average grain size of small size silica fine grains is preferably from 1 to 20 nm, more preferably from 5 to 15 nm, and especially preferably from 10 to 15 nm. Using such silica fine grains saves the material costs and contributes to the effect of retainer.

Silica fine grains may be subjected to physical surface treatment, e.g., plasma discharge treatment and corona discharge treatment, and chemical surface treatment with, e.g., a surfactant and a coupling agent, for the purpose of dispersion stabilization in a dispersion or a coating solution, or for increasing the affinity and integrity with the binder components. The use of coupling agents is particularly preferred. As the coupling agents, alkoxy metal compounds (e.g., a titanium coupling agent, a silane coupling agent) are preferably used, and a silane coupling agent is especially effective.

As the surface treating agent of inorganic fillers of a low refractive index layer, the above silane coupling agent is used for the surface treatment previously before preparing the coating solution of the layer, but it is preferred to further add the coupling agent as additive at the time of preparation of the coating solution of the layer.

It is preferred to reduce the load of surface treatment for silica fine grains to be dispersed in advance in a dispersion medium before surface treatment.

The above description on silica fine grains is also applied to other inorganic grains.

As the silane coupling agent, at least any of a compound represented by the following formula (A) and a derivative of compound (A) can be used.

$$X—Si—(OR)_3 \qquad (A)$$

In formula (A), X represents an organic functional group and R represents an alkyl group. A silane coupling agent containing a hydroxyl group, a mercapto group, a carboxyl group, an epoxy group, an alkyl group, an alkoxysilyl group, an acyloxy group or an acylamino group in X is preferred, and a silane coupling agent containing an epoxy group, a polymerizable acyloxy group ((meth)acryloyl), or a polymerizable acylamino group (acrylamino, methacrylamino) is especially preferred.

A particularly preferred compound represented by formula (A) is a compound having a (meth)acryloyl group in X as the crosslinking or polymerizable functional group, for example, 3-acryloxypropyltrimethoxysilane and 3-methacryloxypropyl-trimethoxysilane are exemplified.

As the sliding agent, fluorine-containing compounds into which dimethylsilicone and polysiloxane segment are introduced are preferred.

Other Layers:

Besides the above layers, a moisture-preventing layer, an antistatic layer, a primer layer, an undercoat layer, a protective layer, a shield layer and a sliding layer may further be provided on a lamination type anti-reflection film. The shied layer is provided for shielding electromagnetic waves and infrared rays.

Formation of Anti-Reflection Film:

Each layer constituting an anti-reflection film of a multi-layer constitution can be formed by dip coating, air knife coating, curtain coating, roller coating, die coating, wire bar coating, gravure coating, and extrusion coating (U.S. Pat. No. 2,681,294), extrusion coating, micro gravure coating, and wire bar coating are preferred, and die coating disclosed in JP-A-2003-211052 is more preferred. Two or more layers may be coated simultaneously. Simultaneous coating methods are disclosed in U.S. Pat. Nos. 2,761,791, 2,941,898, 3,508,947, 3,526,528, and Yuji Harasaki, *Coating Kogaku* (*Coating Engineering*), p. 253, Asakura Shoten (1973).

A higher coating speed for the formation of an anti-reflection film is more preferred since productivity becomes higher, leading to cost reduction. Specifically, the coating is carried out preferably at a speed of 25 m/min or more, more preferably at a speed of 35 m/min or more, still more preferably at a speed of 45 m/min or more. In the present invention, it is preferable that the coating composition of the invention is particularly coated at the above-mentioned coating speed.

In an anti-reflection film in the invention, at least a high refractive index layer and a low index layer are laminated, so that luminescent spot defect is liable to be conspicuous when foreign matters such as dirt and dust are present. The luminescent spot defect in the invention is a defect that can be visually seen by the reflection on a film, which can be visually detected by the operation of coating the back of a coated anti-reflection film black. A visually seen luminescent spot defect is generally 50 μm or more. If there are many luminescent spot defects, production yield lowers and large size anti-reflection films cannot be manufactured.

In an anti-reflection film in the invention, the number of luminescent spot defects is restricted to 20 or less per 1 $m^2$, preferably 10 or less, more preferably 5 or less, and especially preferably 1 or less.

For continuously manufacturing an anti-reflection film of the invention, a process of continuously feeding a rolled support film, a process of coating a coating solution and drying, a process of curing a coated film, and a process of winding a support film having a cured layer are performed.

A film support is continuously fed from a rolled film support to a clean room, the static electricity charged on the film support is destaticized with a destaticizer in the clean room, and then the foreign matters adhered on the film support are removed with a dust remover. Subsequently, a coating solution is coated on the film support in a coating zone installed in the clear room, and the coated film support is delivered to a drying room and dried.

The film support having a dried coated layer is sent out from the drying room to a radiation curing room, the film support is irradiated with radiation, whereby the monomer contained in the coated layer is polymerized and cured. The film support having a cured layer by radiation irradiation is fed to a heating curing zone and heated to complete curing, the film support having a finished cured layer is wound in a roll.

The above processes may be performed in every layer formation, or the formation of each layer can be performed continuously by providing a plurality of a coating zone—a drying room—a radiation curing room—a heating curing room.

For manufacturing an anti-reflection film little in luminescent spot defect, precisely controlling the degree of dispersion of high refractive index super fine grains in a coating solution for a high refractive index layer, and precise filtering operation of a coating solution are exemplified as described above. At the same time, it is preferred that the coating process of each layer constituting the anti-reflection film in the coating zone and the drying process in the drying room are performed in the atmosphere of high cleanliness, and the dirt and dusts on the film are sufficiently removed before coating. Air cleanliness of the coating process and drying process is preferably class 10 (grains of 0.5 μm or more are 353/$m^3$ or less) or more according to the specification of air cleanliness in Federal Specifications 209E, more preferably class 1 (grains of 0.5 μm or more are 35.5/$m^3$ or less) or more. It is more preferred that air cleanliness is also high in processes of feeding and winding other than the processes of from coating to drying.

As dust-removing methods used in a dust removing process performed as the pre-process of coating, dry dust-removing methods such as a method of pressing non-woven fabric and a blade against the surface of a film as disclosed in JP-A-59-150571, a method of blowing air of high cleanliness at a high speed to peel off deposits from the surface of a film and sucking the released substances with a nearby suction port as disclosed in JP-A-10-309553, and a method of blowing ultrasonically vibrating compressed air to peel off deposits and sucking (e.g., new ultra cleaner, manufactured by SHINKO CO., LTD., etc.) as disclosed in JP-A-7-333613 are exemplified.

Further, wet dust-removing methods such as a method of introducing a film into a washing bath and peeling off deposits with an ultrasonic wave vibrator, a method of supplying a cleaning liquid to a film, blowing high speed air and sucking as disclosed in JP-B-49-13020, and a method of continuously rubbing a web with a roll wet with a liquid, ejecting a liquid to the rubbed web to clean the web as disclosed in JP-A-2001-38306 can be used. Of these dust-removing methods, methods of dust removal with ultrasonic waves and wet dust-removing methods are especially preferred in the point of dust-removing effect.

It is particularly preferred to destaticize the static electricity on a film support before performing dust-removing process for increasing dust-removing effect and suppressing the adhesion of dusts. As such destaticizing methods, a corona discharge type ionizer and ionizers of light irradiation type of UV and soft X-rays can be used. The voltage of charge of a film support before and after dust removal and coating is preferably 1,000 V or less, more preferably 300 V or less, and especially preferably 100 V or less.

Dispersion Medium for Coating:

The dispersion media for coating are not especially restricted. The dispersion media can be used alone, or two or more dispersion media can be used as mixture. Preferred dispersion media are aromatic hydrocarbons, e.g., toluene, xylene and styrene, aromatic hydrocarbon chlorides, e.g., chlorobenzene and orthodichlorobenzene, aliphatic hydrocarbon chlorides including methane derivatives, e.g., monochloromethane, and ethane derivatives, e.g., monochloro-ethane, alcohols, e.g., methanol, isopropyl alcohol, and isobutyl alcohol, esters, e.g., methyl acetate and ethyl acetate, ethers, e.g., ethyl ether and 1,4-dioxane, ketones, e.g., acetone, methyl ethyl ketone, methyl isobutyl ketone and cyclohexanone, glycol ethers, e.g., ethylene glycol monomethyl ether, alicyclic hydrocarbons, e.g., cyclohexanone, aliphatic hydrocarbons, e.g., normal hexane, and aliphatic or aromatic hydrocarbon mixtures. Of these solvents, dispersion media for coating manufactured by alone or mixtures of two or more ketones are especially preferred.

Filtration:

A coating solution for use in coating is preferably filtered before coating. It is preferred to use filters for filtration having pore diameters as small as possible in the range of not removing the components in a coating solution. Filters having absolute filtration accuracy of from 0.1 to 10 μm are used for filtration, more preferably filters having absolute filtration accuracy of from 0.1 to 5 μm are used. The thickness of filters is preferably from 0.1 to 10 mm, more preferably from 0.2 to 2 mm. In this case, it is preferred to perform filtration at filtration pressure of preferably 15 kgf/$cm^2$ or less, more preferably 10 kgf/$cm^2$ or less, and still more preferably 2 kgf/$cm^2$ or less.

The materials of filters are not especially restricted so long as they do not influence the coating solution. Specifically, the same materials as described in the filter materials of the wet dispersion of inorganic compounds are exemplified.

It is also preferred that a filtered coating solution is dispersed by ultrasonic waves just before coating to thereby defoam and assist dispersion retention of a dispersion.

In the invention, each layer of an anti-reflection film is preferably cured by a crosslinking reaction or a polymerization reaction by light irradiation, irradiation with electron beams or by heating at the same time with the coating of a coating composition or after coating.

When each layer of an anti-reflection film is formed by a crosslinking reaction or a polymerization reaction of an ionizing radiation-curable compound, it is preferred to perform the crosslinking reaction or polymerization reaction in the atmosphere of oxygen concentration of 10 vol % or less. By forming each layer in the atmosphere of oxygen concentration of 10 vol % or less, an outermost layer having excellent physical strength and chemical resistance can be obtained.

Oxygen concentration is preferably 5 vol % or less, more preferably 1 vol % or less, especially preferably 0.5 vol % or less, and most preferably 0.1 vol % or less.

For making oxygen concentration 10 vol % or less, it is preferred to replace the atmosphere (nitrogen concentration: about 79 vol %, oxygen concentration: about 21 vol %) with other gas, particularly preferably to replace with nitrogen (nitrogen purge).

The light sources of light irradiation may be any of ultraviolet rays and near infrared rays. As the light sources of ultraviolet rays, extra-high pressure, high pressure, middle pressure and low pressure mercury lamps, a chemical lamp, a carbon arc lamp, a metal halide lamp, a xenon lamp and sunbeams are exemplified. Available various kinds of laser light sources of the wavelengths of from 350 to 420 nm may be made multi-beams for use in irradiation. As the light sources of near infrared rays, a halogen lamp, a xenon lamp and a high pressure sodium lamp are exemplified, and available various kinds of laser light sources of the wavelengths of from 750 to 1,400 nm may be made multi-beams for use in irradiation.

Near infrared light sources may be combined with ultraviolet light sources, or irradiation may be performed from the side of a substrate opposite to the coating side. Film curing in the depth direction in a coated layer progresses with the curing of the surface and the vicinity without delay and a uniformly cured film can be obtained.

The intensity of irradiation of ultraviolet rays is preferably from 0.1 to 100 mW/cm$^2$ or so, and the irradiation dose on the surface of a coated layer is preferably from 10 to 1,000 mJ/cm$^2$. The temperature distribution of a coated layer in a light irradiation process is preferably controlled to be uniform as far as possible, preferably within ±3° C., more preferably within ±1.5° C. In this range of the temperature, the polymerization reaction in the in-plane direction and depth direction in the layer uniformly progresses.

Polarizing Plate:

When an anti-reflection film in the invention is used as one side of the surface protective films of a polarizer, it is necessary that the side opposite to the side of a transparent support on which an anti-reflection layer is formed should be subjected to saponification treatment with alkali. A specific means of alkali saponification treatment can be selected from the following two means. Means (1) is superior to means (2) for capable of treatment with the same process as the process of general purpose triacetyl cellulose film, but there are problems in that even the anti-reflection film surface undergoes saponification treatment, so that the film is deteriorated due to alkali hydrolysis of the surface, and that the solution of saponification treatment, if remains, leads to stains. Means (2) is superior in this case, although the process is special.

(1) After forming an anti-reflection layer on a transparent support, the anti-reflection film is immersed in an alkali solution at least one time to subject the back of the anti-reflection film to saponification treatment.

(2) Before or after forming an anti-reflection layer on a transparent support, an alkali solution is coated on the side opposite to the side of the anti-reflection film on which an anti-reflection layer is formed, and the anti-reflection film is heated, washed and/or neutralized to subject only the back of the film to saponification treatment.

A polarizing plate mainly consists of two protective films that sandwich a polarizing film. It is preferred to use an anti-reflection film in the invention as one film of two protective films sandwiching a polarizing film. Since an anti-reflection film of the invention doubles a protective film, the manufacturing costs of a polarizing plate can be reduced. In addition, by using an anti-reflection film of the invention as an outermost layer, a polarizing plate free of mirroring of the reflection of outer light and excellent in scratch resistance and an antifouling property can be obtained.

As a polarizing film, well-known polarizing films, and polarizing films cut out of a long size polarizing film whose absorption axis is not parallel or not perpendicular to the machine direction may be used. A long size polarizing film whose absorption axis is not parallel or not perpendicular to the machine direction is formed by the following method. That is, the film is a polarizing film manufactured by a method of stretching a polymer film with applying tensile force while holding both ends of the continuously supplied polymer film with holding means, stretching the film at least 1.1 to 20.0 times in the transverse direction of the film, the difference in traveling speeds in the machine direction of the holding means at both ends is within 3%, and crooking the film in the state of holding both ends, so that the angle formed by the traveling direction of the film and the substantial stretching direction of the film at the outlet of the process of holding both ends of the film is inclined by 20 to 70°. In particular, films given an inclination by 45° are preferably used from the point of productivity.

Stretching of a polarizing film can be performed according to the method disclosed in JP-A-2002-86554.

An anti-reflection film in the invention and a polarizing plate using the anti-reflection film arranged so that the low refractive index layer is the outermost layer can be applied to image display apparatuses such as a liquid crystal display (LCD), a plasma display panel (PDP), electroluminescence display (ELD), and cathode ray tube (CRT). An anti-reflection film in the invention having a transparent support is used so that the transparent support side is in contact with the image display face of an image display apparatus. A polarizing plate is used in contact with the image display face of an image display apparatus so that the low refractive index layer is the outermost surface of the display unit.

When used as one side of the surface protective films of a polarizing film, an anti-reflection film of the invention can be preferably applied to transmitting type, reflection type and semi-transmitting type liquid crystal displays of the modes of twisted nematic (TN), super twisted nematic (STN), vertical alignment (VA), in-plane switching (IPS), optically compensated Bend Cell (OCB), electrically controlled birefringence (ECB)

VA mode liquid crystal cell includes (1) VA mode liquid crystal cell in a narrow sense of substantially perpendicularly orientating rod-like liquid crystal molecules when no voltage is applied, and substantially horizontally orientating when voltage is applied (e.g., JP-A-2-176625), (2) liquid crystal cell having multi-domains of VA mode (MVA mode) for widening angle of visibility (SID97, described in *Digest of Tech. Papers*, (drafts) 28, 845 (1997)), (3) liquid crystal cell of a mode of substantially perpendicularly orientating rod-like liquid crystal molecules when no voltage is applied, and twisted multi-domain orientating when voltage is applied (n-ASM mode) (described in the drafts of Liquid Crystal Forum, Japan, 58-59 (1998)), and (4) SURVAIVAL mode liquid crystal cell (released at LCD International 98).

OCB mode liquid crystal cell is a liquid crystal display using liquid crystal cell of bend orientation mode of orientating rod-like liquid crystal molecules substantially reverse directions (symmetrically) at the upper and lower of the liquid crystal cell, and disclosed in U.S. Pat. Nos. 4,583,825 and 5,410,422. Since rod-like liquid crystal molecules are orientated symmetrically at the upper and lower of the liquid crystal cell, the liquid crystal cell of bend orientation mode has a self-optical compensation function. Therefore, this liquid crystal mode is also called OCB (Optically Compensatory Bend) liquid crystal mode. The liquid crystal display of bend orientation mode has the advantage that response speed is quick.

In ECB mode liquid crystal cell, rod-like liquid crystal molecules are substantially horizontally orientated when voltage is not applied, and ECB mode liquid crystal cell is most widely used as color TFT liquid crystal display, and descriptions are seen in many literatures, for example, in EL, PDP, LCD Displays, published by Toray Research Center (2001).

As disclosed in JP-A-2001-100043, etc., by using, in particular in TN mode and IPS mode liquid crystal displays, an optically compensating film having the effect of widening angle of visibility on the side opposite to the side on which an anti-reflection film of the invention is used as one of two obverse and reverse protective films of a polarizing film, a polarizing plate having a reflection-preventing effect and a widening effect of angle of visibility can be obtained by the thickness of one polarizing plate, so that very preferred.

EXAMPLE

The invention will be described in more detail with referring to Examples and Comparative Examples, but the invention is not limited thereto. In the meantime, "part" and "%" are to be defined as on weight basis so long as specifically defined otherwise.

Preparation of Coating Solution (HCL-1) for Hard Coat Layer:

Trimethylolpropane triacrylate (TMPTA, manufactured by Nippon Kayaku Co., Ltd.) (742.0 mass parts), 277 mass parts of poly(glycidyl methacrylate) having a mass average molecular weight of 15,000, 728.0 mass parts of methyl ethyl ketone, 503.0 mass parts of cyclohexanone, and 51.0 mass parts of a photo-polymerization initiator (Irgacure 184, manufactured by Ciba Geigy Japan Limited) were put in a mixing tank and stirred. The mixed solution was filtered through a polypropylene filter having a pore diameter of 30 μm to prepare a coating solution (HCL-1) for a hard coat layer.

Preparation of Coating Solution (HCL-2) for Glare-Proof Hard Coat Layer:

UV-cure type hard coat solution containing a commercially available zirconia (De Solite Z7404, manufactured by JSR Corporation, solids concentration: about 61%, the content of $ZrO_2$ in the solids content: about 70%, polymerizable monomer, containing a polymerization initiator) (284 g), and 86 g of the mixture of dipentaerythritol pentaacrylate and dipentaerythritol hexaacrylate (DPHA, manufactured by Nippon Kayaku Co., Ltd.) were mixed, and the mixture obtained were diluted with 60 g of methyl isobutyl ketone and 17 g of methyl ethyl ketone. Further, the above mixture was mixed with 28.5 g of a silane coupling agent (KBM-5103, manufactured by Shin-Etsu Chemical Co., Ltd.) and stirred. Further, 30 g of a dispersion obtained by dispersing a 30% methyl isobutyl ketone dispersion of intensely classified crosslinking PMMA grains having an average grain size of 3.0 μm (refractive index: 1.49, MXS-300, manufactured by The Soken Chemical & Engineering Co., Ltd.) with a polytron disperser at 10,000 rpm for 20 minutes, and then 95 g of a dispersion obtained by dispersing a 30% methyl ethyl ketone dispersion of silica grains having an average grain size of 1.5 μm (refractive index: 1.46, Seahoster KE-P150, manufactured by Nippon Shokubai Co., Ltd.) with a polytron disperser at 10,000 rpm for 30 minutes were added to the above solution and mixed with stirring. The above mixed solution was filtered through a polypropylene filter having a pore diameter of 30 μm, whereby coating solution (HCL-2) for glare-proof hard coat layer was prepared.

Preparation of Coating Solution (HCL-3) for Glare-Proof Hard Coat Layer:

A UV-cure type hard coat solution containing a commercially available zirconia (De Solite Z7404, manufactured by JSR Corporation, solids concentration: about 61%, the content of $ZrO_2$ in the solids content: about 70%, polymerizable monomer, containing a polymerization initiator) (284 g), and 86 g of the mixture of dipentaerythritol pentaacrylate and dipentaerythritol hexaacrylate (DPHA, manufactured by Nippon Kayaku Co., Ltd.) were mixed, and the mixture obtained were diluted with 60 g of methyl isobutyl ketone and 17 g of methyl ethyl ketone. Further, the above mixture was mixed with 28.5 g of a silane coupling agent (KBM-5103, manufactured by Shin-Etsu Chemical Co., Ltd.) and stirred. Further, the above solution was mixed with 0.26 g of fluorine polymer (P-3) (40 mass %, an MEK solution) and stirred. Subsequently, 30 g of a dispersion obtained by dispersing a 30% methyl isobutyl ketone dispersion of intensely classified crosslinking PMMA grains having an average grain size of 3.0 μm (refractive index: 1.49, MXS-300, manufactured by The Soken Chemical & Engineering Co., Ltd.) with a polytron disperser at 10,000 rpm for 20 minutes, and then 95 g of a dispersion obtained by dispersing a 30% methyl ethyl ketone dispersion of silica grains having an average grain size of 1.5 μm (refractive index: 1.46, Seahoster KE-P150, manufactured by Nippon Shokubai Co., Ltd.) were added to the above solution and mixed with stirring. The above mixed solution was filtered through a polypropylene filter having a pore diameter of 30 μm, whereby coating solution (HCL-3) for glare-proof hard coat layer was prepared.

Preparation of Coating Solution (HCL-4) for Glare-Proof Hard Coat Layer:

Coating solution (HCL-4) for glare-proof hard coat layer was prepared in the same manner including the addition amounts as in the preparation of coating solution (HCL-3), except that 0.26 g of fluorine polymer (P-25) (40 mass %, an MEK solution) was added in place of fluorine polymer (P-3).

Preparation of Coating Solution (HCL-5) for Glare-Proof Hard Coat Layer:

Coating solution (HCL-5) for glare-proof hard coat layer was prepared in the same manner including the addition amounts as in the preparation of coating solution (HCL-3), except that 0.26 g of fluorine polymer (P-91) (40 mass %, an MEK solution) was added in place of fluorine polymer (P-3).

Preparation of Coating Solution (HCL-6) for Glare-Proof Hard Coat Layer:

Coating solution (HCL-6) for glare-proof hard coat layer was prepared in the same manner including the addition amounts as in the preparation of coating solution (HCL-3), except that 0.26 g of fluorine polymer (P-62) (40 mass %, an MEK solution) was added in place of fluorine polymer (P-3).

Preparation of Coating Solution (HCL-7) for Glare-Proof Hard Coat Layer:

Coating solution (HCL-7) for glare-proof hard coat layer was prepared in the same manner including the addition amounts as in the preparation of coating solution (HCL-3), except that 0.26 g of fluorine polymer (P-45) (40 mass %, an MEK solution) was added in place of fluorine polymer (P-3).

Preparation of Coating Solution (HCL-8) for Glare-Proof Hard Coat Layer:

Coating solution (HCL-8) for glare-proof hard coat layer was prepared in the same manner including the addition amounts as in the preparation of coating solution (HCL-3), except that 0.26 g of fluorine polymer (R-2) shown below (40 mass %, an MEK solution) was added in place of fluorine polymer (P-3).

R-2

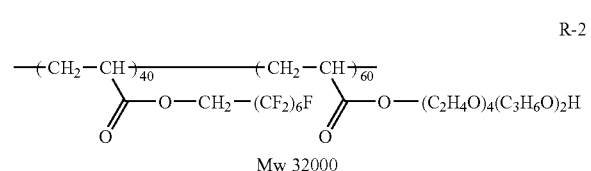

Mw 32000

(Preparation of a Coating Mixture for an Anti-Glare Hard Coating Layer (HCL-9))

279.4 parts by weight of a mixture of dipentaerythritol pentaacrylate and dipentaerythrithol hexaacrylate (DPHA made by Nippon Kayaku Co., Ltd.), 13.7 parts by weight of a photo-polymerization initiator (Irgacure 184, made by Chiba Specialty Chemicals, Inc.), 239.9 parts by weight of crosslinked acrylic-styrene particles (with an average particle size of 3.5 µm, a refractive index of 1.55, made by Souken Chemical Co., Ltd, 30% by weight MiBK dispersion, used after 20 minutes dispersion by means of a Polytron disperser at 10000 rpm), 1.14 parts by weight of a fluorine-containing leveling agent (P-108, 40% by weight MEK solution), 60.5 parts by weight of a silane coupling agent (KBM-5103, made by Shin-Etsu Chemical Co., Ltd.), 210.0 parts by weight of MiBK, 112.5 parts by weight of MEK, 28.1 parts by weight of propylene glycol, and 55.0 parts by weight of CAB-531-1 (cellulose acetate butyrate with a molecular weight of 40,000, made by Eastman Chemical Co., Ltd.; 20% by weight MiBK solution) were mixed together under agitation to provide a finished solution. The aforementioned mixture fluid was filtered through a polypropylene filter with 30 µm pore diameter to prepare a coating solution for an anti-glare hard coating layer (HCL-9).

(Preparation of a Coating Mixture for an Anti-Glare Hard Coating Layer (HCL-10))

A coating mixture for an anti-glare hard coating layer (HCL-10) was prepared strictly in the same manner as for the preparation of the foregoing coating mixture (HCL-9) including the use amounts, except that 1.14 parts by weight of a fluorine-containing polymer (P-97, 40% by weight MEK solution) was added instead of the fluorine-containing polymer (P-143) to the above-described coating mixture for an anti-glare hard coating layer (HCL-3).

Preparation of Titanium Dioxide Fine Grain Dispersion A:

As titanium dioxide fine grains, titanium dioxide fine grains containing cobalt and subjected to surface treatment with aluminum hydroxide and zirconium hydroxide was used (MPT-129C, manufactured by Ishihara Sangyo Kaisha Ltd., comprising $TiO_2/Co_3O_4/Al_2O_3/ZrO_2=90.5/3.0/4.0/0.5$ by mass).

The following shown dispersant (42 mass parts) and 702 mass parts of cyclohexanone were added to 256 mass parts of the above grains, and the mixture was dispersed with DYNO-MILL, whereby titanium dioxide dispersion A having a mass average grain size of 70 nm was prepared.

Dispersant

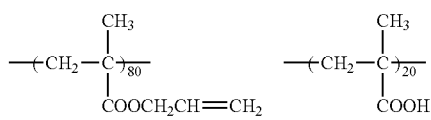

Preparation of Coating Solution (ML-1) for Middle Refractive Index Layer:

To 59.6 mass parts of the above titanium dioxide dispersion A were added 40.7 mass parts of the mixture of dipentaerythritol pentaacrylate and dipentaerythritol hexaacrylate (DPHA), 2.19 mass parts of a photo-polymerization initiator (Irgacure 907), 0.8 mass parts of photo-sensitizer (Kayacure DETX, manufactured by Nippon Kayaku Co., Ltd.), 280 mass parts of methyl ethyl ketone, and 1,049.0 mass parts of cyclohexanone, and the mixture was stirred. After thoroughly stirred, the mixture was filtered through a polypropylene filter having a pore diameter of 0.4 µm, whereby coating solution (ML-1) for middle refractive index layer was prepared.

Preparation of Coating Solution (HL-1) for High Refractive Index Layer:

To 430.7 mass parts of the above titanium dioxide dispersion A were added 36.6 mass parts of the mixture of dipentaerythritol pentaacrylate and dipentaerythritol hexaacrylate (DPHA, manufactured by Nippon Kayaku Co., Ltd.), 3.0 mass parts of a photo-polymerization initiator (Irgacure 907, manufactured by Ciba Geigy Japan Limited), 1.0 mass part of photo-sensitizer (Kayacure DETX, manufactured by Nippon Kayaku Co., Ltd.), 535.0 mass parts of methyl ethyl ketone, and 495 mass parts of cyclohexanone, and the mixture was stirred, and filtered through a polypropylene filter having a pore diameter of 0.4 µm, whereby coating solution (HL-1) for high refractive index layer was prepared.

Preparation of Coating Solution (HL-2) for High Refractive Index Layer:

To 430.7 mass parts of the above titanium dioxide dispersion A were added 36.6 mass parts of the mixture of dipentaerythritol pentaacrylate and dipentaerythritol hexaacrylate (DPHA, manufactured by Nippon Kayaku Co., Ltd.), 3.0 mass parts of a photo-polymerization initiator (Irgacure 907, manufactured by Ciba Geigy Japan Limited), 1.0 mass part of photo-sensitizer (Kayacure DETX, manufactured by Nippon Kayaku Co., Ltd.), 0.26 mass parts of fluorine polymer (P-3) (40 mass %, an MEK solution), 535.0 mass parts of methyl ethyl ketone, and 495 mass parts of cyclohexanone, and the mixture was stirred, and filtered through a polypropylene filter having a pore diameter of 0.4 µm, whereby coating solution (HL-2) for high refractive index layer was prepared.

Preparation of Coating Solution (HL-3) for High Refractive Index Layer:

Coating solution (HL-3) for high refractive index layer was prepared in the same manner including the addition amounts as in the preparation of coating solution (HL-2), except that 0.26 g of fluorine polymer (R-2) shown below (40 mass %, an MEK solution) was added in place of fluorine polymer (P-3).

R-2

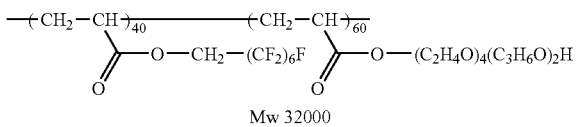

Mw 32000

Preparation of Coating Solution (LL-1) for Low Refractive Index Layer:

A solution obtained by dissolving the following shown copolymer in methyl ethyl ketone so as to each the concentration of 23.7 mass % (203.2 mass parts), 1.4 mass parts of silicone resin X-22-164C containing terminal methacrylate group (manufactured by Shin-Etsu Chemical Co., Ltd.), 2.4 mass parts of a photo-polymerization initiator Irgacure 907 (trade name), 764.6 mass parts of methyl ethyl ketone, and 28.4 mass parts of cyclohexanone were mixed and stirred. The reaction mixture obtained was filtered through a PTFE filter having a pore diameter of 0.45 μm, whereby coating solution (LL-1) for low refractive index layer was prepared.

Copolymer

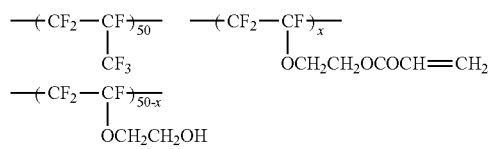

X≥40

Preparation of Sol Solution a:

Methyl ethyl ketone (119 parts), 101 parts of acryloyloxypropyltrimethoxysilane (KBM 5103, manufactured by Shin-Etsu Chemical Co., Ltd.), and 3 parts of diisopropoxy-aluminum ethyl acetate were put in a reaction vessel with a stirrer and a reflux condenser and mixed, 30 parts of ion exchange water was added thereto and the reaction system was allowed to react at 60° C. for 4 hours, and then the temperature was lowered to room temperature, whereby sol solution a was obtained. The mass average molecular weight of the solution was 1,600. Of oligomer or higher components, the components having a molecular weight of from 1,000 to 20,000 accounted for 100%. From the analysis by gas chromatography, it was confirmed that acryloyloxypropyltrimethoxysilane of starting material was not remained at all.

Preparation of Coating Solution (LL-2) for Low Refractive Index Layer:

JN-7228A containing polysiloxane and a hydroxy group-containing polymer (refractive index: 1.42, solids concentration: 6%, manufactured by JSR Corporation) (14.9 g), 0.61 g of silica sol (silica, MEK-ST, average grain size: 15 nm, solids concentration: 30%, manufactured by Nissan Chemical Industries, Ltd.), 0.79 g of silica sol (silica, different from MEK-ST in grain sizes, average grain size: 45 nm, solids concentration: 30%, manufactured by Nissan Chemical Industries, Ltd.), 0.41 g of sol solution a, 3.1 g of methyl ethyl ketone, and 0.6 g of cyclohexanone were mixed and stirred. The reaction mixture obtained was filtered through a polypropylene filter having a pore diameter of 1 μm, whereby coating solution (LL-2) for low refractive index layer was prepared.

(Preparation of Dispersion A-1)

To 500 parts of a hollow silica fine sol (an isopropyl alcohol silica sol with an average particle diameter of 60 nm, a shell thickness of 10 nm, a silica concentration of 20% by weight and a refractive index of silica particle of 1.31, prepared by changing particle size in conformity with Preparation Example 4 of Japanese Patent Laid-open No. 2002-79616), 30 parts of acryloyloxypropyltrimethoxysilane (made by Shin-Etsu Chemical Co., Ltd.) and 1.5 parts of diisopropoxy-aluminum ethyl acetate were added. After mixing those ingredients, 9 parts of ion exchanged water was added. After subjected to reaction at 60° C. for 8 hours, the mixture was cooled to room temperature, and 1.8 parts of acetylacetone was added. Along with the addition of cyclohexanone to 500 g of this dispersion in such a manner as to keep the silica content substantially constant, the solvent was replaced by reduced pressure distillation at a pressure of 20 kPa. No foreign matter generated in the dispersion. The viscosity when the solid concentration was adjusted to 20% by weight with cyclohexanone was 5 mPa·s at 25° C. The residual amount of isopropyl alcohol in the resultant dispersion A-1 was analyzed by gas chromatography to give the value of 1.5%.

(Preparation of a Coating Mixture for a Low-Refractive Index Layer (LL-3))

To 783.3 parts by weight (47.0 parts by weight as the solid content) of Opstar JTA113 (a thermosetting fluorine- and silicone-containing polymer composition solution with a solid content of 6%, made by JSR Corp.), 195 parts by weight of dispersion A-1 (39.0 parts by weight as the solid content of the sum of silica and the surface treating agent), and 30.0 parts by weight of a colloidal silica dispersion (silica, an MEK-ST product differing only in the particle size with average particle diameter of 45 nm, a solid concentration of 30%, made by Nissan Chemical Industries, Ltd.) (9.0 parts by weight as the solid content), and 17.2 parts by weight of the sol fluid (a) (5.0 parts by weight as the solid content) were added. A coating mixture (LL-3) was prepared by diluting the above-prepared mixture with cyclohexanone and methyl ethyl ketone in such a manner that the solid concentration in the entire coating mixture be equal to 6% by weight and that the ratio of cyclohexanone and methyl ethyl ketone be equal to 10:90.

(Preparation of a Coating Mixture for a Low-Refractive Index Layer (LL-4))

To 941.7 parts by weight (56.5 parts by weight as the solid content) of Opstar JTA113 (a thermosetting fluorine- and silicone-containing polymer composition solution with a solid content of 6%, made by JSR Corp.), 100.0 parts by weight of a colloidal silica dispersion (30.0 parts by weight as the solid) (silica, an MEK-ST product differing only in the particle size with an average particle diameter of 45 nm, and a solid concentration of 30%, made by Nissan Chemical Industries, Ltd.), 46.6 parts by weight of the sol fluid (a) (13.5 parts by weight as the solid content) were added. A coating mixture (LL-4) was prepared by diluting the above-prepared mixture with cyclohexanone and methyl ethyl ketone in such a manner that the solid concentration in the entire coating mixture be equal to 6% by weight and that the ratio of cyclohexanone and methyl ethyl ketone be equal to 3:97.

Example 1

An anti-reflection film sample was obtained by coating each of glare-proof hard coat layer coating solutions (HCL-2) to (HCL-8), and low refractive index layer coating solution (LL-2) as follows. Glare-proof hard coat layer coating solution used in each sample is shown in Table 1 below.

TABLE 1

| Sample No. | Remarks | Coating Solution for Glare-Proof Hard Coat Layer | Fluorine Polymer | I/O Value | Coating Speed (m/min) | Wind Unevenness | Level Unevenness | Productivity |
|---|---|---|---|---|---|---|---|---|
| 101 | Comparison | HCL-2 | None | — | 30 | x | ○ | x |
| 102 | Invention | HCL-3 | P-3 | 0.8 | 30 | ○ | ○ | ○ |
| 103 | Invention | HCL-4 | P-25 | 0.7 | 40 | ○ | ○ | ○ |
| 104 | Invention | HCL-5 | P-91 | 0.6 | 50 | ○ | ○ | ○ |
| 105 | Invention | HCL-6 | P-62 | 0.8 | 25 | ○ | ○ | ○ |
| 106 | Invention | HCL-7 | P-45 | 0.7 | 30 | ○ | ○ | ○ |
| 107 | Comparison | HCL-8 | R-2 | 1.18 | 30 | ○ | x | x |
| 108 | Invention | HCL-9 | P-108 | 0.3 | 30 | ○ | ○ | ○ |
| 109 | Invention | HCL-10 | P-97 | 0.31 | 30 | ○ | ○ | ○ |
| 110 | Comparison | HCL-2 | None | — | 25 | x | ○ | x |
| 111 | Invention | HCL-3 | P-3 | 0.8 | 15 | ○ | ○ | x |
| 112 | Comparison | HCL-8 | R-2 | 1.18 | 10 | ○ | x | x |

(1) Coating of Glare-Proof Hard Coat Layer (Sample No. 101)

A triacetyl cellulose film having a thickness of 80 μm (TAC-TD80U, trade name, manufactured by Fuji Photo Film Co., Ltd.) in the form of a roll was unwound, and each of glare-proof hard coat layer coating solutions (HCL-2) to (HCL-10) was coated on the film by using micro gravure roll of a diameter of 50 mm and having a gravure pattern of line number 140/inch and a doctor blade on the conditions of gravure rotation number of 90 rpm and a traveling speed of 30 m/min, and then the film was dried at 120° C. for 4 minutes. After drying, the coated layer was cured under nitrogen purge with an air-cooled metal halide lamp of 160 W/cm (manufactured by EYEGRAPHICS, CO., LTD.) by irradiation with ultraviolet ray at illumination intensity of 400 mW/cm$^2$ and quantity of radiation of 300 mJ/cm$^2$, whereby each glare-proof hard coat layer having a thickness of from 6 μm was formed, and the film was rewound.

Further, samples 102 to 112 are prepared in the same manner as in sample 101 except that a traveling speed was changed to those in table 1 by changing the rotation number of the gravure roll.

(2) Coating of Low Refractive Index Layer

The above triacetyl cellulose film on which a glare-proof hard coat layer was coated was unwound again, and the above low refractive index layer coating solution (LL-2) was coated by using micro gravure roll of a diameter of 50 mm and having a gravure pattern of line number 230/inch and a doctor blade on the conditions of gravure rotation number of 100 rpm and a traveling speed of 30 m/min, and then the film was dried at 80° C. for 2 minutes. After drying, the coated layer was subjected to irradiation with ultraviolet ray under nitrogen purge with an air-cooled metal halide lamp of 240 W/cm (manufactured by EYEGRAPHICS, CO., LTD.) at illumination intensity of 400 mW/cm$^2$ and quantity of radiation of 600 mJ/cm$^2$, the film was then dried at 120° C. for 2.5 minutes, further at 140° C. for 8 to 20 minutes, whereby a low refractive index layer having a thickness of 0.095 μm was formed, and the film was rewound.

Example 2

Each anti-reflection film sample was obtained by coating hard coat layer coating solution (HCL-1), middle refractive index layer coating solution (ML-1), high refractive index layer coating solution (HL-1), (HL-2) or (HL-3), and low refractive index layer coating solution (LL-1) as follows. High refractive index layer coating solutions used in samples are as shown in Table 2.

TABLE 2

| Sample No. | Remarks | Coating Solution for High Refractive Index Layer | Fluorine Polymer | I/O Value | Coating Speed (m/min) | Wind Unevenness | Level Unevenness |
|---|---|---|---|---|---|---|---|
| 201 | Comparison | HL-1 | None | — | 30 | x | ○ |
| 202 | Invention | HL-2 | P-3 | 0.8 | 30 | ○ | ○ |
| 203 | Comparison | HL-3 | R-2 | 1.3 | 30 | ○ | x |

Manufacture of Anti-Reflection Film:

Hard coat layer coating solution (HCL-1) was coated on a triacetyl cellulose film having a thickness of 80 μm (TD-80UF, manufactured by Fuji Photo Film Co., Ltd.) with a micro gravure roll of a diameter of 50 mm and having a gravure pattern of line number 100/inch and a doctor blade on the conditions of gravure rotation number of 90 rpm and a traveling speed of 30 m/min.

After that, the coated layer was dried at 80° C. and then cured by irradiation with ultraviolet ray, while maintaining the atmosphere of oxygen concentration of 1.0 vol % or less by nitrogen purge, with an air-cooled metal halide lamp of 160 W/cm (manufactured by EYEGRAPHICS, CO., LTD.) at illumination intensity of 400 mW/cm$^2$ and quantity of radiation of 500 mJ/cm$^2$, whereby hard coat layer having a thickness of 8 μm was formed.

Middle refractive index layer coating solution (ML-1) was coated on the above hard coat layer with a micro gravure roll of a diameter of 50 mm and having a gravure pattern of line number 230/inch and a doctor blade on the conditions of gravure rotation number of 100 rpm and a traveling speed of 30 m/min.

After that, the coated layer was dried at 100° C. for 30 seconds and then cured by irradiation with ultraviolet ray, while maintaining the atmosphere of oxygen concentration of 0.1 vol % or less by nitrogen purge, with an air-cooled metal halide lamp of 240 W/cm (manufactured by EYEGRAPHICS, CO., LTD.) at illumination intensity of 550 mW/cm$^2$ and quantity of radiation of 550 mJ/cm$^2$, whereby a middle refractive index layer having a refractive index of 1.63 and a thickness of 64 nm was formed.

High refractive index layer coating solution (HL-1), (HL-2) or (HL-3) was coated on the above middle refractive index layer with a micro gravure roll of a diameter of 50 mm and having a gravure pattern of line number 230/inch and a doctor blade on the conditions of gravure rotation number of 100 rpm and a traveling speed of 30 m/min.

After that, the coated layer was dried at 100° C. for 30 seconds and then cured by irradiation with ultraviolet ray, while maintaining the atmosphere of oxygen concentration of 0.1 vol % or less by nitrogen purge, with an air-cooled metal halide lamp of 240 W/cm (manufactured by EYEGRAPHICS, CO., LTD.) at illumination intensity of 550 mW/cm$^2$ and quantity of radiation of 550 mJ/cm$^2$, whereby a high refractive index layer having a refractive index of 1.90 and a thickness of 103 nm was formed.

Low refractive index layer coating solution (LL-1) was coated on the above high refractive index layer with a micro gravure roll of a diameter of 50 mm and having a gravure pattern of line number 230/inch and a doctor blade on the conditions of gravure rotation number of 100 rpm and a traveling speed of 30 m/min. The degree of pressure reduction in a reduced pressure chamber was 0.8 kPa. After that, the coated layer was dried at 90° C. for 30 seconds and then cured by irradiation with ultraviolet ray, while maintaining the atmosphere of oxygen concentration of 0.1 vol % or less by nitrogen purge, with an air-cooled metal halide lamp of 240 W/cm (manufactured by EYEGRAPHICS, CO., LTD.) at illumination intensity of 600 mW/cm$^2$ and quantity of radiation of 400 mJ/cm$^2$, whereby an anti-reflection film having a refractive index of 1.45 and a thickness of 83 nm was formed.

In the manufacturing processes of Examples 1 and 2, coating and drying processes were performed under air cleanliness of grains of 0.5 μm or more of 30/m$^3$ or less. Coating was performed according to a dust removing method of blowing air of high cleanliness at a high speed to peel off deposits from the surface of a web and sucking the released substances with a nearby suction port as disclosed in JP-A-10-309553. The static electricity charged on the film base before dust removal was 200 V or less. The coating was performed by the process of unwinding of a film—dust removal—coating—drying—curing (by UV or heating)—rewinding in every layer formation.

[Evaluation of Surface Uniformity]

Uncoated side of each of Samples 101 to 110 and 201 to 203 obtained in Examples 1 and 2 was coated black and the coated surface was observed under the diffused light of a fluorescent lamp with a louver and the planar state was evaluated. Here, the wind unevenness means streaky patterns substantially parallel to the advancing direction of the transparent support, while the level unevenness indicates periodic patterns substantially perpendicular to the advancing direction of the transparent support. In the case where these patterns are not visually recognized under the aforementioned condition, the coated surface was judged "o", and in the case where these patterns are visually recognized, the coated surface was judged "x". The results obtained were shown in Tables 1 and 2. In Samples 101 and 201 to which a fluorine polymer was not added, wind unevenness occurred at the time of high speed coating. In Samples 102 to 106, 108, 109 and 202 obtained by coating a coating solution containing monomers having an I/O value of 1.0 or less of the prescription in the invention, there occurred neither level unevenness nor wind unevenness, and showed good planar state. In Samples 107 and 203 prepared by coating a coating solution containing fluorine polymers to which monomers having an I/O value exceeding 1.0 were added, level unevenness occurred, although wind unevenness did not occur. Sample 111 shows good planar state, but further increase of the coating speed is desired for productivity. With respect to Sample 110, wind unevenness occurred. With respect to Sample 112, level unevenness occurred.

Manufacture of Polarizing Plate:

Triacetyl cellulose of the back surface of each of anti-reflection films prepared in Samples 102 to 106 and 202 was subjected to saponification treatment by immersing in an NaOH aqueous solution of 2.0 mol/L at 55° C. for 2 minutes. A triacetyl cellulose film having a thickness of 80 μm (TAC-TD80U, manufactured by Fuji Photo Film Co., Ltd.) was subjected to saponification treatment in the same manner. These films were adhered on and protected both surfaces of a polarizer manufactured by adsorbing iodine onto polyvinyl alcohol and stretching to form a polarizing plate.

Manufacture of Display:

When the thus-formed polarizing plate was replaced with the polarizing plate on the visible side of the liquid crystal display of a notebook-sized personal computer loading a transmission type TN liquid crystal display (having, between back light and liquid crystal cell, D-BEF that is a polarized light separating film having a polarized light selecting layer, manufactured by Sumitomo 3M Limited) so that the anti-reflection film side became the outermost surface, a display unit that the mirroring of background was extremely little, the tint of reflected light was conspicuously reduced, the uniformity in the display plane was secured, and display grade was high could be obtained.

Any of the above samples can be manufactured according to wire bar coating as disclosed in JP-A-9-73081 and also the extrusion coating as disclosed in JP-A-2003-211052, and films having the same performances as those of the films manufactured by the above micro gravure coating could be obtained.

And, an anti-reflection film was produced in the same manner as in Sample No. 108 of Example 1 except that the coating mixture for a low-refractive index layer was altered to LL-3 and LL-4, and evaluated of surface uniformity, whereby the anti-reflection film exhibited good surface uniformity similar to that of Sample No. 108 of Example 1, generating no stepwise irregularities or irregularities caused by air-stream. In addition, with respect to the anti-reflection film using LL-3, background visibility was further reduced compared with LL-1, showing good surface uniformity.

INDUSTRIAL APPLICABILITY

Since a coating composition in the invention contains a polymer containing a fluoro-aliphatic group having a specific structure, a film capable of compatibility of reducing drying unevenness and wind unevenness and not worsening level unevenness can be formed.

Since an anti-reflection film in the invention is formed of such a coating composition, the film is high in planar uniformity and has sufficient reflection preventing performance.

In a polarizing plate and a display unit using such an anti-reflection film, uniformity in the display plane is secured, mirroring of background is extremely little, the tint of reflected light is conspicuously reduced, and display grade is high.

The entire disclosure of each and every foreign patent application from which the benefit of foreign priority has been claimed in the present application is incorporated herein by reference, as if fully set forth.

The invention claimed is:

1. An optical film comprising, on a transparent support, at least one layer formed by a coating composition comprising a fluoro-aliphatic group-containing copolymer comprising a repeating unit A corresponding to a fluoro-aliphatic group-containing monomer, and a repeating unit B corresponding to at least one monomer, wherein each of the inorganic nature/organic nature (I/O) value(s) of said at least one monomer constituting the repeating unit B is 1.0 or less, whereby said layer is formed by coating at a coating speed of 25 m/min or more, wherein the fluoro-aliphatic group-containing copolymer comprises:

(i) a repeating unit corresponding to a fluoro-aliphatic group-containing monomer represented by the following formula (1) or (5):

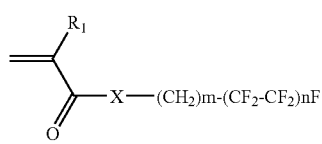

(1)

wherein $R_1$ represents a hydrogen atom or a methyl group; X represents an oxygen atom, a sulfur atom or $-N(R_2)-$; m represents an integer of from 1 to 6; n represents an integer of from 1 to 3; and $R_2$ represents a hydrogen atom or an alkyl group having from 1 to 4 carbon atoms,

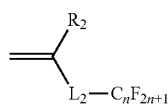

(5)

wherein, $R_2$ represents a hydrogen atom, halogen atom or methyl group, $L_2$ represents a divalent connecting group, and n represents an integer of from 1 to 6; and (ii) a repeating unit corresponding to a monomer represented by the following formula (2):

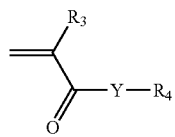

(2)

wherein $R_3$ represents a hydrogen atom or a methyl group; Y represents a divalent linking group; and $R_4$ represents a cyclic alkyl group having from 1 to 20 carbon atoms, and wherein the optical film has one of the following structures (A) to (C):

(A) a transparent support, a hard coat layer and a low refractive index layer provided in this order;

(B) a transparent support, a hard coat layer, a high refractive index layer and a low refractive index layer provided in this order; and (C) a transparent support, a hard coat layer, a middle refractive index layer, a high refractive index layer and a low refractive index layer provided in this order, wherein the transparent support has a refractive index of from 1.4 to 1.7, and a thickness of from 30 to 150 μm, the hard coat layer has a thickness of from 0.2 to 15 μm, the low refractive index layer has a refractive index of from 1.20 to 1.49 and has a thickness of from 50 to 200 nm, the high refractive index layer has a refractive index of from 1.55 to 2.40, the middle refractive index layer has a thickness of from 30 to 500 nm and has a refractive index which is intermediate between the refractive index of the transparent support and the refractive index of the high refractive index layer, and the fluoro-aliphatic group-containing copolymer is contained in at least one of the hard coat layer, the middle refractive index layer and the high refractive index layer.

2. An anti-reflection film which is the optical film as claimed in claim 1, the optical film having an anti-reflection property.

3. An image display apparatus comprising the anti-reflection film as claimed in claim 2.

4. An anti-reflection film which is the optical film as claimed in claim 1, wherein the coating composition comprises 0.001 to 5.0 mass % of the fluoro-aliphatic group-containing copolymer.

5. An optical film comprising, on a transparent support, at least one layer formed by a coating composition comprising a fluoro-aliphatic group-containing copolymer comprising a repeating unit A corresponding to a fluoro-aliphatic group-containing monomer, and a repeating unit B corresponding to at least one monomer, wherein each of the inorganic nature/organic nature (I/O) value(s) of said at least one monomer constituting the repeating unit B is 1.0 or less, whereby said layer is formed by coating at a coating speed of 25 m/min or more, wherein the fluoro-aliphatic group-containing copolymer comprises:

(i) a repeating unit corresponding to a fluoro-aliphatic group-containing monomer represented by the following formula (3) or (4):

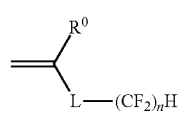

(3)

wherein $R^0$ represents a hydrogen atom, a halogen atom, or a methyl group; L represents a divalent linking group; and n represents an integer of from 1 to 18,

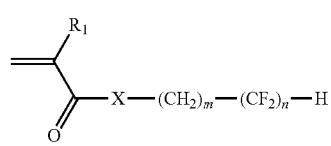

(4)

wherein $R^1$ represents a hydrogen atom, a halogen atom, or a methyl group; X represents an oxygen atom, a sulfur atom or $-N(R^2)-$; m represents an integer of from 1 to 6; n represents an integer of from 1 to 18; and $R^2$ represents a hydrogen atom or an alkyl group having from 1 to 8 carbon atoms which may have a substituent; and (ii) a repeating unit corresponding to a monomer represented by the following formula (2):

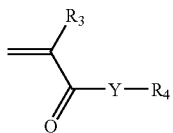
(2)

wherein $R_3$ represents a hydrogen atom or a methyl group; Y represents a divalent linking group; and $R_4$ represents a straight chain, branched or cyclic alkyl group having from 1 to 20 carbon atoms, and wherein the optical film has one of the following structures (A) to (C):

(A) a transparent support, a hard coat layer and a low refractive index layer are provided in this order;

(B) a transparent support, a hard coat layer, a high refractive index layer and a low refractive index layer are provided in this order; and (C) a transparent support, a hard coat layer, a middle refractive index layer, a high refractive index layer and a low refractive index layer are provided in thus order, wherein the transparent support has a refractive index of from 1.4 to 1.7, and a thickness of from 30 to 150 μm, the hard coat layer has a thickness of from 0.2 to 15 μm, the low refractive index layer has a refractive index of from 1.20 to 1.49 and has a thickness of from 50 to 200 nm, the high refractive index layer has a refractive index of from 1.55 to 2.40, the middle refractive index layer has a thickness of from 30 to 500 nm and has a refractive index which is intermediate between the refractive index of the transparent support and the refractive index of the high refractive index layer, and the fluoro-aliphatic group-containing copolymer is contained in at least one of the hard coat layer, the middle refractive index layer and the high refractive index layer.

6. The optical film as claimed in claim 5, wherein the coating composition comprises 0.001 to 5.0 mass % of the fluoro-aliphatic group-containing copolymer.

7. An anti-reflection film which is the optical film as claimed in claim 5, the optical film having an anti-reflection property.

8. A polarizing plate comprising a polarizing film, wherein the anti-reflection film as claimed in claim 7 is used on at least one side of the polarizing film.

9. A polarizing plate comprising a polarizing film, wherein the anti-reflection film as claimed in claim 7 is used as a protective film of one side of the polarizing film, and an optical compensating film having optical anisotropy is used as a protective film of the other side of the polarizing film.

10. An image display apparatus comprising the anti-reflection film as claimed in claim 7.

11. An image display apparatus comprising the anti-reflection film as claimed in claim 8.

12. An image display apparatus comprising the anti-reflection film as claimed in claim 9.

* * * * *